US012812181B2

(12) United States Patent
Tan et al.

(10) Patent No.: US 12,812,181 B2
(45) Date of Patent: Nov. 24, 2026

(54) IMAGE ENCODING METHOD, IMAGE ENCODING APPARATUS, IMAGE DECODING METHOD, IMAGE DECODING APPARATUS, METHOD OF TRANSMITTING BITSTREAM, AND RECORDING MEDIUM STORING BITSTREAM

(71) Applicant: LG Electronics Inc., Seoul (KR)

(72) Inventors: Hendry Tan, Seoul (KR); Jangwon Lee, Seoul (KR); Jaehyun Lim, Seoul (KR); Chulkeun Kim, Seoul (KR); Junghak Nam, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 19/425,244

(22) Filed: Dec. 18, 2025

(65) Prior Publication Data

US 2026/0122282 A1 Apr. 30, 2026

Related U.S. Application Data

(63) Continuation of application No. PCT/KR2025/009340, filed on Jul. 1, 2025.

(60) Provisional application No. 63/666,648, filed on Jul. 1, 2024.

(51) Int. Cl.
*H04N 19/70* (2014.01)
*H04N 19/31* (2014.01)

(52) U.S. Cl.
CPC ............ *H04N 19/70* (2014.11); *H04N 19/31* (2014.11)

(58) Field of Classification Search
CPC .................................................... H04N 19/70
See application file for complete search history.

(56) References Cited

U.S. PATENT DOCUMENTS 9,706,199 B2 7/2017 Ugur et al.
2025/0126297 A1 * 4/2025 Samuelsson-Allendes ................ H04N 19/172

FOREIGN PATENT DOCUMENTS

KR 10-2022-0165274 A 12/2022
KR 10-2024-0070581 A 5/2024
WO 2022/039513 A1 2/2022

OTHER PUBLICATIONS

Boyce et al., "Additional SEI messages for VSEI version 4 (Draft 2)," JVET-AH2006-v1, Joint Video Experts Team (JVET) of Itu-T SG 16 WP 3 and ISO/IEC JTC 1/SC 29, 34th Meeting, Rennes, France, Apr. 17-24, 2024, 41 pages.
International Search Report and Written Opinion in International Appln. No. PCT/KR2025/009340, mailed on Oct. 21, 2025, 9 pages (with English translation).

* cited by examiner

*Primary Examiner* — Jerry T Jean Baptiste
(74) *Attorney, Agent, or Firm* — Fish & Richardson P.C.

(57) ABSTRACT

A method according to embodiments may include acquiring a supplemental enhancement information (SEI) message for source pictures, and decoding output pictures related to the source pictures. A method according to embodiments may include acquiring source pictures, generating an SEI message for the source pictures, and encoding output pictures related to the source pictures.

4 Claims, 33 Drawing Sheets

| source_picture_timing_info( payloadSize ) { | Descriptor |
|---|---|
| spti_cancel_flag | u(1) |
| if( !spti_cancel_flag ) { | |
| spti_persistence_flag | u(1) |
| spti_source_timing_equals_output_timing_flag | u(1) |
| if( !spti_source_timing_equals_output_timing_flag ) { | |
| spti_source_type_present_flag | u(1) |
| if( spti_source_type_present_flag ) | |
| spti_source_type | u(16) |
| spti_time_scale | u(32) |
| spti_num_units_in_elemental_interval | u(32) |
| if( spti_persistence_flag ) | |
| spti_max_sublayers_minus_1 | u(3) |
| for( i = 0; i <= spti_max_sublayers_minus1; i++ ) { | |
| spti_sublayer_interval_scale_factor[ i ] | ue(v) |
| spti_sublayer_synthesized_picture_flag[ i ] | u(1) |
| } | |
| } | |
| } | |
| } | |

FIG. 23A

| picture_header_structure( ) { | Descriptor |
|---|---|
| ph_gdr_or_irap_pic_flag | u(1) |
| ph_non_ref_pic_flag | u(1) |
| if( ph_gdr_or_irap_pic_flag ) | |
| ph_gdr_pic_flag | u(1) |
| ph_inter_slice_allowed_flag | u(1) |
| if( ph_inter_slice_allowed_flag ) | |
| ph_intra_slice_allowed_flag | u(1) |
| ph_pic_parameter_set_id | ue(v) |
| ph_pic_order_cnt_lsb | u(v) |
| if( ph_gdr_or_irap_pic_flag ) | |
| ph_no_output_of_prior_pics_flag | u(1) |
| if( ph_gdr_pic_flag ) | |
| ph_recovery_poc_cnt | ue(v) |
| for( i = 0; i < NumExtraPhBits; i++ ) | |
| ph_extra_bit[ i ] | u(1) |
| if( sps_poc_msb_cycle_flag ) { | |
| ph_poc_msb_cycle_present_flag | u(1) |
| if( ph_poc_msb_cycle_present_flag ) | |
| ph_poc_msb_cycle_val | u(v) |
| } | |
| if( sps_alf_enabled_flag && pps_alf_info_in_ph_flag ) { | |
| ph_alf_enabled_flag | u(1) |
| if( ph_alf_enabled_flag ) { | |
| ph_num_alf_aps_ids_luma | u(3) |
| for( i = 0; i < ph_num_alf_aps_ids_luma; i++ ) | |
| ph_alf_aps_id_luma[ i ] | u(3) |
| if( sps_chroma_format_idc != 0 ) { | |
| ph_alf_cb_flag | u(1) |
| ph_alf_cr_flag | u(1) |
| } | |
| if( ph_alf_cb_flag \|\| ph_alf_cr_flag ) | |
| ph_alf_aps_id_chroma | u(3) |
| if( sps_ccalf_enabled_flag ) { | |
| ph_cc_alf_cb_enabled_flag | u(1) |
| if( ph_cc_alf_cb_enabled_flag ) | |
| ph_cc_alf_cb_aps_id | u(3) |
| if( sps_ccalf_enabled_flag ) { | |
| ph_cc_alf_cb_enabled_flag | u(1) |
| if( ph_cc_alf_cb_enabled_flag ) | |
| ph_cc_alf_cb_aps_id | u(3) |

FIG. 23B

| | |
|---|---|
| ph_cc_alf_cr_enabled_flag | u(1) |
| if( ph_cc_alf_cr_enabled_flag ) | |
| ph_cc_alf_cr_aps_id | u(3) |
| } | |
| } | |
| } | |
| if( sps_lmcs_enabled_flag ) { | |
| ph_lmcs_enabled_flag | u(1) |
| if( ph_lmcs_enabled_flag ) { | |
| ph_lmcs_aps_id | u(2) |
| if( sps_chroma_format_idc != 0 ) | |
| ph_chroma_residual_scale_flag | u(1) |
| } | |
| } | |
| if( sps_explicit_scaling_list_enabled_flag ) { | |
| ph_explicit_scaling_list_enabled_flag | u(1) |
| if( ph_explicit_scaling_list_enabled_flag ) | |
| ph_scaling_list_aps_id | u(3) |
| } | |
| if( sps_virtual_boundaries_enabled_flag && !sps_virtual_boundaries_present_flag ) { | |
| ph_virtual_boundaries_present_flag | u(1) |
| if( ph_virtual_boundaries_present_flag ) { | |
| ph_num_ver_virtual_boundaries | u(2) |
| for( i = 0; i < ph_num_ver_virtual_boundaries; i++ ) | |
| ph_virtual_boundary_pos_x_minus1[ i ] | ue(v) |
| ph_num_hor_virtual_boundaries | u(2) |
| for( i = 0; i < ph_num_hor_virtual_boundaries; i++ ) | |
| ph_virtual_boundary_pos_y_minus1[ i ] | ue(v) |
| } | |
| } | |
| if( pps_output_flag_present_flag && !ph_non_ref_pic_flag ) | |
| ph_pic_output_flag | u(1) |
| if( pps_rpl_info_in_ph_flag ) | |
| ref_pic_lists( ) | |
| if( sps_partition_constraints_override_enabled_flag ) | |
| ph_partition_constraints_override_flag | u(1) |
| if( ph_intra_slice_allowed_flag ) { | |
| if( ph_partition_constraints_override_flag ) { | |
| ph_log2_diff_min_qt_min_cb_intra_slice_luma | ue(v) |
| ph_max_mtt_hierarchy_depth_intra_slice_luma | ue(v) |

FIG. 23C

| | |
|---|---|
| if( ph_max_mtt_hierarchy_depth_intra_slice_luma != 0 ) { | |
| ph_log2_diff_max_bt_min_qt_intra_slice_luma | ue(v) |
| ph_log2_diff_max_tt_min_qt_intra_slice_luma | ue(v) |
| } | |
| if( sps_qtbtt_dual_tree_intra_flag ) { | |
| ph_log2_diff_min_qt_min_cb_intra_slice_chroma | ue(v) |
| ph_max_mtt_hierarchy_depth_intra_slice_chroma | ue(v) |
| if( ph_max_mtt_hierarchy_depth_intra_slice_chroma !=0){ | |
| ph_log2_diff_max_bt_min_qt_intra_slice_chroma | ue(v) |
| ph_log2_diff_max_tt_min_qt_intra_slice_chroma | ue(v) |
| } | |
| } | |
| } | |
| if( pps_cu_qp_delta_enabled_flag ) | |
| ph_cu_qp_delta_subdiv_intra_slice | ue(v) |
| if( pps_cu_chroma_qp_offset_list_enabled_flag ) | |
| ph_cu_chroma_qp_offset_subdiv_intra_slice | ue(v) |
| } | |
| if( ph_inter_slice_allowed_flag ) { | |
| if( ph_partition_constraints_override_flag ) { | |
| ph_log2_diff_min_qt_min_cb_inter_slice | ue(v) |
| ph_max_mtt_hierarchy_depth_inter_slice | ue(v) |
| if( ph_max_mtt_hierarchy_depth_inter_slice != 0 ) { | |
| ph_log2_diff_max_bt_min_qt_inter_slice | ue(v) |
| ph_log2_diff_max_tt_min_qt_inter_slice | ue(v) |
| } | |
| } | |
| if( pps_cu_qp_delta_enabled_flag ) | |
| ph_cu_qp_delta_subdiv_inter_slice | ue(v) |
| if( pps_cu_chroma_qp_offset_list_enabled_flag ) | |
| ph_cu_chroma_qp_offset_subdiv_inter_slice | ue(v) |
| if( sps_temporal_mvp_enabled_flag ) { | |
| ph_temporal_mvp_enabled_flag | u(1) |
| if( ph_temporal_mvp_enabled_flag && pps_rpl_info_in_ph_flag ) { | |
| if( num_ref_entries[ 0 ][ RplsIdx[ 0 ] ] > 0 && num_ref_entries[ 1 ][ RplsIdx[ 1 ] ] > 0 ) | |
| ph_collocated_from_l0_flag | u(1) |
| if( ( ph_collocated_from_l0_flag && num_ref_entries[ 0 ][ RplsIdx[ 0 ] ] > 1 ) \|\| ( !ph_collocated_from_l0_flag && num_ref_entries[ 1 ][ RplsIdx[ 1 ] ] > 1 ) ) | |

FIG. 23D

| | |
|---|---|
| ph_collocated_ref_idx | ue(v) |
| } | |
| } | |
| if( sps_mmvd_fullpel_only_flag ) | |
| ph_mmvd_fullpel_only_flag | u(1) |
| presenceFlag = 0 | |
| if( !pps_rpl_info_in_ph_flag ) /* This condition is intentionally not merged into the next, to avoid possible intepretation of RplsIdx[ i ] being unspecified. */ | |
| presenceFlag = 1 | |
| else if( num_ref_entries[ 0 ][ RplsIdx[ 0 ] ] > 0 && num_ref_entries[ 1 ][ RplsIdx[ 1 ] ] > 0 ) | |
| presenceFlag = 1 | |
| if( presenceFlag ) { | |
| ph_mvd_l1_zero_flag | u(1) |
| if( sps_bdof_control_present_in_ph_flag ) | |
| ph_bdof_disabled_flag | u(1) |
| if( sps_dmvr_control_present_in_ph_flag ) | |
| ph_dmvr_disabled_flag | u(1) |
| } | |
| if( sps_prof_control_present_in_ph_flag ) | |
| ph_prof_disabled_flag | u(1) |
| if( ( pps_weighted_pred_flag \|\| pps_weighted_bipred_flag ) && pps_wp_info_in_ph_flag ) | |
| pred_weight_table( ) | |
| } | |
| if( pps_qp_delta_info_in_ph_flag ) | |
| ph_qp_delta | se(v) |
| if( sps_joint_cbcr_enabled_flag ) | |
| ph_joint_cbcr_sign_flag | u(1) |
| if( sps_sao_enabled_flag && pps_sao_info_in_ph_flag ) { | |
| ph_sao_luma_enabled_flag | u(1) |
| if( sps_chroma_format_idc != 0 ) | |
| ph_sao_chroma_enabled_flag | u(1) |
| } | |
| if( pps_deblocking_filter_override_enabled_flag && pps_dbf_info_in_ph_flag ) { | |

FIG. 23E

| | |
|---|---|
| ph_deblocking_filter_override_flag | u(1) |
| if( ph_deblocking_filter_override_flag ) { | |
| if( !pps_deblocking_filter_disabled_flag ) | |
| ph_deblocking_filter_disabled_flag | u(1) |
| if( !ph_deblocking_filter_disabled_flag ) { | |
| ph_luma_beta_offset_div2 | se(v) |
| ph_luma_tc_offset_div2 | se(v) |
| if( pps_chroma_tool_offsets_present_flag ) { | |
| ph_cb_beta_offset_div2 | se(v) |
| ph_cb_tc_offset_div2 | se(v) |
| ph_cr_beta_offset_div2 | se(v) |
| ph_cr_tc_offset_div2 | se(v) |
| } | |
| } | |
| } | |
| } | |
| if( pps_picture_header_extension_present_flag ) { | |
| ph_extension_length | ue(v) |
| for( i = 0; i < ph_extension_length; i++) | |
| ph_extension_data_byte[ i ] | u(8) |
| } | |
| } | |

FIG. 24A

| nn_post_filter_characteristics( payloadSize ) { | Descriptor |
|---|---|
| nnpfc_purpose | u(16) |
| nnpfc_id | ue(v) |
| nnpfc_base_flag | u(1) |
| nnpfc_mode_idc | ue(v) |
| if( nnpfc_mode_idc = = 1 ) { | |
| while( !byte_aligned( ) ) | |
| nnpfc_reserved_zero_bit_a | u(1) |
| nnpfc_tag_uri | st(v) |
| nnpfc_uri | st(v) |
| } | |
| nnpfc_property_present_flag | u(1) |
| if( nnpfc_property_present_flag ) { | |
| /* input and output formatting */ | |
| nnpfc_num_input_pics_minus1 | ue(v) |
| if( nnpfc_num_input_pics_minus1 > 0 ) { | |
| for( i = 0; i <= nnpfc_num_input_pics_minus1; i++ ) | |
| nnpfc_input_pic_output_flag[ i ] | u(1) |
| nnpfc_absent_input_pic_zero_flag | u(1) |
| } | |
| if( chromaUpsamplingFlag ) | |
| nnpfc_out_sub_c_flag | u(1) |
| if( colourizationFlag ) | |
| nnpfc_out_colour_format_idc | u(2) |
| if( resolutionResamplingFlag ) { | |
| nnpfc_pic_width_num_minus1 | ue(v) |
| nnpfc_pic_width_denom_minus1 | ue(v) |
| nnpfc_pic_height_num_minus1 | ue(v) |
| nnpfc_pic_height_denom_minus1 | ue(v) |
| } | |
| if( pictureRateUpsamplingFlag ) | |
| for( i = 0; i < nnpfc_num_input_pics_minus1; i++ ) | |
| nnpfc_interpolated_pics[ i ] | ue(v) |
| nnpfc_component_last_flag | u(1) |
| nnpfc_inp_format_idc | ue(v) |
| nnpfc_auxiliary_inp_idc | ue(v) |
| nnpfc_inp_order_idc | ue(v) |

FIG. 24B

| | |
|---|---|
| if( nnpfc_inp_format_idc == 1 ) { | |
| if( nnpfc_inp_order_idc != 1 ) | |
| nnpfc_inp_tensor_luma_bitdepth_minus8 | ue(v) |
| if( nnpfc_inp_order_idc != 0 ) | |
| nnpfc_inp_tensor_chroma_bitdepth_minus8 | ue(v) |
| } | |
| nnpfc_out_format_idc | ue(v) |
| nnpfc_out_order_idc | ue(v) |
| if( nnpfc_out_format_idc == 1 ) { | |
| if( nnpfc_out_order_idc != 1 ) | |
| nnpfc_out_tensor_luma_bitdepth_minus8 | ue(v) |
| if( nnpfc_out_order_idc != 0 ) | |
| nnpfc_out_tensor_chroma_bitdepth_minus8 | ue(v) |
| } | |
| nnpfc_separate_colour_description_present_flag | u(1) |
| if( nnpfc_separate_colour_description_present_flag ) { | |
| nnpfc_colour_primaries | u(8) |
| nnpfc_transfer_characteristics | u(8) |
| if( nnpfc_out_format_idc == 1 ) { | |
| nnpfc_matrix_coeffs | u(8) |
| nnpfc_full_range_flag | u(1) |
| } | |
| } | |
| nnpfc_chroma_loc_info_present_flag | u(1) |
| if( nnpfc_chroma_loc_info_present_flag ) | |
| nnpfc_chroma_sample_loc_type_frame | ue(v) |
| nnpfc_overlap | ue(v) |
| nnpfc_constant_patch_size_flag | u(1) |
| if( nnpfc_constant_patch_size_flag ) { | |
| nnpfc_patch_width_minus1 | ue(v) |
| nnpfc_patch_height_minus1 | ue(v) |
| } else { | |
| nnpfc_extended_patch_width_cd_delta_minus1 | ue(v) |
| nnpfc_extended_patch_height_cd_delta_minus1 | ue(v) |
| } | |
| nnpfc_padding_type | ue(v) |
| if( nnpfc_padding_type == 4 ) { | |
| if( nnpfc_inp_order_idc != 1 ) | |
| nnpfc_luma_padding_val | ue(v) |

FIG. 24C

| | |
|---|---|
| if( nnpfc_inp_order_idc != 0 ) { | |
| nnpfc_cb_padding_val | ue(v) |
| nnpfc_cr_padding_val | ue(v) |
| } | |
| } | |
| nnpfc_complexity_info_present_flag | u(1) |
| if( nnpfc_complexity_info_present_flag ) { | |
| nnpfc_parameter_type_idc | u(2) |
| if( nnpfc_parameter_type_idc != 2 ) | |
| nnpfc_log2_parameter_bit_length_minus3 | st(2) |
| nnpfc_num_parameters_idc | st(6) |
| nnpfc_num_kmac_operations_idc | ue(v) |
| nnpfc_total_kilobyte_size | ue(v) |
| } | |
| nnpfc_metadata_extension_num_bits | ue(v) |
| if( nnpfc_metadata_extension_num_bits > 0 ) | |
| nnpfc_reserved_metadata_extension | ue(v) |
| } | |
| /* ISO/IEC 15938-17 bitstream */ | |
| if( nnpfc_mode_idc = = 0 ) { | |
| while( !byte_aligned( ) ) | |
| nnpfc_reserved_zero_bit_b | u(1) |
| for( i = 0; more_data_in_payload( ); i++ ) | |
| nnpfc_payload_byte[ i ] | u(8) |
| ) | |
| ) | |

| nn_post_filter_activation( payloadSize ) { | Descriptor |
|---|---|
| nnpfa_target_id | ue(v) |
| nnpfa_cancel_flag | u(1) |
| if( !nnpfa_cancel_flag ) { | |
| nnpfa_target_base_flag | u(1) |
| nnpfa_persistence_flag | u(1) |
| nnpfa_num_output_entries | ue(v) |
| for( i = 0; i < nnpfa_num_output_entries; i++ ) | |
| nnpfa_output_flag[ i ] | u(1) |
| } | |
| } | |

FIG. 27

| nn_post_filter_group_characteristics( payloadSize ) { | Descriptor |
|---|---|
| nnpfgc_id | ue(v) |
| nnpfgc_grouping_type | ue(v) |
| if( nnpfgc_grouping_type == 0 \|\| nnpfgc_grouping_type == 2 ) | |
| nnpfgc_purpose | u(16) |
| nnpfgc_num_members_minus2 | ue(v) |
| for( i = 0; i <= nnpfgc_num_members_minus2 + 1; i++ ) | |
| nnpfgc_member_id[ i ] | ue(v) |
| nnpfgc_complexity_info_present_flag | u(1) |
| if( nnpfgc_complexity_info_present_flag ) { | |
| nnpfgc_parameter_type_idc | u(2) |
| if( nnpfgc_parameter_type_idc != 2 ) | |
| nnpfgc_log2_parameter_bit_length_minus3 | u(2) |
| nnpfgc_num_parameters_idc | u(6) |
| nnpfgc_num_kmac_operations_idc | ue(v) |
| nnpfgc_total_kilobyte_size | ue(v) |
| } | |
| } | |

FIG. 28

| nn_post_filter_group_activation( payloadSize ) { | Descriptor |
|---|---|
| nnpfga_target_id | ue(v) |
| nnpfga_cancel_flag | u(1) |
| if( !nnpfga_cancel_flag ) { | |
| nnpfga_persistence_flag | u(1) |
| nnpfga_num_filters_minus2 | ue(v) |
| for( i = 0; i <= nnpfga_num_filters_minus2 + 1; i++ ) { | |
| nnpfga_target_base_flag[ i ] | u(1) |
| nnpfga_input_all_pics_flag[ i ] | u(1) |
| if( !nnpfga_input_all_pics_flag[ i ] ) { | |
| nnpfga_num_input_pics_minus1[ i ] | ue(v) |
| for( j = 0; j <= nnpfga_num_input_pics_minus1[ i ];j++) | |
| nnpfga_input_pic_skip_count[ i ][ j ] | ue(v) |
| } | |
| nnpfga_num_output_entries[ i ] | ue(v) |
| for( j = 0; j < nnpfga_num_output_entries[ i ]; j++ ) | |
| nnpfga_output_flag[ i ][ j ] | u(1) |
| } | |
| } | |
| } | |

FIG. 29

| source_picture_timing_info( payloadSize ) { | Descriptor |
|---|---|
| spti_cancel_flag | u(1) |
| if( !spti_cancel_flag ) { | |
| spti_persistence_flag | u(1) |
| spti_source_timing_equals_output_timing_flag | u(1) |
| if( !spti_source_timing_equals_output_timing_flag ) { | |
| spti_source_type_present_flag | u(1) |
| if( spti_source_type_present_flag ) | |
| spti_source_type | u(16) |
| spti_time_scale | u(32) |
| spti_num_units_in_elemental_interval | u(32) |
| if( spti_persistence_flag ) | |
| spti_max_sublayers_minus_1 | u(3) |
| for( i = 0; i <= spti_max_sublayers_minus1; i++ ) { | |
| spti_sublayer_interval_scale_factor[ i ] | ue(v) |
| spti_sublayer_synthesized_picture_flag[ i ] | u(1) |
| } | |
| } | |
| } | |
| } | |

FIG. 30A

| object_mask_info( payloadSize ) { | Descriptor |
|---|---|
| omi_cancel_flag | u(1) |
| if( !omi_cancel_flag ) { | |
| omi_persistence_flag | u(1) |
| omi_num_aux_pic_layer | ue(v) |
| omi_mask_id_length_minus1 | ue(v) |
| omi_mask_sample_value_length_minus8 | ue(v) |
| omi_mask_confidence_info_present_flag | u(1) |
| if( omi_mask_confidence_info_present_flag ) | ue(v) |
| omi_mask_confidence_length_minus1 | u(4) |
| omi_mask_depth_info_present_flag | u(1) |
| if( omi_mask_depth_info_present_flag ) | u(1) |
| omi_mask_depth_length_minus1 | u(4) |
| omi_mask_label_info_present_flag | u(1) |
| if( omi_mask_label_info_present_flag ) { | |
| omi_mask_label_language_present_flag | u(1) |
| if( omi_mask_label_language_present_flag ) { | |
| while( !byte_aligned( ) ) | u(1) |
| omi_bit_equal_to_zero | f(1) |
| omi_mask_label_language | st(v) |
| } | |
| } | |
| for( i = 0; i < omi_num_aux_pic_layer; i++ ) { | |
| omi_mask_pic_update_flag[ i ] | f(1) |
| if( omi_mask_pic_update_flag[ i ] ) { | |
| omi_num_mask_in_pic_update[ i ] | ue(v) |
| for( j = 0; j < omi_num_mask_in_pic_update[ i ]; j++ ) { | |
| omi_mask_id[ i ][ j ] | u(v) |
| omi_aux_sample_value[ i ][ j ] | u(v) |
| omi_mask_cancel[ i ][ j ] | u(1) |
| if( !omi_mask_cancel[ i ][ j ] ) { | |
| omi_mask_bounding_box_present_flag[ i ][ j ] | u(1) |
| if( omi_mask_bounding_box_present_flag[ i ][ j ]){ | |
| omi_mask_top[ i ][ j ] | u(16) |
| omi_mask_left[ i ][ j ] | u(16) |
| omi_mask_width[ i ][ j ] | u(16) |
| omi_mask_height[ i ][ j ] | u(16) |
| } | |

FIG. 30B

| | |
|---|---|
| if( omi_mask_confidence_info_present_flag ) | |
| omi_mask_confidence[ i ][ j ] | u(v) |
| if( omi_mask_depth_info_present_flag ) | |
| omi_mask_depth[ i ][ j ] | u(v) |
| while( !byte_aligned( ) ) | |
| omi_bit_equal_to_zero | f(1) |
| if( omi_mask_label_info_present_flag ) | |
| omi_mask_label[ i ][ j ] | st(v) |
| } | |
| } | |
| } | |
| } | |
| } | |
| } | |

FIG. 31

| sei_processing_order( payloadSize ) { | Descriptor |
|---|---|
| po_id | u(8) |
| po_num_sei_messages_minus2 | u(8) |
| for( i = 0, i < po_num_sei_messages_minus2 + 2; i++ ) { | |
| po_sei_wrapping_flag[ i ] | u(1) |
| po_sei_importance_flag[ i ] | u(1) |
| po_sei_payload_type[ i ] | u(13) |
| po_sei_prefix_flag[ i ] | u(1) |
| po_sei_processing_order[ i ] | u(8) |
| } | |
| for( i = 0; i < po_num_sei_messages_minus2 + 2; i++ ) | |
| if( po_sei_prefix_flag[ i ] ) { | |
| po_num_bits_in_prefix_indication_minus1[ i ] | u(8) |
| for( j = 0; j <= po_num_bits_in_prefix_ indication_minus1[ i ]; j++ ) | |
| po_sei_prefix_data_bit[ i ][ j ] | u(1) |
| while( !byte_aligned( ) ) | |
| po_byte_alignment_bit_equal_to_one /* equal to 1 */ | f(1) |
| } | |
| } | |

FIG. 32

| processing_order_nesting( payloadSize ) { | Descriptor |
|---|---|
| pon_num_po_ids_minus1 | u(8) |
| for( i = 0; i <= pon_num_po_ids_minus1; i++ ) | |
| pon_target_po_id[ i ] | u(8) |
| pon_num_seis_minus1 | u(8) |
| for( i = 0; i <= pon_num_seis_minus1; i++ ) { | |
| pon_processing_order[ i ] | u(8) |
| sei_message( ) | |
| } | |
| } | |

FIG. 33

| encoder_optimization_info(payloadSize ) { | Descriptor |
|---|---|
| eoi_cancel_flag | u(1) |
| if( !eoi_cancel_flag ) { | |
| eoi_persistence_flag | u(1) |
| eoi_for_human_viewing_idc | u(2) |
| eoi_for_machine_analysis_idc | u(2) |
| eoi_type | u(16) |
| if( EoiObjectBasedFlag ) | |
| eoi_object_based_idc | ue(v) |
| if( EoiTemporalResamplingFlag ) { | |
| eoi_temporal_resampling_type_flag | u(1) |
| eoi_num_int_pics | ue(v) |
| } | |
| if(EoiSpatialResamplingFlag) | |
| eoi_spatial_resampling_type_flag | u(1) |
| if( EoiPrivacyProtectionFlag ) { | |
| eoi_privacy_protection_type_idc | u(4) |
| eoi_privacy_protected_info_type | u(8) |
| } | |
| } | |
| } | |

FIG. 34

| text_description( payloadSize ) { | Descriptor |
|---|---|
| txt_descr_id | u(14) |
| txt_cancel_flag | u(1) |
| if( !txt_cancel_flag ) { | |
| txt_persistence_flag | u(1) |
| txt_descr_purpose | u(8) |
| txt_num_strings_minus1 | u(8) |
| for( i = 0; i <= txt_num_strings_minus1; i++ ) { | |
| txt_descr_string_lang[ i ] | st(v) |
| txt_descr_string[ i ] | st(v) |
| } | |
| } | |
| } | |

IMAGE ENCODING METHOD, IMAGE ENCODING APPARATUS, IMAGE DECODING METHOD, IMAGE DECODING APPARATUS, METHOD OF TRANSMITTING BITSTREAM, AND RECORDING MEDIUM STORING BITSTREAM

CROSS-REFERENCE TO RELATED APPLICATIONS

This application is a continuation of International Application No. PCT/KR2025/009340, filed on Jul. 1, 2025, which claims the benefit of U.S. Provisional Application No. 63/666,648, filed on Jul. 1, 2024. The disclosures of the prior applications are incorporated by reference in their entirety.

TECHNICAL FIELD

Embodiments relate to an image encoding method, an image encoding apparatus, an image decoding method, an image decoding apparatus, a method of transmitting a bitstream, and a recording medium storing the bitstream.

BACKGROUND

Recently, the demand for high-resolution and high-quality images, high definition (HD) images and ultra high definition (UHD) images, has been increasing in various fields. As resolution and quality of image data are improved, the amount of information or the number of bits to be transmitted increases compared to existing image data. The increase in the amount of information or number of bits to be transmitted leads to an increase in transmission and storage costs.

Accordingly, there is a need for high-efficiency image compression technology capable of effectively transmitting, storing, and reproducing information of high-resolution, high-quality images.

SUMMARY

Embodiments provide an image encoding method, an image encoding apparatus, an image decoding method, an image decoding apparatus, a method of transmitting a bitstream, and a recording medium storing the bitstream.

Embodiments provide an image encoding method, an image encoding apparatus, an image decoding method, an image decoding apparatus, a method of transmitting a bitstream, and a recording medium storing the bitstream which exhibit improved encoding and decoding efficiency.

The scope of the embodiments is not limited to the aforementioned objects, and may also cover other objects that can be inferred by those skilled in the art based on the entire content disclosed herein.

A method according to embodiments may include acquiring a supplemental enhancement information (SEI) message for source pictures, and decoding output pictures related to the source pictures. A method according to embodiments may include acquiring source pictures, generating an SEI message for the source pictures, and encoding output pictures related to the source pictures.

Embodiments may provide an image encoding/decoding method and apparatus with improved encoding/decoding efficiency.

Embodiments may provide a non-transitory computer-readable recording medium storing a bitstream generated by the image encoding method.

Embodiments may provide a non-transitory computer-readable recording medium storing a bitstream that is received and decoded by the image decoding apparatus and used for reconstructing images.

Embodiments may provide a method of transmitting a bitstream generated by the image encoding method.

The effects obtainable from the present disclosure are not limited to those mentioned above, and other effects not mentioned will be clearly understood by those skilled in the art to which the present disclosure pertains from the following description.

BRIEF DESCRIPTION OF THE DRAWINGS

The accompanying drawings, which are included to provide a further understanding of the disclosure, illustrate embodiments of the disclosure together with the description related to the embodiments. For a better understanding of various embodiments described below, reference should be made to the description of the following embodiments in connection with the accompanying drawings. The same reference numbers will be used throughout the drawings to refer to the same or like parts.

FIGS. 23A, 23B, 23C, 23D, and 23E illustrate picture_header_structure according to embodiments.

FIGS. 24A, 24B, and 24C illustrate syntax for a neural-network post-filter characteristics SEI message according to embodiments.

FIG. 27 illustrates syntax of a neural-network post-filter group characteristics SEI message according to embodiments.

FIG. 28 illustrates syntax of a neural-network post-filter group activation SEI message according to embodiments.

FIG. 29 illustrates source picture timing information according to embodiments.

FIGS. 30A and 30B illustrate an object mask information SEI message according to embodiments.

FIG. 31 illustrates an SEI processing order SEI message according to embodiments.

FIG. 32 illustrates a processing order nesting SEI message according to embodiments.

FIG. 33 illustrates syntax for an encoder optimization information SEI message according to embodiments.

FIG. 34 illustrates syntax for a text description information SEI message according to embodiments.

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain preferred embodiments of the present disclosure, rather than to show the only embodiments that can be implemented according to the present disclosure. The following detailed description includes details to provide a thorough understanding of the embodiments. However, it will be apparent to those skilled in the art that the embodiments can be practiced without such details.

Most of the terms used in the embodiments have been selected from general ones widely used in the art, but some terms have been arbitrarily selected by the applicant, and their meanings are explained in detail in the following description as needed. Thus, the embodiments should be understood based upon the intended meanings of the terms rather than their simple names or meanings.

Embodiments include a method and an apparatus for signaling the number of temporal sublayers in an SPTI SEI message for a coded video bitstream. Embodiments include a method of signaling the number of temporal sublayers in an SPTI SEI message for a coded video bitstream. Although the described method is based on Versatile Video Coding (VVC) and Versatile Supplemental Enhancement Information Messages for Coded Video Bitstreams (VSEI), it is also applicable to other video coding techniques.

Related Technical Field: Versatile Video Coding (VVC), Versatile supplemental enhancement information messages for coded video bitstreams (VSEI), Additional SEI messages for VSEI (Draft 3), SEI processing order and processing order nesting SEI messages in VVC (Draft 7), Technologies under consideration for future extensions of VSEI (Draft 4), SEI messages for VSEI version 4 (Draft 2).

Figure 1:
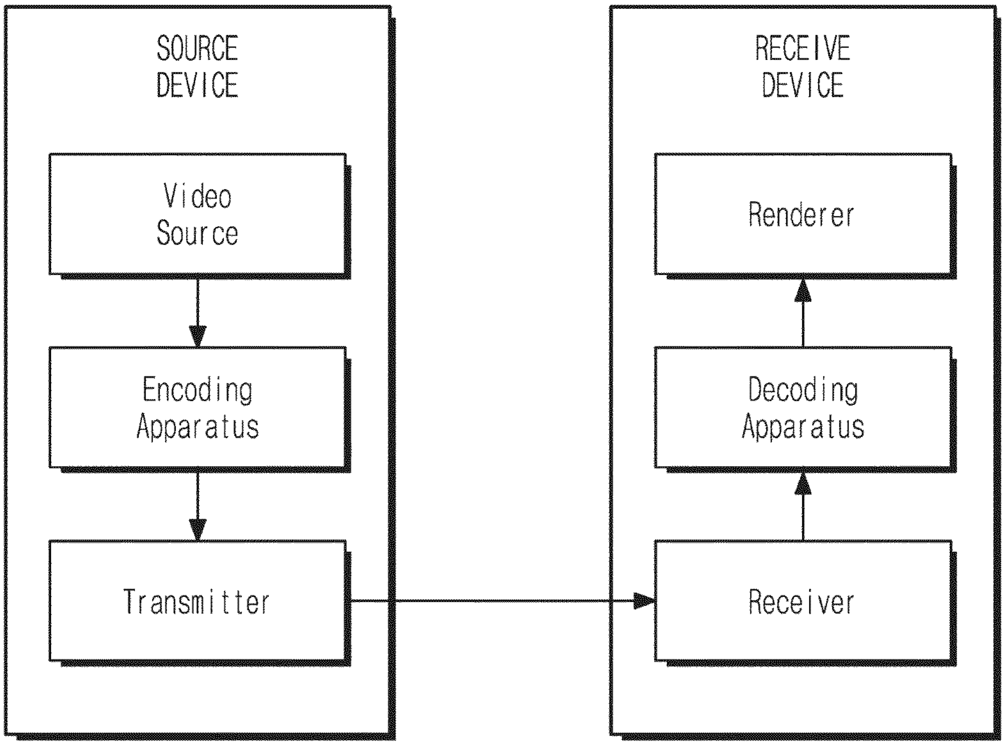
FIG. 1 illustrates a video and/or image coding system according to embodiments.

FIG. 1 illustrates a video and/or image coding system according to embodiments.

As shown in FIG. 1, a video/image coding system may include a first device (source device) and a second device (receive device). The source device may deliver encoded video/image information or data to the receive device over a digital storage medium or network in the form of a file or streaming.

The source device may include a video source, an encoding apparatus, and a transmitter. The receive device may include a receiver, a decoding apparatus, and a renderer. The encoding apparatus may be referred to as a video/image encoding apparatus, and the decoding apparatus may be referred to as an video/image decoding apparatus. A transmitter may be included in the encoding apparatus, and a receiver may be included in the decoding apparatus. The renderer may include a display. The display may be implemented as a separate device or an external component.

The video source may acquire video/images through operations such as capturing, synthesizing, or generating video/images. The video source may include a video/image capture device and/or a video/image generation device. The video/image capture device may include, for example, one or more cameras, and a video/image archive containing previously captured video/images. The video/image generation device may include, for example, a computer, a tablet, and a smartphone, and may (electronically) generate video/images. For example, virtual video/images may be generated through a computer or the like. In this case, the video/image capturing process may be replaced with a process of generating related data.

The encoding apparatus may encode input video/images. The encoding apparatus may perform a series of procedures such as prediction, transform, and quantization for compression and coding efficiency. The encoded data (encoded video/image information) may be output in the form of a bitstream.

The transmitter may deliver the encoded video/image information or data output in the form of a bitstream to the receiver of the receive device over a digital storage medium or a network, in the form of a file or streaming. The digital storage medium may include various storage media such as USB, SD, CD, DVD, Blu-ray, HDD, and SSD. The transmitter may include an element for generating a media file in a predetermined file format and include an element for transmission over a broadcasting/communication network. The receiver may receive/extract the bitstream and deliver the same to the decoding apparatus.

The decoding apparatus may perform a series of procedures, such as dequantization, inverse transform, and prediction, corresponding to the operations of the encoding apparatus, to decode the video/images.

The renderer may render the decoded video/images. The rendered video/images may be displayed through the display.

The present disclosure relates to video/image coding. For example, the methods/embodiments disclosed herein may be applied to methods disclosed in the VVC (Versatile Image Coding) standard, EVC (Essential Image Coding) standard, AV1 (AOMedia Image 1) standard, AVS2 (2nd generation of audio image coding standard), or next-generation video/image coding standards (e.g., H.267 or H.268).

This document presents various embodiments related to video/image coding, and unless otherwise specified, the embodiments may be implemented in combination with one another.

In this document, the term "video" may refer to a series of images over time. A "picture" generally refers to a unit representing one image in a specific time period, and a "slice"/"tile" refers to a unit constituting part of a picture in coding. A slice/tile may include one or more coding tree units (CTUs). A picture may include one or more slices/tiles. A picture may include one or more tile groups. A tile group may include one or more tiles. A brick may represent a rectangular area of CTU rows within a tile in a picture.

A brick may represent a rectangular area of CTU rows within a tile in a picture. A tile may be partitioned into multiple bricks, and each brick consists of one or more CTU rows within the tile. A tile not partitioned into multiple bricks may also be referred to as a brick. Brick scanning is specific sequential ordering of CTUs into which a picture is partitioned. In a brick, CTUs are consecutively ordered by CTU raster scan. In a tile, bricks are consecutively ordered by brick raster scan of the tile. In a picture, tiles are consecutively ordered by tile raster scan of the picture. A tile is a rectangular region of CTUs within a particular tile column and a particular tile row in a picture. A tile column is a rectangular region of CTUs having the same height as the picture and a width specified by a syntax element in the picture parameter set. A tile row is a rectangular region of CTUs having a height specified by a syntax element in the picture parameter set and the same width as the picture. Tile scanning is specific sequential ordering of CTUs into which a picture is partitioned. In a tile, CTUs are consecutively ordered by CTU raster scan. In a picture, tiles are consecutively ordered by tile raster scan. A slice contains an integer number of bricks of a picture and may be exclusively included in a single NAL unit. A slice may consist of multiple complete tiles or a sequence of complete bricks of a tile that are arranged consecutively.

In this document, tile groups and slices may be used interchangeably. For example, a "tile group/tile group header" may be referred to as a "slice/slice header."

The term "pixel" or "pel" may refer to the smallest unit constituting a picture (or image). The term "sample" may also be used as a term corresponding to a pixel. A sample may generally represent a pixel or the value of a pixel, and it may represent only a pixel/pixel value of a luma component or only a pixel/pixel value of a chroma component.

A "unit" may refer to a basic unit of image processing. A unit may include at least one of a specific region of a picture and information related to the region. One unit may include one luma block and two chroma (e.g., cb, cr) blocks. A unit may also be used interchangeably with terms such as "block" or "area." In a general, an M×N block may include samples (or a sample arrays) or a set (or array) of transform coefficients of M columns and N rows.

Figure 2:
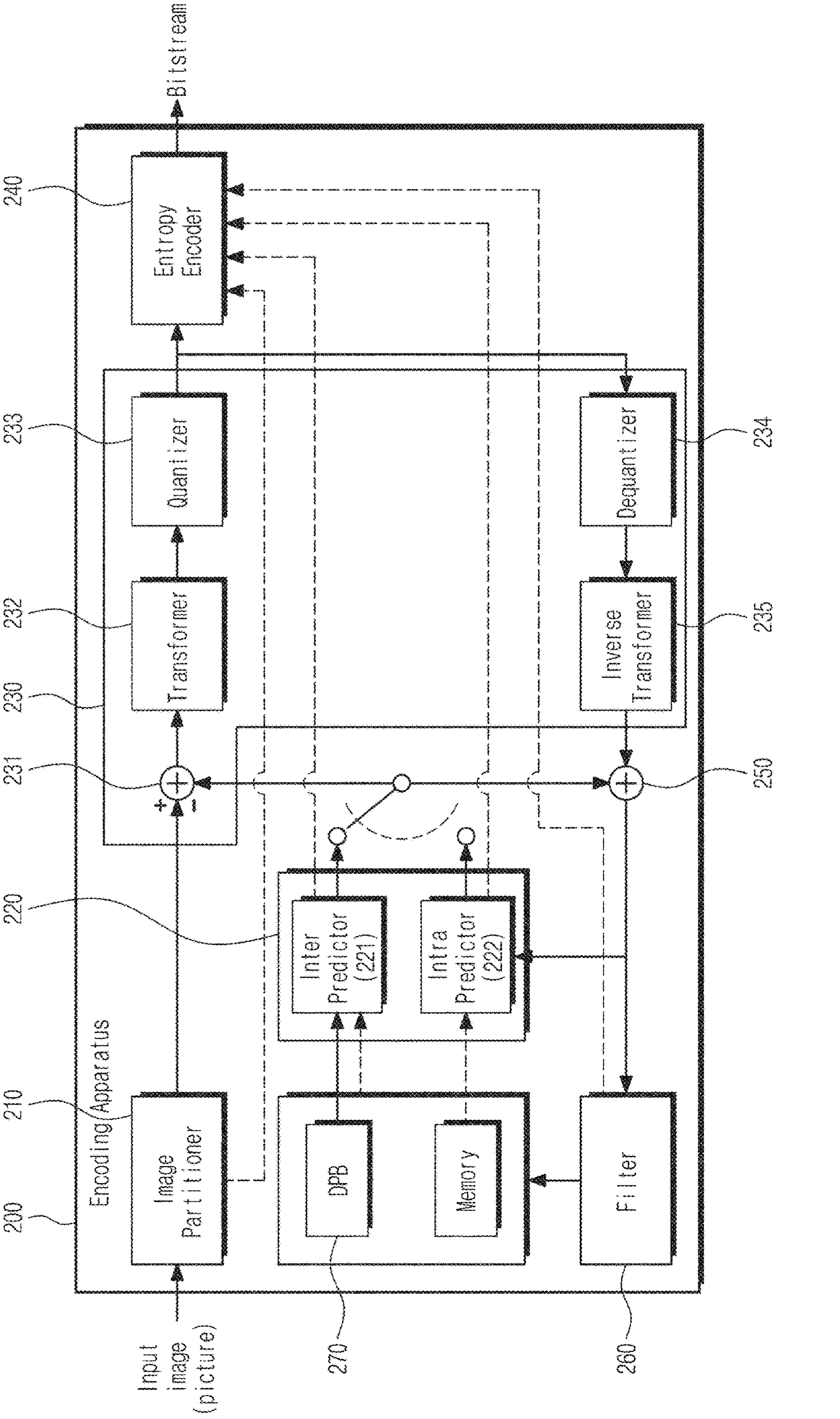
FIG. 2 illustrates an encoding apparatus according to embodiments.

FIG. 2 illustrates an encoding apparatus according to embodiments.

FIG. 2 is a schematic block diagram of an encoding apparatus to which the embodiment(s) of the present document may be applied and in which encoding is performed on a video/image signal.

As shown in FIG. 2, the encoding apparatus 200 may include an image partitioner 210, a a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to embodiments. In addition, the memory 270 may include a decoded picture buffer (DPB) or may be configured by a digital storage medium. The hardware component may further include the memory 270 as an internal/external component.

The image partitioner 210 may partition an input image (picture or frame) input to the encoding apparatus 200 into one or more processing units. For example, the processing unit may be referred to as a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into multiple coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final CU that is no longer partitioned. In this case, the LCU may be used as the final CU based on coding efficiency according to image characteristics, or, if necessary, the CU may be recursively partitioned into CUs of deeper depth such that a CU having an optimal size may be used as the final CU. Here, the coding procedure may include a procedure of prediction, transform, and reconstruction, which will be described later. As another example, the processing unit may further include a prediction unit (PU) or a transform unit (TU). In this case, the PU and the TU may each be split or partitioned from the aforementioned final CU. The PU may be a unit of sample prediction, and the TU may be a unit of derivation of a transform coefficient and/or a unit of derivation of a residual signal from the transform coefficient.

The term "unit" may be used interchangeably with terms such as block or area in some cases. In a general case, an M×N block may represent a set of samples or transform coefficients composed of M columns and N rows. A sample may generally represent a pixel or the value of a pixel, or may represent only a pixel/pixel value of a luma component or only a pixel/pixel value of a chroma component. A sample may be used as a term corresponding to a pixel or pel in a picture (or image).

The encoding apparatus 200 may subtract a prediction signal (predicted block, predicted sample array) output from the inter predictor 221 or the intra predictor 222 from an input image signal (original block, original sample array) to generate a residual signal (residual block, residual sample array), and the generated residual signal is transmitted to the transformer 232. In this case, as shown in the figure, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information about prediction, such as prediction mode information, and transmit the generated information to the entropy encoder 240. The information about prediction may be encoded by the entropy encoder 240 and output in the form of a bitstream.

The intra predictor 222 may predict the current block by referencing the samples in the current picture. The referenced samples may be located in the neighborhood of the current block or may be located at a distance according to the prediction mode. In the intra prediction, prediction modes may include a plurality of non-directional modes and a plurality of directional modes. The non-directional modes may include, for example, a DC mode and a planar mode. The directional modes may include, for example, 33 directional prediction modes or 65 directional prediction modes according to the degree of detail of the prediction direction. However, this is merely an example, more or less directional prediction modes may be used depending on the settings. The intra predictor 222 may determine the prediction mode applied to the current block based on the prediction modes applied to neighboring blocks.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted on a per block, sub-block, or sample basis based on the correlation of motion information between the neighboring block and the current block. The motion information may include a motion vector and a reference picture index. The motion information may further include inter prediction direction information (L0 prediction, L1 prediction, Bi prediction, etc.). In the case of inter prediction, the neighboring blocks may include a spatial neighboring block present in the current picture and a temporal neighboring block present in the reference picture. The reference picture containing the reference block and the reference picture containing the temporal neighboring block may be the same or different. The temporal neighboring block may be referred to as a collocated reference block, a collocated CU (colCU), and the like, and the reference picture containing the temporal neighboring block may be referred to as a collocated picture (colPic). For example, the inter predictor 221 may configure a motion information candidate list based on neighboring blocks and generate information indicating which candidate is used to derive the motion vector and/or reference picture index for the current block. Inter prediction may be performed based on various prediction modes. For example, in the case of a skip mode and a merge mode, the inter predictor 221 may use motion information about neighboring blocks as the motion information about the current block. In the skip mode, unlike the merge mode, the residual signal may not be transmitted. In the motion vector prediction (MVP) mode, the motion vector of a neighboring block may be used as a motion vector predictor, and a motion vector difference may be signaled to indicate the motion vector of the current block.

The predictor 220 may generate a prediction signal based on various prediction methods described below. For example, the predictor may apply intra prediction or inter prediction, or apply both intra prediction and inter prediction simultaneously to predict a block, which may be called combined inter and intra prediction (CIP). In addition, the predictor may be based on an intra block copy (IBC) prediction mode or a palette mode for prediction of a block. The IBC prediction mode or palette mode may be used for content image/video coding of a game or the like such as, for example, screen content coding (SCC). The IBC basically performs prediction in the current picture, but may be performed similarly to inter prediction in that a reference block is derived in the current picture. The IBC may use at least one of the inter prediction techniques described in this document. The palette mode may be considered as an example of intra coding or intra prediction. When the palette mode is applied, a sample value within a picture may be signaled based on information about the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT refers to a transform obtained from a graph representing the relationship information between pixels. The CNT refers to a transform generated based on a prediction signal generated using all previously reconstructed pixels. In addition, the transform process may be applied to square pixel blocks having the same size or may be applied to non-square blocks having a variable size.

The quantizer 233 may quantize the transform coefficients and transmit the same to the entropy encoder 240, and the entropy encoder 240 may encode the quantized signal (information about the quantized transform coefficients) and output a bitstream. The information about the quantized transform coefficients may be referred to as residual information. The quantizer 233 may rearrange block type quantized transform coefficients into a one-dimensional vector form based on a coefficient scan order, and generate information about the quantized transform coefficients based on the quantized transform coefficients in the one-dimensional vector form. The entropy encoder 240 may perform various encoding methods such as, for example, exponential Golomb, context-adaptive variable length coding (CAVLC), and context-adaptive binary arithmetic coding (CABAC). The entropy encoder 240 may encode, together with or separately from the quantized transform coefficients, other information necessary for video/image reconstruction (e.g., values of syntax elements, etc.). The encoded information (e.g., encoded video/image information) may be transmitted or stored in units of network abstraction layer (NAL) in the form of a bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, and SSD. A transmitter (not shown) configured to transmit a signal output from the entropy encoder 240 and/or a storage unit (not shown) storing the signal may be included as internal/external element of the encoding apparatus 200. Alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 155 may add the reconstructed residual signal to the prediction signal output from the inter predictor 221 or the intra predictor 222 to generate a reconstructed signal (reconstructed picture, reconstructed block, reconstructed sample array). In cases where there is no residual for the block to be processed, such as a case where the skip mode is applied, the predicted block may be used as the reconstructed block. The adder 250 may be referred to as a reconstructor or a reconstructed block generator. The generated reconstructed signal may be used for intra prediction of the next block to be processed in the current picture, or may be used for inter prediction of the next picture through filtering as described below.

Luma mapping with chroma scaling (LMCS) may be applied during the picture encoding and/or reconstruction.

The filter 260 may apply filtering to the reconstructed signal to improve subjective/objective image quality. For example, the filter 260 may apply various filtering methods to the reconstructed picture to generate a modified reconstructed picture, and the modified reconstructed picture may be stored in the memory 270, specifically in the DPB of the memory 270. The various filtering methods may include, for example, deblocking filtering, a sample adaptive offset, an adaptive loop filter, and a bilateral filter. The filter 260 may generate various information related to the filtering and transmit the generated information to the entropy encoder 240, as described later in the description of each filtering method. The information related to the filtering may be encoded by the entropy encoder 240 and output in the form of a bitstream.

The modified reconstructed picture transmitted to the memory 270 may be used as the reference picture by the inter predictor 221. Thus, when the inter prediction is applied through the encoding apparatus, prediction mismatch between the encoding apparatus 100 and the decoding apparatus may be avoided and encoding efficiency may be improved.

The DPB of the memory 270 may store the modified reconstructed picture for use as a reference picture by the inter predictor 221. The memory 270 may store the motion information about the block from which the motion information in the current picture is derived (or encoded) and/or the motion information about the blocks in the picture that have already been reconstructed. The stored motion information may be transferred to the inter predictor 221 so as to be used as the motion information about the spatial neighboring block or the motion information about the temporal neighboring block. The memory 270 may store reconstructed samples of reconstructed blocks in the current picture and may transfer the reconstructed samples to the intra predictor 222.

Figure 3:
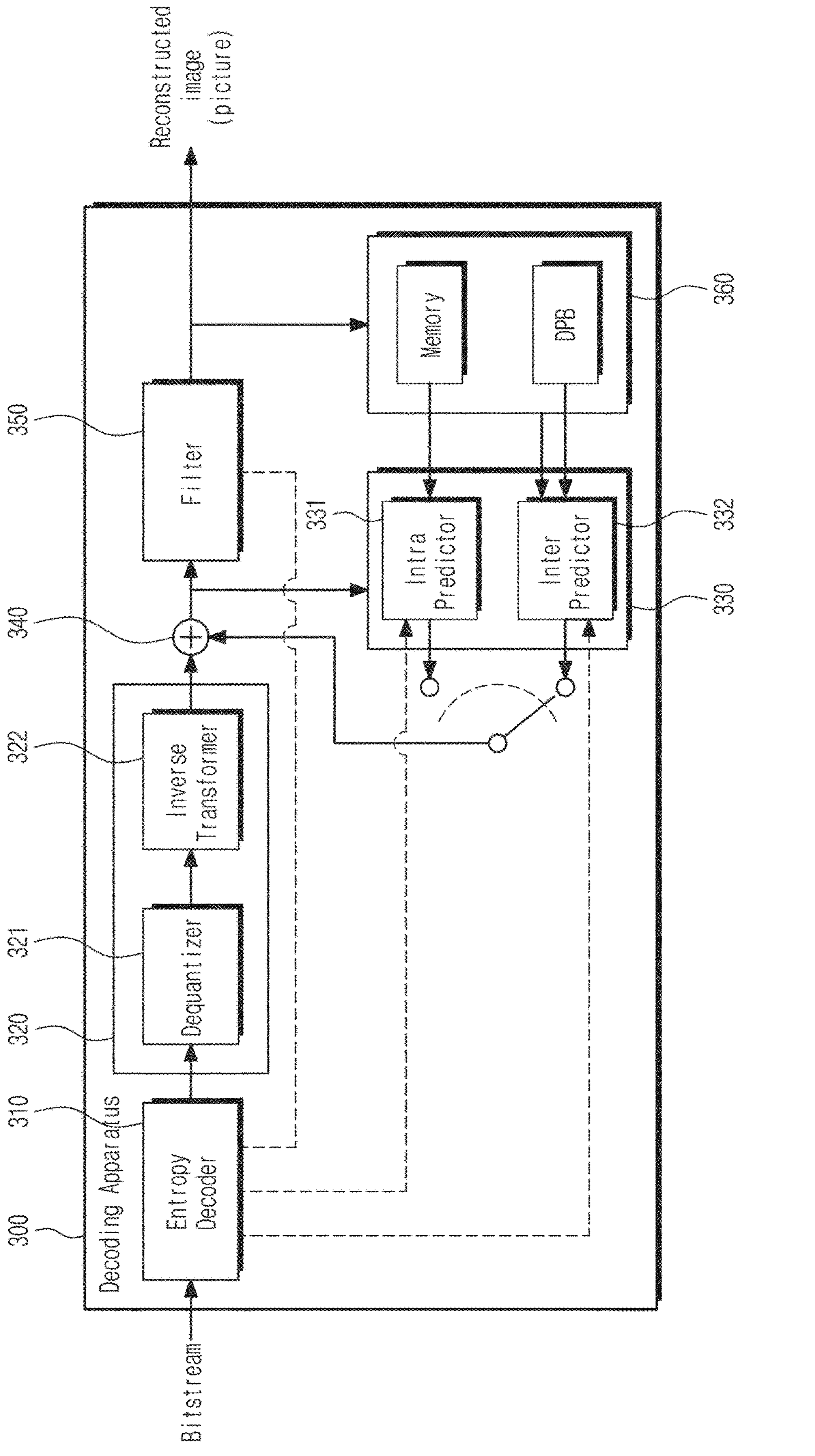
FIG. 3 illustrates a decoding apparatus according to embodiments.

FIG. 3 illustrates a decoding apparatus according to embodiments.

FIG. 3 is a schematic block diagram of a decoding apparatus to which the embodiment(s) of the present disclosure may be applied and in which decoding is performed on a video/image signal.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream containing video/image information is input, the decoding apparatus 300 may reconstruct an image corresponding to a process in which the video/image information is processed by the encoding apparatus of FIG. 2. For example, the decoding apparatus 300 may derive units/blocks based on block partition related information obtained from the bitstream. The decoding apparatus 300 may perform decoding using a processing unit applied in the encoding apparatus. Thus, the processing unit for decoding may be, for example, a coding unit. The coding unit may be partitioned from the coding tree unit or the largest coding unit according to a quad tree structure, binary tree structure and/or ternary tree structure. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information about various parameter sets such as an adaptation parameter set (APS), a picture parameter set (PPS), a sequence parameter set (SPS), or a video parameter set (VPS). In addition, the video/image information may further include general constraint information. The decoding apparatus may further decode a picture based on the information about the parameter set and/or the general constraint information. Signaled/received information and/or syntax elements described later in this document may be decoded through the decoding procedure and obtained from the bitstream. For example, the entropy decoder 310 may decode the information in the bitstream based on a coding method such as exponential Golomb coding, CAVLC, or CABAC, and output values of syntax elements required for image reconstruction and quantized values of transform coefficients related to residual. More specifically, the CABAC entropy decoding method may include receiving a bin corresponding to each syntax element in the bitstream, determining a context model based on decoding target syntax element information, decoding information related to a decoding target block or information about a symbol/bin decoded in a previous stage, and performing arithmetic decoding on the bin by predicting a probability of occurrence of the bin according to the determined context model, and generating a symbol corresponding to the value of each syntax element. In this case, the CABAC entropy decoding method may include updating the context model based on the information about the decoded symbol/bin for a context model of a next symbol/bin after determining the context model. The information related to the prediction in the information decoded by the entropy decoder 310 may be provided to the predictor (the inter predictor 332 and the intra predictor 331), and the residual values on which the entropy decoding has been performed by the entropy decoder 310, for example, the quantized transform coefficients and related parameter information, may be input to the residual processor 320. The residual processor 320 may derive the residual signal (the residual block, the residual samples, the residual sample array). In addition, information related to filtering in the information decoded by the entropy decoder 310 may be provided to the filter 350. A receiver (not shown) configured to receive a signal output from the encoding apparatus may be further configured as an internal/external element of the decoding apparatus 300. Alternatively, the receiver may be a component of the entropy decoder 310. The decoding apparatus according to this document may be referred to as a video/image/picture decoding apparatus. The decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output transform coefficients. The dequantizer 321 may rearrange the quantized transform coefficients in a two-dimensional block form. In this case, the rearrangement may be performed based on the order of coefficient scan performed by the encoding apparatus. The dequantizer 321 may dequantize the quantized transform coefficients based on a quantization parameter (e.g., quantization step size information) and obtain transform coefficients.

The inverse transformer 322 inversely transforms the transform coefficients to obtain a residual signal (residual block, residual sample array).

The predictor may predict the current block and generate a predicted block including prediction samples for the current block. The predictor may determine whether intra prediction or inter prediction is applied to the current block based on the information about the prediction output from the entropy decoder 310 and may determine a specific intra/inter prediction mode.

The predictor 320 may generate a prediction signal based on various prediction methods described below. For example, the predictor may apply intra prediction or inter prediction, or apply both intra prediction and inter prediction simultaneously to predict a block, which may be called combined inter and intra prediction (CIP). In addition, the predictor may be based on an intra block copy (IBC) prediction mode or a palette mode for prediction of a block. The IBC prediction mode or palette mode may be used for content image/video coding of a game or the like such as, for example, screen content coding (SCC). The IBC basically performs prediction in the current picture, but may be performed similarly to inter prediction in that a reference block is derived in the current picture. The IBC may use at least one of the inter prediction techniques described in this document. The palette mode may be considered as an example of intra coding or intra prediction. When the palette mode is applied, information about the palette table and the palette index may be signaled in the video/image information.

The intra predictor 222 may predict the current block by referencing the samples in the current picture. The referenced samples may be located in the neighborhood of the current block or may be located at a distance according to the prediction mode. In the intra prediction, prediction modes may include a plurality of non-directional modes and a plurality of directional modes. The intra predictor 331 may determine the prediction mode applied to the current block based on the prediction modes applied to neighboring blocks.

The inter predictor 332 may derive a predicted block for the current block based on a reference block (reference sample array) specified by a motion vector on a reference picture. Here, in order to reduce the amount of motion information transmitted in the inter prediction mode, the motion information may be predicted on a per block, sub-block, or sample basis based on the correlation of motion information between the neighboring block and the current block. The motion information may include a motion vector and a reference picture index. The motion information may further include inter prediction direction information (L0 prediction, L1 prediction, Bi prediction, etc.). In the case of inter prediction, the neighboring blocks may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information about the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). In cases where there is no residual for the block to be processed, such as a case where the skip mode is applied, the predicted block may be used as the reconstructed block.

The adder 340 may be referred to as a reconstructor or a reconstructed block generator. The generated reconstructed signal may be used for intra prediction of the next block to be processed in the current picture, may be output through filtering as described below, or may be used for inter prediction of a next picture.

Luma mapping with chroma scaling (LMCS) may be applied during the picture decoding.

The filter 350 may apply filtering to the reconstructed signal to improve subjective/objective image quality. For example, the filter 350 may apply various filtering methods to the reconstructed picture to generate a modified reconstructed picture, and transmit the modified reconstructed picture to the memory 360, specifically, a DPB of the memory 360. The various filtering methods may include, for example, deblocking filtering, a sample adaptive offset, an adaptive loop filter, and a bilateral filter.

The (modified) reconstructed picture stored in the DPB of the memory 360 may be used as a reference picture by the inter predictor 332. The memory 360 may store the motion information about the block from which the motion information in the current picture is derived (or decoded) and/or the motion information about the blocks in the picture that have already been reconstructed. The stored motion information may be transmitted to the inter predictor 260 so as to be used as the motion information about the spatial neighboring block or the motion information about the temporal neighboring block. The memory 360 may store reconstructed samples of reconstructed blocks in the current picture and transfer the reconstructed samples to the intra predictor 331.

In the present disclosure, the embodiments described in relation to the filter 260, the inter predictor 221, and the intra predictor 222 of the encoding apparatus 100 may be applied in the same or corresponding manner to the filter 350, the inter predictor 332, and the intra predictor 331 of the decoding apparatus 300.

Implementation and Application Examples

The embodiments described herein may be implemented and executed on a processor, microprocessor, controller, or chip. For example, the functional units shown in the figures may be implemented and executed on a computer, processor, microprocessor, controller, or chip. In this case, information for implementation (e.g., Information on instructions) or an algorithm may be stored in a digital storage medium.

In addition, the decoding apparatus and the encoding apparatus to which the embodiment(s) of the present document are applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an over the top video (OTT) device, an internet streaming service provider, a 3D video device, a virtual reality (VR) device, an augmented reality (AR) device, an video call video device, a transportation terminal (e.g. a vehicle (including an autonomous vehicle) terminal, an airplane terminal, a ship terminal, etc.) and a medical video device, and may be used to process an image signal or data. For example, the OTT video device may include a game console, a Blu-ray player, an Internet-connected TV, a home theater system, a smartphone, a tablet PC, and a digital video recoder (DVR).

In addition, the processing method to which the embodiment(s) of the present document are applied may be produced in the form of a program executed by a computer and may be stored in a computer-readable recording medium. Multimedia data having a data structure according to the embodiment(s) of this document may also be stored in the computer-readable recording medium. The computer-readable recording medium includes all kinds of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media implemented in the form of a carrier wave (e.g., transmission over the Internet). In addition, a bitstream generated by the encoding method may be stored in the computer-readable recording medium or transmitted over a wired or wireless communication network.

In addition, the embodiment(s) of the present document may be implemented as a computer program product based on a program code, and the program code may be executed on a computer by the embodiment(s) of this document. The program code may be stored on a carrier readable by a computer.

Figure 4:
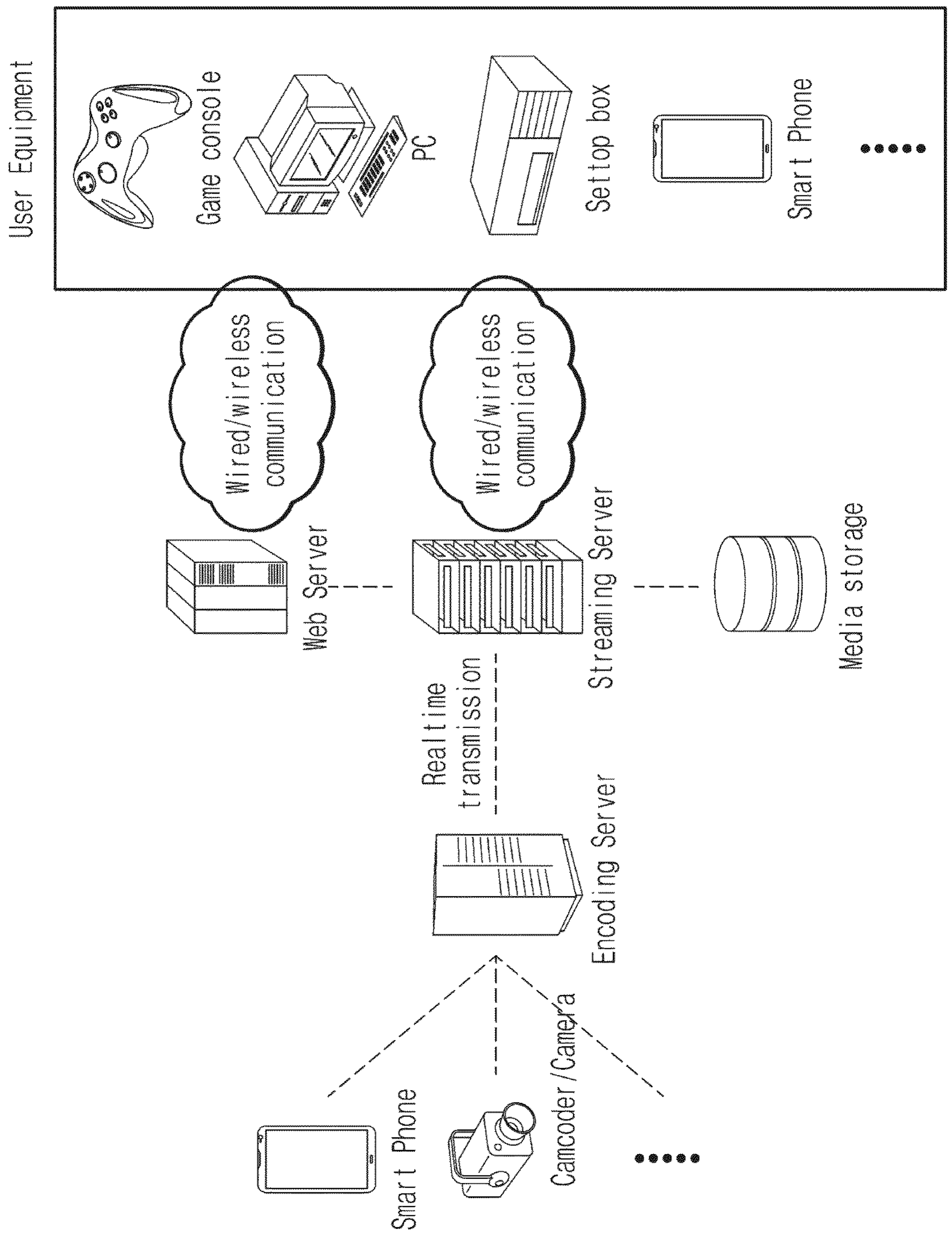
FIG. 4 illustrates the architecture of a content streaming system according to embodiments.

FIG. 4 illustrates the architecture of a content streaming system according to embodiments.

The content streaming system to which the embodiment(s) of the present document are applied may include an encoding server, a streaming server, a web server, a media storage, user equipment, and a multimedia input device.

The encoding server compresses content input from multimedia input devices such as a smartphone, a camera, and a camcorder into digital data to generate a bitstream and transmit the bitstream to the streaming server. As another example, when the multimedia input devices such as a smartphone, a camera, and a camcorder directly generate a bitstream, the encoding server may be omitted.

The bitstream may be generated by an encoding method or a bitstream generation method to which the embodiment(s) of the present document are applied, and the streaming server may temporarily store the bitstream in the process of transmitting or receiving the bitstream.

The streaming server transmits the multimedia data to the user equipment based on a user's request through the web server, and the web server serves as a medium for informing the user of services. When the user makes a request for a desired service to the web server, the web server delivers the same to the streaming server, and the streaming server transmits multimedia data to the user. In this regard, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user equipment may include a mobile phone, a smartphone, a laptop computer, a digital broadcasting terminal, a personal digital assistant (PDA), a portable multimedia player (PMP), a navigation system, a slate PC, a tablet PC, an ultrabook, a wearable device (e.g., a smartwatches, smart glasses, a head mounted display), a digital TV, a desktop computer, and digital signage.

Each server in the content streaming system may be operated as a distributed server. In this case, data received from each server may be processed in a distributed manner.

Partitioning Structure:

The video/image coding method according to this document may be performed based on a partitioning structure described below. Specifically, the procedures of prediction, residual processing ((inverse) transform, (de)quantization, etc.), syntax element coding, and filtering, which will be described later, may be performed based on a CTU and CU (and/or TU, PU) derived based on the partitioning structure. The block partitioning procedure may be performed by the image partitioner 210 of the encoding apparatus, and partitioning related information may be processed (encoded) by the entropy encoder 240 and transmitted to the decoding apparatus in the form of a bitstream. The entropy decoder 310 of the decoding apparatus may derive a block partitioning structure of the current picture based on the partitioning related information obtained from the bitstream, and may perform a series of procedures (e.g., prediction, residual processing, block/picture reconstruction, in-loop filtering, etc.) for image decoding based on the derived structure. The CU size may be equal to the TU size, or a plurality of TUs may be present in the CU region. The CU size may generally indicate a luma component (sample) CB size. The TU size may generally indicate a luma component (sample) TB size. A chroma component (sample) CB or TB size may be derived based on the luma component CB or TB size according to a component ratio based on a color format (chroma format, e.g., 4:4:4, 4:2:2, 4:2:0, etc.) of a picture/image. The TU size may be derived based on maxTbSize. For example, when the CU size is greater than the maxTbSize, a plurality of TUs (TBs) of the maxTbSize may be derived from the CU, and transform/inverse transform may be performed in units of the TU (TB). In addition, for example, when intra prediction is applied, an intra prediction mode/type may be derived in the CU (or CB) unit, and a neighboring reference sample derivation and prediction sample generation procedure may be performed in the TU (or TB) unit. In this case, one or a plurality of TUs (or TBs) may be present in one CU (or CB) region. In this case, the plurality of TUs (or TBs) may share the same intra prediction mode/type.

In addition, in video/image coding according to the present document, an image processor may have a hierarchical structure. One picture may be divided into one or more tiles, bricks, slices, and/or tile groups. One slice may include one or more bricks. One brick may include one or more CTU rows in a tile. A slice may include an integer number of bricks of a picture. One tile group may include one or more tiles. One tile may include one or more CTUs. The CTU may be partitioned into one or more CUs. A tile is a rectangular region of CTUs within a particular tile column and a particular tile row in a picture. The tile group may include an integer number of tiles according to a tile raster scan in the picture. The slice header may carry information/parameters that may be applied to the corresponding slice (blocks in the slice). When the encoding/decoding apparatus has a multi-core processor, the encoding/decoding procedures for tiles, slices, bricks, and/or tile groups may be processed in parallel. In this document, slices or tile groups may be used interchangeably. That is, the tile group header may be referred to as a slice header. Here, the slice may have one of slice types including intra (I) slice, predictive (P) slice, and bi-predictive (B) slice. For blocks in an I slice, inter prediction may not be used for prediction, and only intra prediction may be used. Of course, even in this case, the original sample value may be coded and signaled without prediction. Intra prediction or inter prediction may be used for blocks in the P slice, and only uni-prediction may be used when inter prediction is used. For blocks in the B slice, intra prediction or inter prediction may be used. When inter prediction is used, up to bi-prediction may be used.

The encoder determines tile/tile groups, bricks, slices, and largest and smallest coding unit sizes based on the characteristics of the video image (e.g., resolution) or in consideration of coding efficiency or parallel-processing, and corresponding information or information for deriving the same may be included in the bitstream.

The decoder may acquire information indicating whether a tile/tile group, a brick, a slice, or a CTU in a tile of the current picture is partitioned into a plurality of coding units. By allowing this information to be acquired (transmitted) only under certain conditions, efficiency may be increased.

The slice header (slice header syntax) may include information/parameters that may be commonly applied to the slice. The APS (APS syntax) or PPS (PPS syntax) may include information/parameters that may be commonly applied to one or more pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS).

In this document, the high level syntax may include at least one of the APS syntax, the PPS syntax, the SPS syntax, the VPS syntax, the DPS syntax, or the slice header syntax.

Also, for example, information on the partition and configuration of the tile/tile group/brick/slice may be configured at an encoding side through the high level syntax and transmitted to the decoding apparatus in the form of a bitstream.

Figure 5:
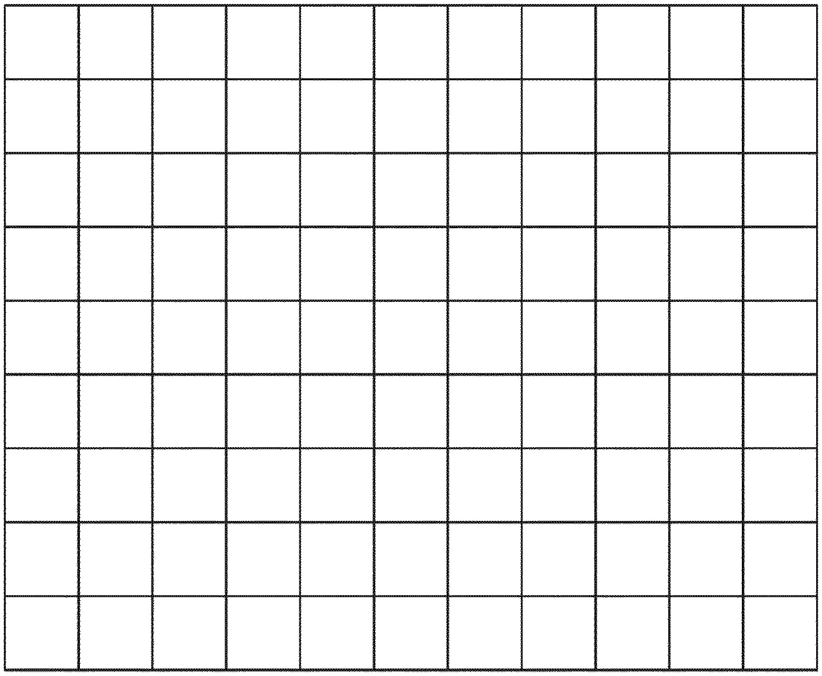
FIG. 5 illustrates an example of a picture partitioned into coding tree units (CTUs) according to embodiments.

FIG. 5 illustrates an example of a picture partitioned into coding tree units (CTUs) according to embodiments Partitioning of Picture into CTUs:

Pictures may be partitioned into a sequence of coding tree units (CTUs). The CTU may correspond to a coding tree block (CTB). Alternatively, the CTU may include a coding tree block of luma samples and two coding tree blocks of corresponding chroma samples. In other words, for a picture that contains three sample arrays, the CTU may include an N×N block of luma samples and two corresponding blocks of chroma samples. FIG. 5 shows an example of partitioning a picture into CTUs.

The maximum allowable size of the CTU for coding and prediction may be different from the maximum allowable size of the CTU for transform. For example, the maximum allowable size of the luma block in the CTU may be 128×128 (even if the maximum size of luma transform blocks is 64×64).

Figure 6:
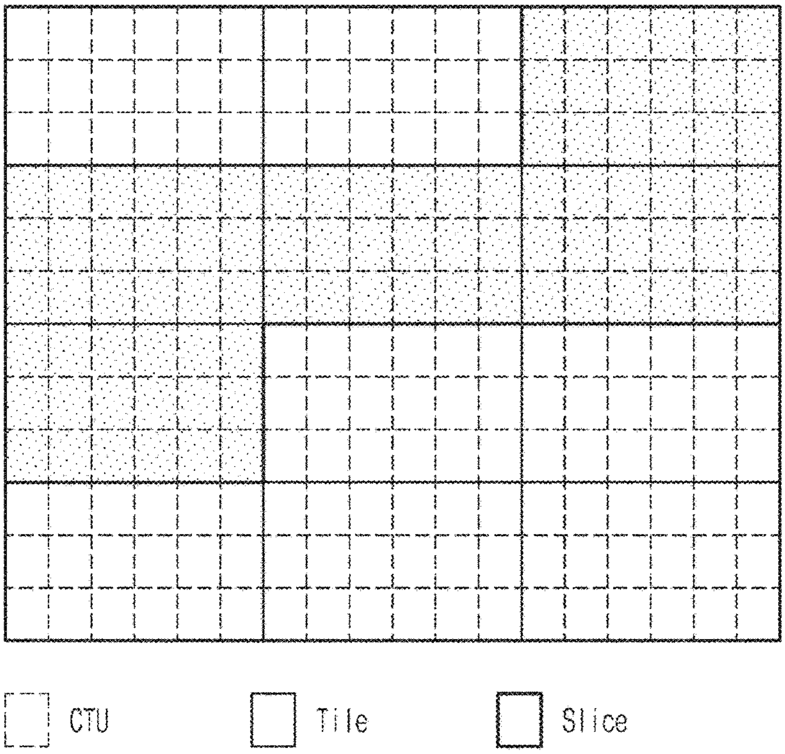
FIG. 6 illustrates an example of a picture partitioned into tiles and raster-scan slices according to embodiments.

FIG. 6 illustrates an example of a picture partitioned into tiles and raster-scan slices according to embodiments.

Partitioning of Pictures into Subpictures, Slices, and Tiles:

A picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

For slices, two modes are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to the slice.

A subpicture contains one or more slices that collectively cover a rectangular region of a picture.

FIG. 6 shows an example of raster-scan slice partitioning of a picture, where the picture is divided into 12 tiles and 3 raster-scan slices.

Figure 7:
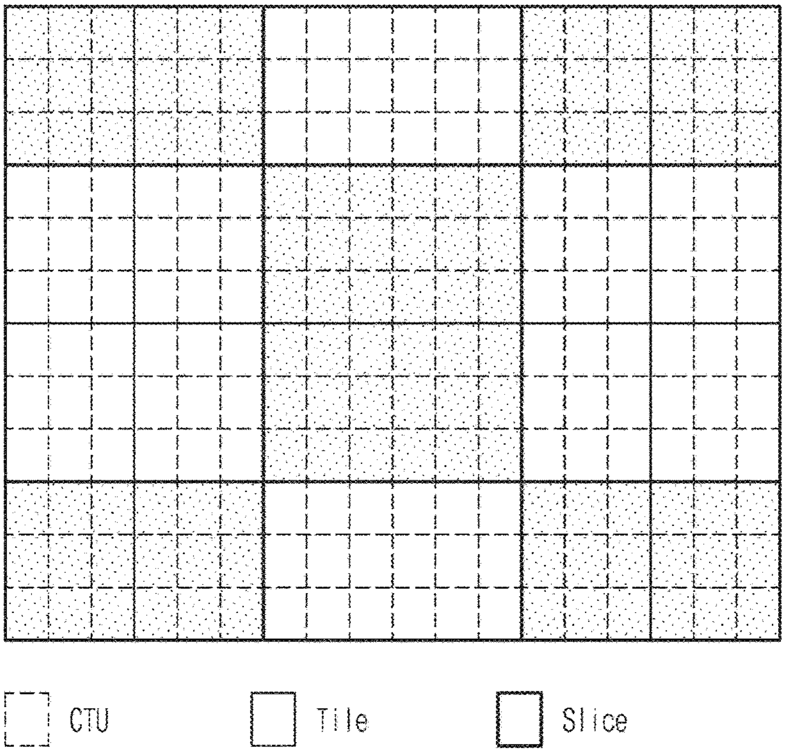
FIG. 7 illustrates another example of a picture partitioned into tiles and raster-scan slices according to embodiments.

FIG. 7 illustrates another example of a picture partitioned into tiles and raster-scan slices according to embodiments.

FIG. 7 shows an example of rectangular slice partitioning of a picture, where the picture is divided into 24 tiles (6 tile columns and 4 tile rows) and 9 rectangular slices.

Figure 8:
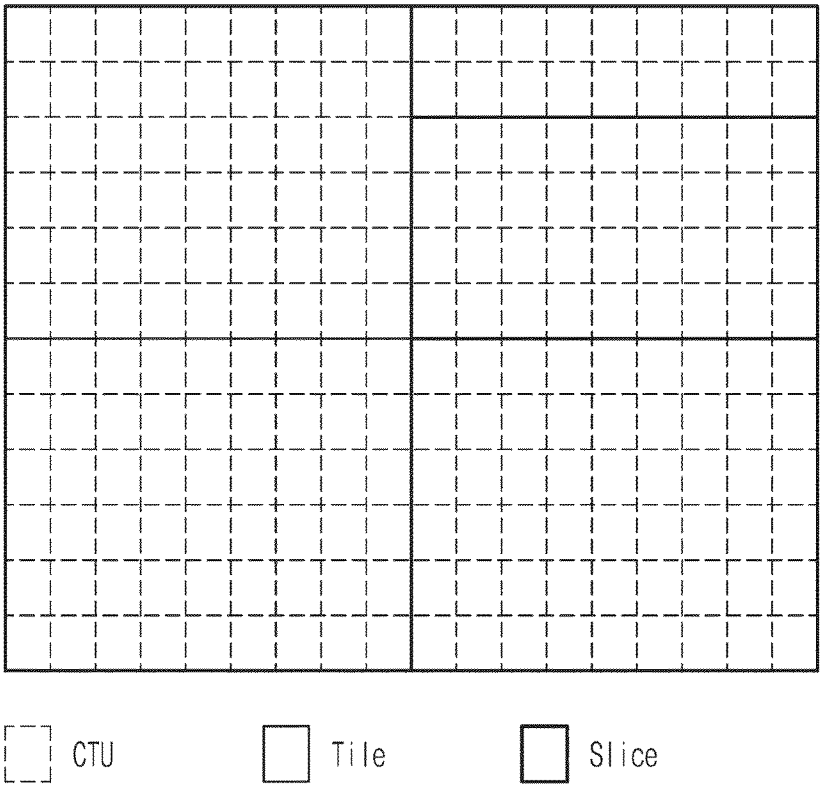
FIG. 8 illustrates an example of a picture partitioned into tiles, bricks, and rectangular slices according to embodiments.

FIG. 8 illustrates an example of a picture partitioned into tiles, bricks, and rectangular slices according to embodiments.

FIG. 8 shows an example of a picture partitioned into tiles and rectangular slices, where the picture is divided into 4 tiles (2 tile columns and 2 tile rows) and 4 rectangular slices.

Figure 9:
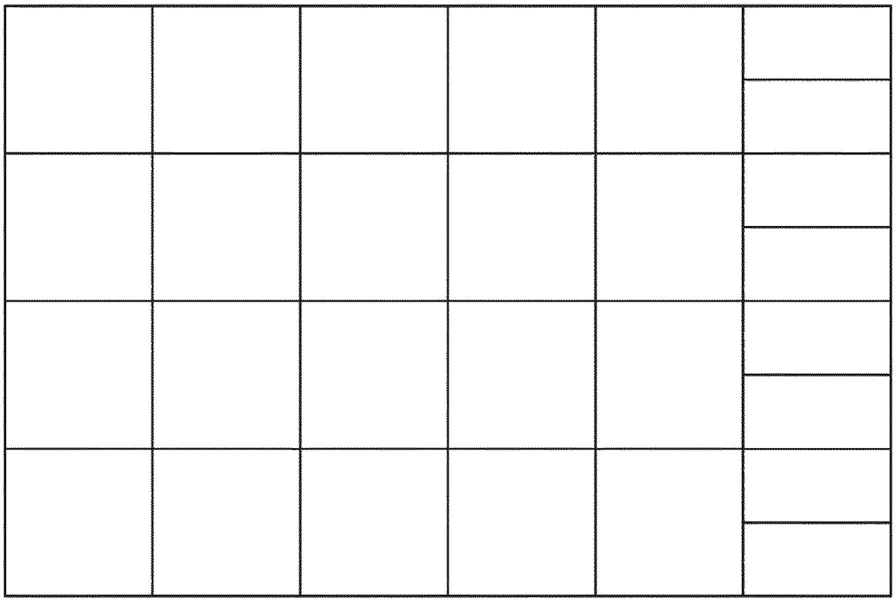
FIG. 9 illustrates an example of a picture including subpictures according to embodiments.

FIG. 9 illustrates an example of a picture including subpictures according to embodiments.

FIG. 9 shows an example of subpicture partitioning of a picture, where a picture is partitioned into 28 subpictures of various dimensions.

Figure 10:
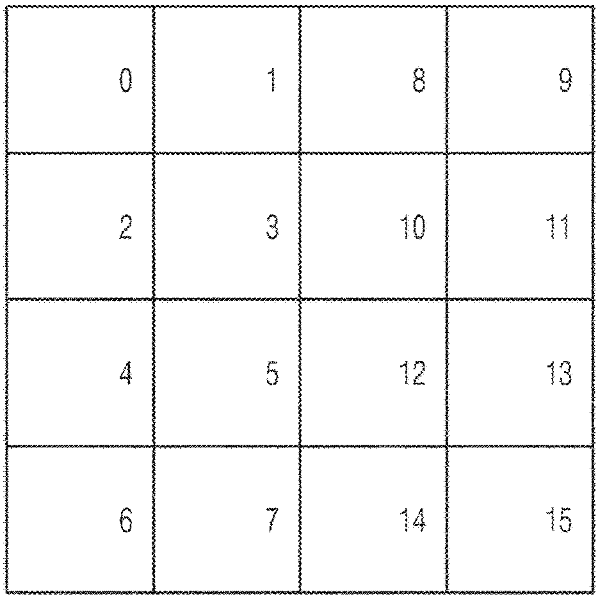
FIG. 10 illustrates an example of a picture including tiles and CTUs according to embodiments.

FIG. 10 illustrates an example of a picture including tiles and CTUs according to embodiments.

When a picture is coded using three separate color planes (separate_colour_plane_flag is equal to 1), a slice contains only CTUs of one color component identified by the corresponding value of colour_plane_id, and each color component array of a picture consists of slices having the same value of colour_plane_id. Coded slices with different values of colour_plane_id within a picture may be interleaved with each other under the constraint that for each value of colour_plane_id, the coded slice NAL units with that value of colour_plane_id shall be in the order of increasing CTU address in tile scan order for the first CTU of each coded slice NAL unit.

NOTE—When separate_colour_plane_flag is equal to 0, each CTU of a picture is contained in exactly one slice. When separate_colour_plane_flag is equal to 1, each CTU of a color component is contained in exactly one slice (i.e., information about each CTU of a picture is present in exactly three slices and these three slices have different values of colour_plane_id).

Tile changes the order of CTU in the picture. When a picture is partitioned into two or more tiles, CTU order is raster-scan order within tile each tile as illustrated in FIG. 10. In FIG. 10, a picture is partitioned into two tiles and each tile has 8 CTUs. Note that the CTUs are in raster-scan order within the tile.

Figure 11:
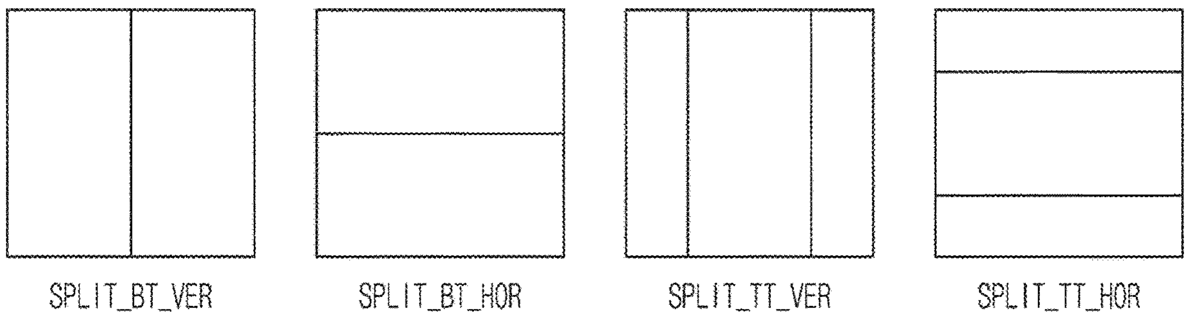
FIG. 11 illustrates a multi-type tree splitting mode according to embodiments.

FIG. 11 illustrates a multi-type tree splitting mode according to embodiments.

Partitioning of the CTUs Using a Tree Structure:

The CTU may be partitioned into CUs based on a quadtree (QT) structure. The quadtree structure may be referred to as a quaternary tree structure. This is intended to reflect various local characteristics. In this document, the CTU may be partitioned based on multi-type tree structure partitioning including a binary tree (BT) and a ternary tree (TT) as well as a QT. Hereinafter, the QTBT structure may include a partition structure based on the QT and BT, and the QTBTTT may include a partition structure based on the QT, BT, and TT. Alternatively, the QTBT structure may include a partition structure based on the QT, BT, and TT. In a coding tree structure, a CU may have a square or rectangular shape. The CTU may first be partitioned in a QT structure. Then, leaf nodes of the QT structure may be further partitioned by the multi-type tree structure. For example, as shown in FIG. 11, the multi-type tree structure may generally include four split types.

The four split types include vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). Leaf nodes of the multi-type tree structure may be called CUs. These CUs may be used for prediction and transform procedures. In general, the CU, PU, and TU may have the same block size in this document. However, when the maximum supported transform length is less than the width or height of the color component of the CU, the CU and the TU may have different block sizes.

Figure 12:
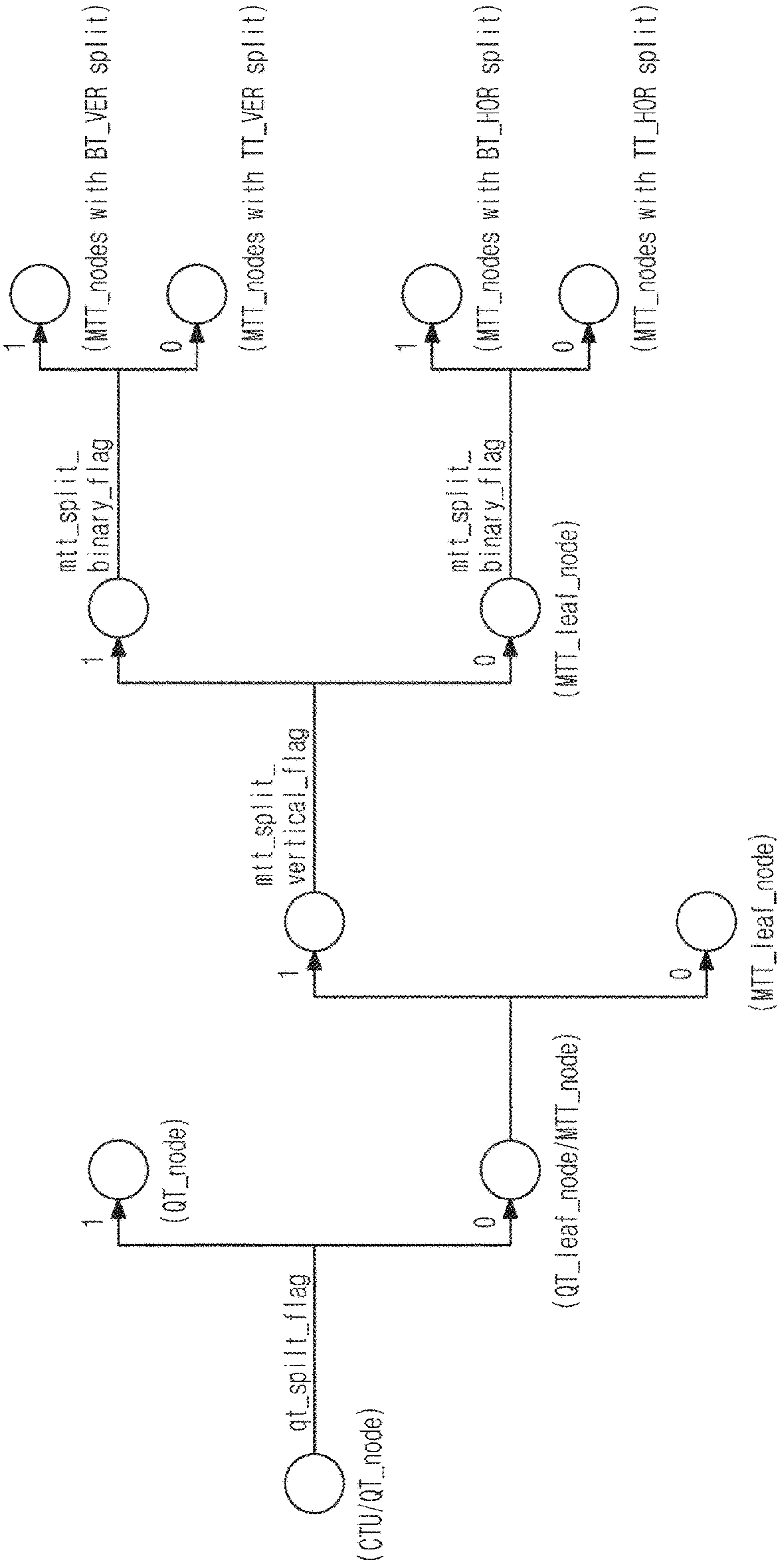
FIG. 12 illustrates splitting flags within a quad tree in a multi-type tree coding structure according to embodiments.

FIG. 12 illustrates splitting flags within a quad tree in a multi-type tree coding structure according to embodiments.

FIG. 12 exemplarily illustrates the signaling mechanism of partitioning information in a quadtree with nested multi-type tree structure.

Here, the CTU is treated as the root of the quadtree, and is partitioned for the first time into a quadtree structure. Each quadtree leaf node may then be further partitioned into a multi-type tree structure. In the multi-type tree structure, a first flag (e.g., mtt_split_cu_flag) is signaled to indicate whether the corresponding node is additionally partitioned. In the case where the corresponding node is additionally partitioned, a second flag (e.g., mtt_split_cu_verticla_flag) may be signaled to indicate the splitting direction. Then, a third flag (e.g., mtt_split_cu_binary_flag) may be signaled to indicate whether the split type is binary splitting or ternary splitting. For example, based on mtt_split_cu_vertical_flag and mtt_split_cu_binary_flag, a multi-type tree splitting mode (MttSplitMode) of a CU may be derived as shown in Table 1 (MttSplitMode derivation based on multi-type tree syntax elements) below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 13:
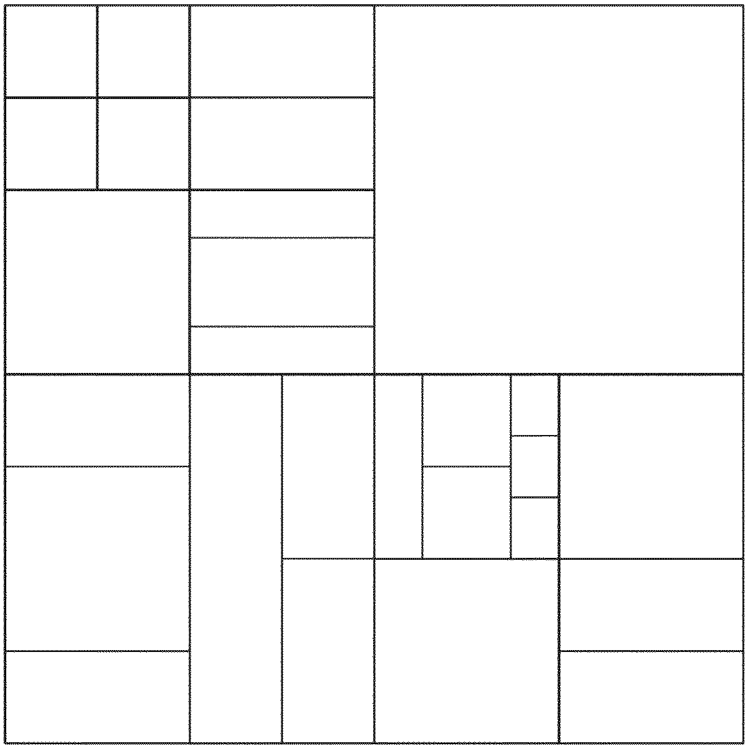
FIG. 13 illustrates an example of a quad tree in a multi-type tree coding block structure according to embodiments.

FIG. 13 illustrates an example of a qua tree in a multi-type tree coding block structure according to embodiments.

FIG. 13 exemplarily shows a CTU being partitioned into multiple CUs based on a quadtree and a nested multi-type tree structure.

Here, bold block edges represent quadtree partitioning and the other edges represent multi-type tree partitioning. The quadtree with nested multi-type tree may provide a content-adapted coding tree structure. The CU may correspond to a coding block (CB). Alternatively, the CU may include a CB of luma samples and two coding blocks of corresponding chroma samples. The size of a CU may be as large as CTU or may be as small as 4×4 in luma sample units. For example, in the case of 4:2:0 color format (or chroma format), the maximum chroma CB size may be 64×64 and the minimum chroma CB size may be 2×2.

For example, in this document, the maximum allowable luma TB size may be 64×64 and the maximum allowable chroma TB size may be 32×32. If the width or height of the CB partitioned according to the tree structure is greater than the maximum transform width or height, the CB may be automatically (or implicitly) partitioned until the TB size limit in the horizontal and vertical directions is satisfied.

For a quadtree coding tree scheme with a nested multi-type tree, the following parameters may be defined and identified as SPS syntax elements.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed layer depth of a multi-type tree split from a quadtree leaf MinBtSize: the minimum allowed binary tree leaf node size MinTtSize: the minimum allowed ternary tree leaf node size As an example of a quadtree coding tree structure with a nested multi-type tree, the CTU size may be set to 64×64 blocks of 128×128 luma samples and two corresponding chroma samples (in 4:2:0 chroma format). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. QT partitioning may be applied to the CTU to generate QT leaf nodes. The QT leaf node may be called a leaf QT node. QT leaf nodes may range in size from a 16×16 size (i.e., the MinOTSize) to a 128×128 size (i.e., the CTU size). If the leaf QT node is 128×128, it may not be additionally partitioned into a binary tree/ternary tree. This is because, even if partitioned in this case, it exceeds MaxBtsize and MaxTtszie (i.e., 64×64). In other cases, leaf QT nodes may be further partitioned into a multi-type tree. Therefore, the leaf QT node is the root node for the multi-type tree. Also, the leaf QT node may have a multi-type tree depth (mttDepth) equal to 0. If the multi-type tree depth reaches MaxMttdepth (e.g., 4), further partitioning may not be considered. If the width of the multi-type tree node is equal to MinBtSize and less than or equal to 2×MinTtSize, no further horizontal partitioning may be considered. If the height of the multi-type tree node is equal to MinBtSize and less than or equal to 2×MinTtSize, no further vertical partitioning may be considered.

Figure 14:
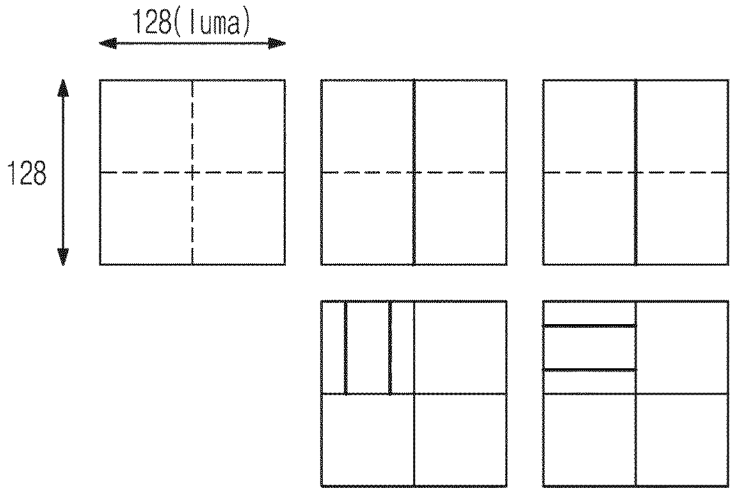
FIG. 14 illustrates forbidding of ternary tree (TT) splitting for a coding block according to embodiments.

FIG. 14 illustrates forbidding of ternary tree (TT) splitting for a coding block according to embodiments.

In a hardware decoder, TT splitting may be forbidden in certain cases to allow a 64×64 luma block and 32×32 chroma pipeline design. For example, when the width or height of the luma coding block is greater than 64, TT splitting may be forbidden as shown in FIG. 14. Also, for example, when the width or height of the chroma coding block is greater than 32, TT splitting may be forbidden.

In this document, the coding tree scheme may support that the luma and chroma (component) blocks have separate block tree structures. When the luma and chroma blocks in one CTU have the same block tree structure, they may be represented as SINGLE_TREE. When the luma and chroma blocks in one CTU have separate block tree structures, they may be represented as DUAL_TREE. In this case, the block tree type for the luma component may be called DUAL_TREE_LUMA, and the block tree type for the chroma component may be called DUAL_TREE_CHROMA. For P and B slices/tile groups, luma and chroma CTBs in one CTU may be constrained to have the same coding tree structure. However, for I slices/tile groups, luma and chroma blocks may have separate block tree structures. If the separate block tree mode is applied, the luma CTB may be partitioned into CUs based on a particular coding tree structure, and the chroma CTB may be partitioned into chroma CUs based on another coding tree structure. This means that a CU in an I slice/tile group may include a coding block of the luma component or coding blocks of two chroma components and a CU in a P or B slice/tile group may include blocks of three color components. In this document, a slice may be called a tile/tile group, and a tile/tile group may be called a slice.

In the above-described "Partitioning of the CTUs using a tree structure," a quadtree coding tree structure with a nested multi-type tree has been described, but a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where a CU is partitioned through a QT structure and an MPT structure, a syntax element (e.g., MPT_split_type) including information on how many blocks the leaf node of the QT structure is split into and a syntax element (e.g., MPT_split_mode) including information on whether the leaf node of the QT structure is split horizontally or vertically may be signaled to determine a partitioning structure.

In another example, the CU may be partitioned in a different way than the QT structure, BT structure or TT structure. That is, unlike the cases where the CU of the lower depth is split into ¼ of the CU of the higher depth according to the QT structure, the CU of the lower depth is split into ½ of the CU of the higher depth according to the BT structure, or the CU of the lower depth is split into ¼ or ½ of the CU of the higher depth according to the IT structure, the CU of the lower depth may be split into ⅕, ⅓, ⅜, ⅗, ⅔, or ⅝ of the CU of the higher depth in some cases, and the method of CU partitioning is not limited thereto.

Transform/Inverse Transform:

As described above, the encoding apparatus may derive the residual block (residual samples) based on the predicted block (prediction samples) through intra/inter/IBC prediction, and may derive quantized transform coefficients by applying transform and quantization to the derived residual samples. Information (residual information) about the quantized transform coefficients may be included and encoded in a residual coding syntax and then output in the form of a bitstream. The decoding apparatus may acquire information (residual information) about the quantized transform coefficients from the bitstream and decode the information to derive quantized transform coefficients. The decoding apparatus may derive the residual samples through dequantization/inverse transform based on the quantized transform coefficients. As described above, at least one of the quantization/dequantization and/or the transform/inverse transform may be skipped. When the transform/inverse transform is skipped, the transform coefficients may be called coefficients or residual coefficients, or may still be called transform coefficients for consistency. Whether transform/inverse transform is skipped may be signaled based on transform_skip_flag.

Transform/inverse transform may be performed based on the transform kernel(s). For example, according to this document, a multiple transform selection (MTS) scheme may be applied. In this case, some of the multiple transform kernel sets may be selected and applied to the current block. A transform kernel may be referred to by various terms, such as transform matrix or transform type. For example, a transform kernel set may represent a combination of a vertical transform kernel and a horizontal transform kernel.

For example, MTS index information (or the syntax element tu_mts_idx) may be generated/encoded by the encoding apparatus and signaled to the decoding apparatus to indicate one of the transform kernel sets. For example, the transform kernel set according to the value of the MTS index information may be derived as in Table 2 (Specification of trTypeHor and trTypeVer depending on tu_mts_idx[x][y]), Table 3 (Specification of trTypeHor and trTypeVer depending on cu_sbt_horizontal_flag and cu_sbt_pos_flag), and/or Table 4 (Specification of trTypeHor and trTypeVer depending on predModeIntra) below.

TABLE 2

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transform kernel set may be determined based on, for example, cu_sbt_horizontal_flag and cu_sbt_pos_flag.

cu_sbt_horizontal_flag equal to 1 specifies that the current coding unit is split into two transform units horizontally. cu_sbt_horizontal_flag[x0][y0] equal to 0 specifies that the current coding unit is split into two transform units vertically. cu_sbt_pos_flag equal to 1 specifies that tu_cbf_luma, tu_cbf_cb, and tu_cbf_cr of the first transform unit in the current coding unit are not present in the bitstream. cu_sbt_pos_flag equal to 0 specifies that tu_cbf_luma, tu_cbf_cb, and tu_cbf_cr of the second transform unit in the current coding unit are not present in the bitstream.

TABLE 3

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

The transform kernel set may be determined based on, for example, the intra prediction mode for the current block.

TABLE 4

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_ANGULAR33, INTRA_ANGULAR35 | 0 | 0 |
| INTRA_ANGULAR2, INTRA_ANGULAR4,...,INTRA_ANGULAR28, INTRA_ANGULAR30, INTRA_ANGULAR39, INTRA_ANGULAR41,...,INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5,..., INTRA_ANGULAR27, INTRA_ANGULAR29, INTRA_ANGULAR38, INTRA_ANGULAR40,...,INTRA_ANGULAR64, INTRA_ANGULAR66 | 0 | ( nTbH >= 4 && nTbH <= 16 ) ? 1 : 0 |

In the above tables, trTypeHor may indicate a horizontal transform kernel and trTypeVer may indicate a vertical transform kernel. Here, the trTypeHor/trTypeVer value 0 may indicate DCT2, the trTypeHor/trTypeVer value 1 may indicate DST7, and the trTypeHor/trTypeVer value 2 may indicate DCT8. These values are merely an example, and other values may be mapped to other DCT/DST by an agreement.

Table 5 (Transform basis functions of DCT-II/DCT-VIII and DST-VII for N-point input) below exemplarily shows the basis functions for DCT2, DCT8, and DST7.

TABLE 5

| Transform Type | Basis function $T_i(j)$, i, j = 0, 1 ... N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

Figure 15:
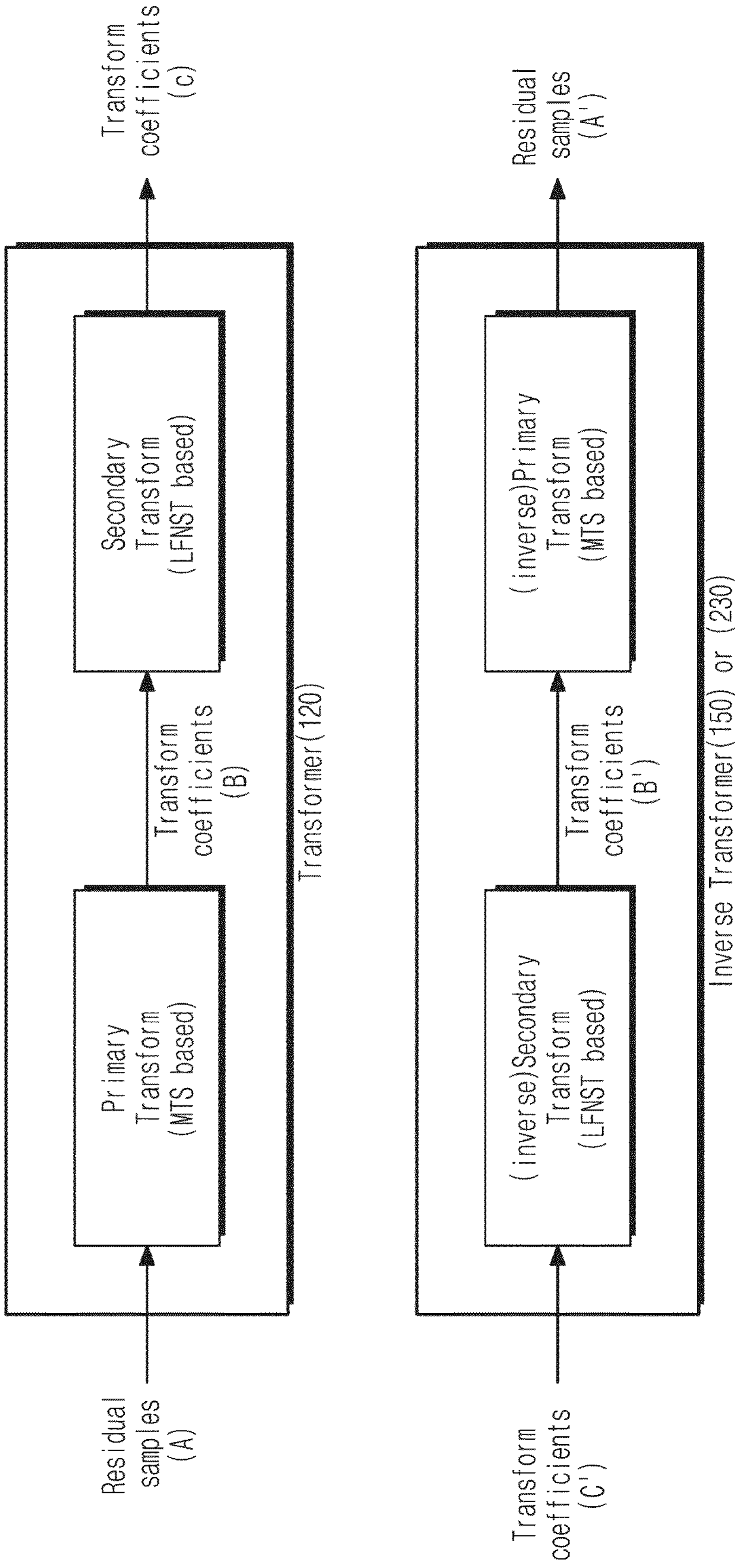
FIG. 15 illustrates transform and inverse transform according to embodiments.

FIG. 15 illustrates transform and inverse transform according to embodiments.

In this document, the MTS-based transform may be applied as a primary transform, and a secondary transform may be further applied. The secondary transform may be applied only to coefficients in the upper left w×h region of the coefficient block to which the primary transform is applied, and may be referred to as a reduced secondary transform (RST). For example, the w and/or h may be 4 or 8. In the transform, the primary transform and the secondary transform may be sequentially applied to the residual block. In the inverse transform, the inverse secondary transform and the inverse primary transform may be sequentially applied to the transform coefficients. The secondary transform (RST transform) may be referred to as low frequency coefficients transform (LFCT) or low frequency non-separable transform (LFNST). The inverse secondary transform may be referred to as inverse LFCT or inverse LFNST.

Figure 16:
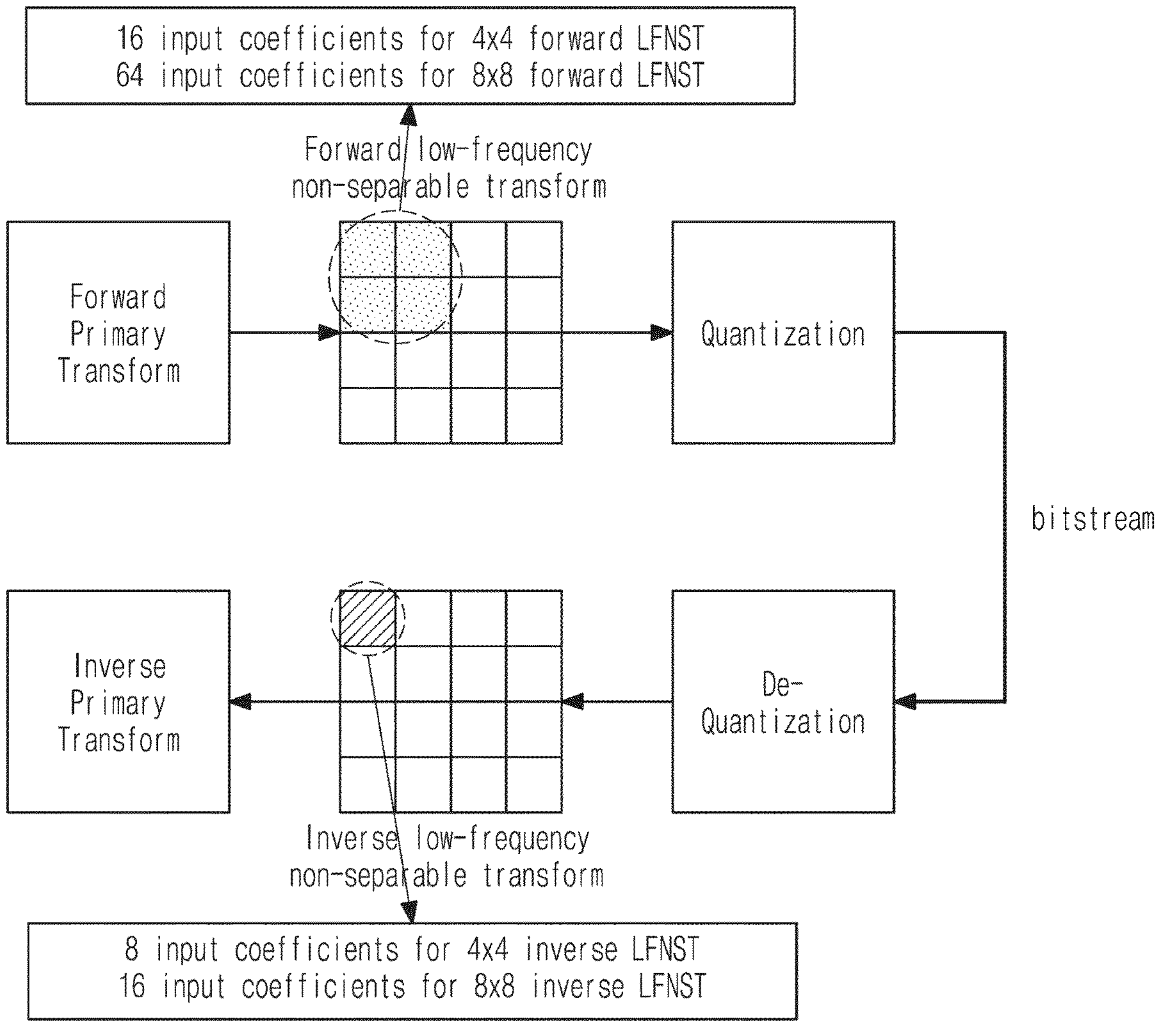
FIG. 16 illustrates low-frequency non-separable transform (LFNST) according to embodiments.

FIG. 16 illustrates low-frequency non-separable transform (LFNST) according to embodiments.

LFNST (low-frequency non-separable transform), also called reduced secondary transform, is applied between forward primary transform and quantization (at the encoder side) and between dequantization and inverse primary transform (at the decoder side), as shown in FIG. 16. In LFNST, 4×4 non-separable transform or 8×8 non-separable transform is applied depending on the block size. For example, 4×4 LFNST is applied for small blocks (i.e., min(width, height)<8) and 8×8 LFNST is applied for larger blocks (i.e., min(width, height)>4).

Application of a non-separable transform, which is used in LFNST, is described as follows using input as an example. To apply 4×4 LFNST, the 4×4 input block X is represented as a vector as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

The non-separable transform is calculated as $\vec{F} = T \cdot \vec{X}$, where $\vec{F}$ denotes the transform coefficient vector, and T is a 16×16 transform matrix. The 16×1 coefficient vector $\vec{F}$ is subsequently re-organized as a 4×4 block using the scan order (horizontal, vertical or diagonal) for the block. Coefficients with smaller indices are placed at smaller scan indices in the 4×4 coefficient block.

Transform/inverse transform may be performed in units of CUs or TUs. In other words, transform/inverse transform may be applied to residual samples in a CU or residual samples in a TU. The CU size and the TU size may be equal or multiple TUs may be present in the CU region. The CU size may generally indicate a luma component (sample) CB size. The TU size may generally indicate a luma component (sample) TB size. The chroma component (sample) CB or TB size may be derived based on the luma component (sample) CB or TB depending on the component ratio according to the color format (chroma format, e.g., 4:4:4, 4:2:2, 4:2:0, etc.). The TU size may be derived based on maxTbSize. For example, when the CU size is larger than the maxTbSize, a plurality of TUs (TBs) of maxTbSize may be derived from the CU, and transform/inverse transform may be performed per TU (TB). maxTbSize may be considered when determining whether to apply various intra prediction types such as ISP. Information on the maxTbSize may be predetermined or may be generated and encoded by the encoding apparatus and signaled to the decoding apparatus.

Quantization/Dequantization:

As described above, the quantizer of the encoding apparatus may derive quantized transform coefficients by applying quantization to the transform coefficients, and the dequantizer of the encoding apparatus or the dequantizer of the decoding apparatus may derive transform coefficients by applying dequantization to the quantized transform coefficients.

In general, in video/image coding, a quantization rate may be changed, and a compression rate may be adjusted using the changed quantization rate. From an implementation perspective, instead of using the quantization rate directly, a quantization parameter (QP) may be used in consideration of complexity. For example, an integer QP value from 0 to 63 may be used, and each QP value may correspond to an actual quantization rate. A quantization parameter QPY for the luma component (luma sample) and a quantization parameter QPC for the chroma component (chroma sample) may be set differently.

In the quantization process, the transform coefficient C may be input and divided by the quantization rate Qstep to obtain a quantized transform coefficient C'. In this case, considering computational complexity, the quantization rate may be multiplied by the scale to form an integer, and the shift operation may be performed by a value corresponding to the scale value. A quantization scale may be derived based on the product of the quantization rate and the scale value. That is, the quantization scale may be derived according to QP. The quantized scale may be applied to the transform coefficient C to derive a quantized transform coefficient C'.

In the dequantization process, which is the reverse of the quantization process, the quantized transform coefficient C' is multiplied by the quantization rate Qstep to obtain a reconstructed transform coefficient C". In this case, a level scale may be derived according to the quantization parameter, and the level scale is applied to the quantized transform coefficient C' to derive a reconstructed transformed coefficient C" based on the level scale. The reconstructed transform coefficient C" may be somewhat different from the original transform coefficient C due to loss in the transform and/or quantization process. Therefore, in the encoding apparatus, dequantization is performed in the same manner as in the decoding apparatus.

An adaptive frequency weighting quantization technique for adjusting quantization intensity may be applied according to frequency. The adaptive frequency weighting quantization technique is a method of applying quantization intensity differently for each frequency. In the adaptive frequency weighting quantization, the quantization intensity may be applied differently for each frequency using a predefined quantization scaling matrix. That is, the above-described quantization/dequantization process may be performed further based on the quantization scaling matrix. For example, different quantization scaling matrices may be used depending on whether the prediction mode applied to the current block to generate a current signal size and/or a residual signal of the current block is inter prediction or intra prediction. The quantization scaling matrix may be referred to as a quantization matrix or scaling matrix. The quantization scaling matrix may be predefined. In addition, frequency-specific quantization scale information related to the quantization scaling matrix may be configured/encoded by the encoding apparatus and signaled to the decoding apparatus for frequency adaptive scaling. The frequency-specific quantization scale information may be referred to as quantization scaling information. The frequency-specific quantization scale information may include scaling list data (scaling_list_data). The (modified) quantized scaling matrix may be derived based on the scaling list data. The frequency-specific quantization scale information may include present flag information indicating whether the scaling list data is present. Alternatively, when the scaling list data is signaled at a higher level (e.g., SPS), information indicating whether the scaling list data is modified at a lower level (e.g., PPS or tile group header etc.) may be further included.

Entropy Coding:

As described above with reference to FIG. 2, some or all of the video/image information may be entropy encoded by the entropy encoder 240. Also, some or all of the video/image information described above with reference to FIG. 3 may be entropy decoded by the entropy decoder 310. In this case, the video/image information may be encoded/decoded in units of syntax elements. In this document, information encoding/decoding may include encoding/decoding by the method described in this paragraph.

Figure 17:
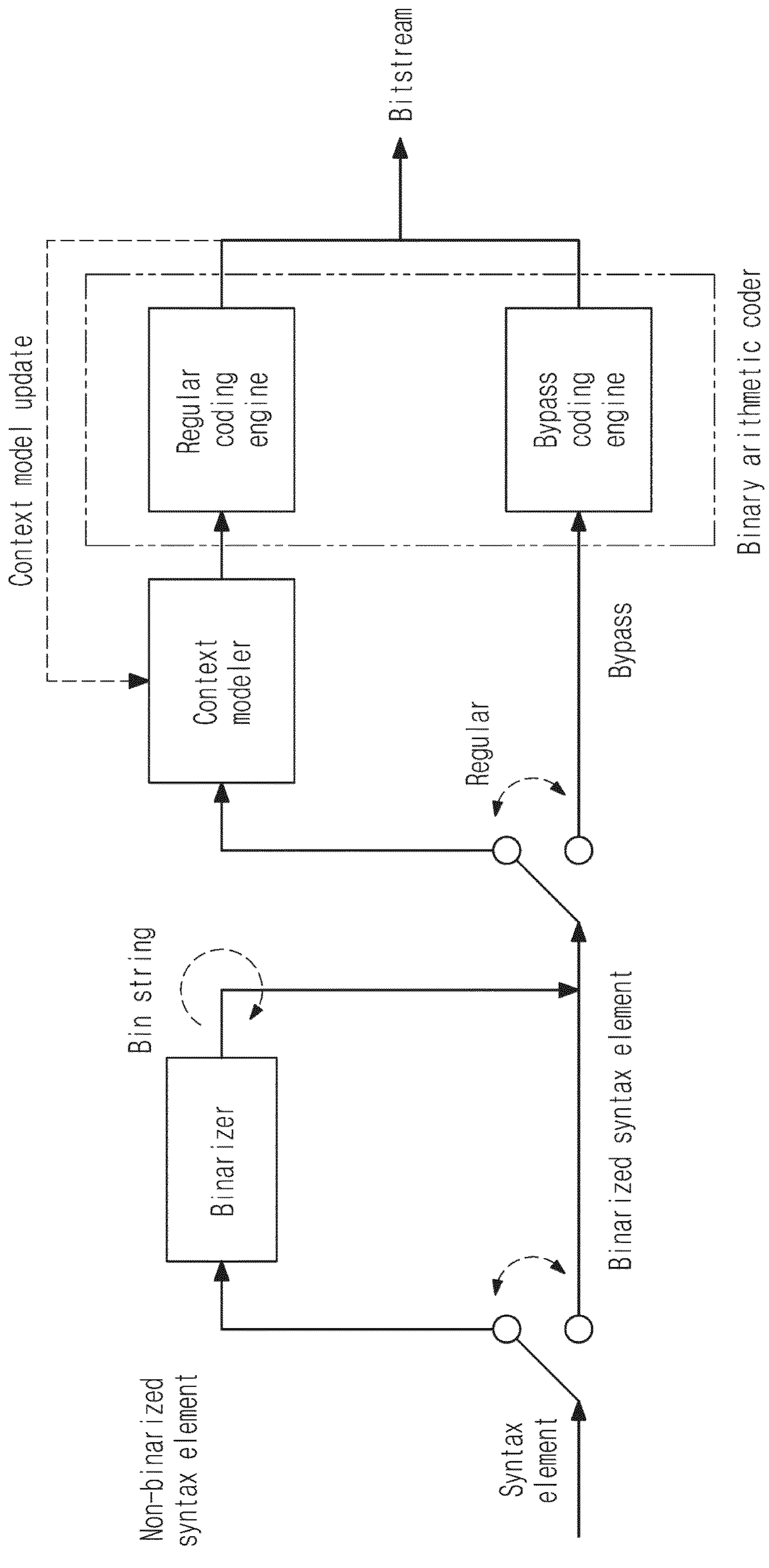
FIG. 17 illustrates context adaptive binary arithmetic coding (CABAC) encoding according to embodiments.

FIG. 17 illustrates context adaptive binary arithmetic coding (CABAC) encoding according to embodiments.

FIG. 17 shows a block diagram of CABAC for encoding one syntax element. In the encoding process of CABAC, an input signal is first converted to a binary value through binarization when the input signal is a syntax element rather than a binary value. If the input signal is already a binary value, binarization is bypassed. Here, each binary digit 0 or 1 constituting the binary value is called a bin. For example, when the binary string (bin string) after binarization is 110, each of 1, 1, and 0 is called a bin. The bin(s) for one syntax element may indicate a value of the syntax element.

The binarized bins are input to a regular coding engine or a bypass coding engine. The regular coding engine assigns a context model that reflects probability for each bin and encodes the bin based on the assigned context model. The regular coding engine may code each bin and then update the probability model for the bin. Bins coded in this way are called context-coded bins. The bypass coding engine omits the procedure of estimating a probability for the input bins and the procedure of updating the probability models applied to the bins after coding. Instead of assigning contexts, a uniform probability distribution (e.g., 50:50) may be applied to the input bins to speed up coding. Bins coded in this manner are called bypass bins. The context model may be allocated and updated for each bin that is context coded (regularly coded). The context model may be indicated based on ctxidx or ctxInc. ctxidx may be derived based on ctxInc. Specifically, for example, the context index (ctxidx) indicating the context model for each of the regularly coded bins may be derived as the sum of the context index increment (ctxInc) and the context index offset (ctxIdxOffset). Here, ctxInc may be derived differently for each bin. The ctxIdxOffset may be represented by the lowest value of ctxIdx. The lowest value of ctxIdx may be called the initial value (initValue) of ctxIdx. ctxIdxOffset is generally used to distinguish between the context models for different syntax elements, and the context model for a syntax element may be distinguished/derived based on ctxinc.

In the entropy encoding procedure, it may be determined whether to perform encoding through the regular coding engine or through the bypass coding engine, and the coding path may be switched. Entropy decoding performs the same process as entropy encoding, but in reverse.

Figure 18:
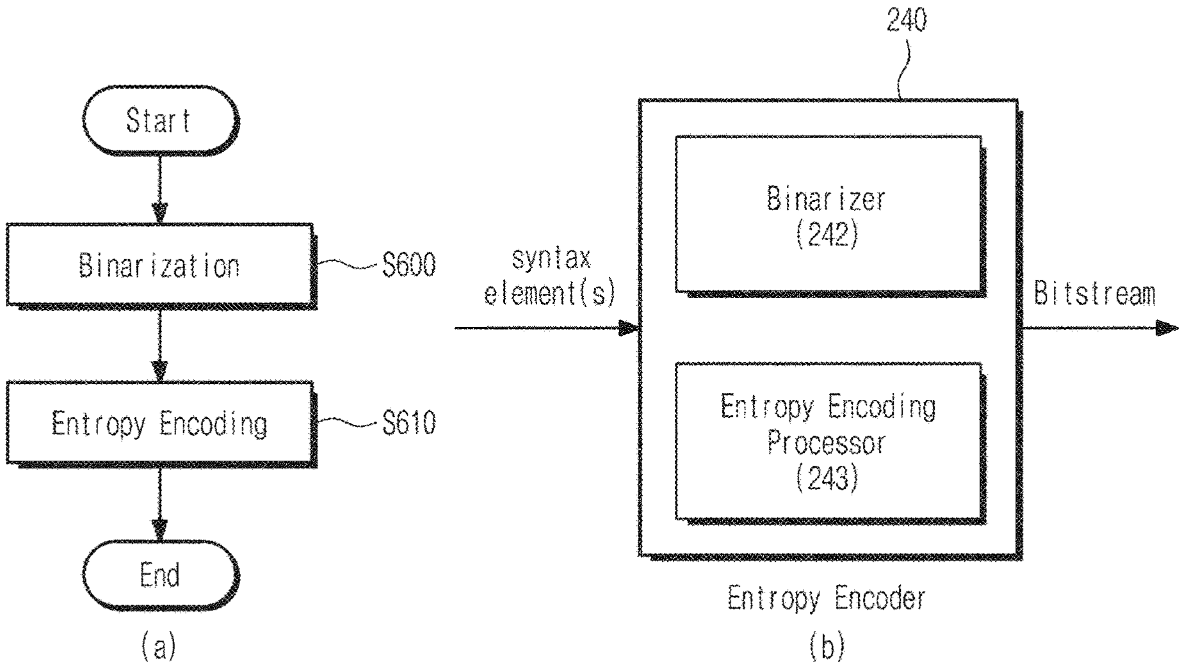
FIG. 18 illustrates an entropy encoding method according to embodiments.

FIG. 18 illustrates an entropy encoding method according to embodiments.

The entropy coding described with reference to FIG. 17 may be performed, for example, as shown in FIG. 18.

Referring to FIG. 18, an encoding apparatus (entropy encoder) performs an entropy coding procedure on image/video information. The image/video information may include partitioning related information, prediction related information (e.g., inter/intra prediction distinction information, intra prediction mode information, inter prediction mode information, etc.), residual information, and in-loop filtering related information, or include various syntax elements related thereto. The entropy coding may be performed per syntax element. S600 to S610 may be performed by the entropy encoder 240 of the encoding apparatus of FIG. 2.

The encoding apparatus performs binarization on a target syntax element (S600). The binarization may be based on various binarization methods such as a truncated rice binarization process and a fixed-length binarization process, and the binarization method for the target syntax element may be predefined. The binarization procedure may be performed by a binarizer 242 in the entropy encoder 240.

The encoding apparatus performs entropy encoding on the target syntax element (S610). The encoding apparatus may encode the bin string of the target syntax element using regular (context-based) coding or bypass coding based on entropy coding techniques such as context-adaptive arithmetic coding (CABAC) or context-adaptive variable length coding (CAVLC), and an output thereof may be included in a bitstream. The entropy encoding procedure may be performed by an entropy encoding processor 243 in the entropy encoder 240. As described above, the bitstream may be delivered to the decoding apparatus over a (digital) storage medium or a network.

Figure 19:
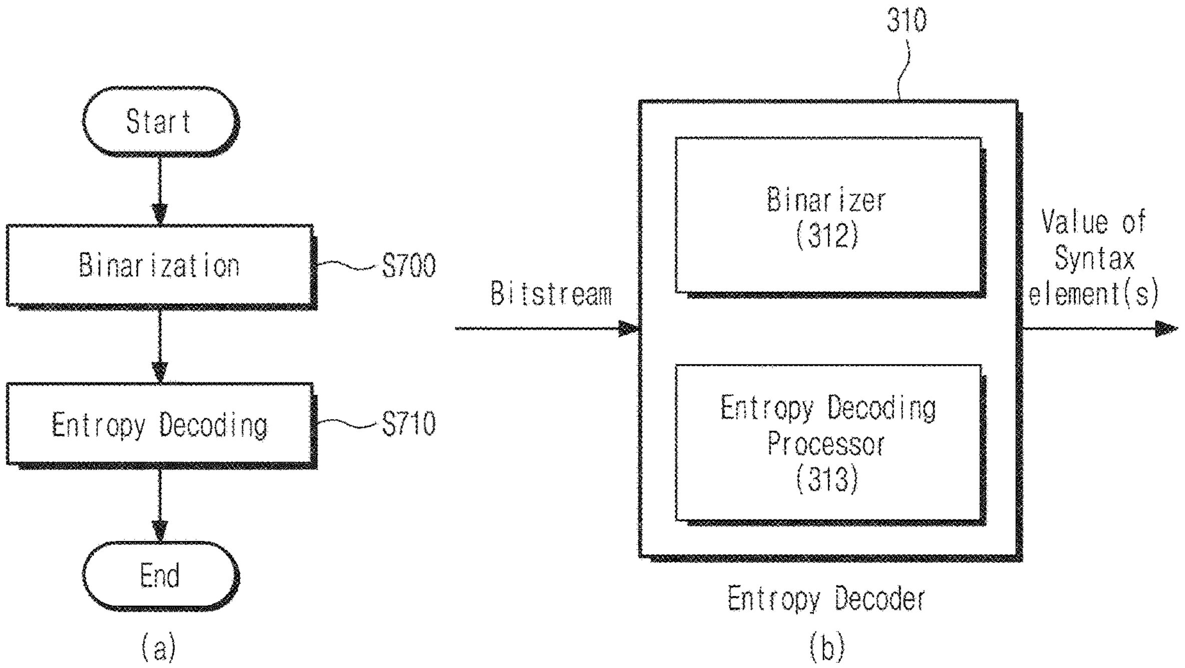
FIG. 19 illustrates an entropy decoding method according to embodiments.

FIG. 19 illustrates an entropy decoding method according to embodiments.

As shown in FIG. 19, the decoding apparatus (entropy decoder) may decode the encoded image/video information. The image/video information may include partitioning related information, prediction related information (e.g., inter/intra prediction distinction information, intra prediction mode information, inter prediction mode information, etc.), residual information, and in-loop filtering related information, or include various syntax elements related thereto. The entropy coding may be performed per syntax element. S700 to S710 may be performed by the entropy decoder 310 of the decoding apparatus of FIG. 3.

The decoding apparatus performs binarization on the target syntax element (S700). The binarization may be based on various binarization methods such as a truncated rice binarization process and a fixed-length binarization process, and the binarization method for the target syntax element may be predefined. The decoding apparatus may derive available bin strings (bin string candidates) for available values of the target syntax element through the binarization procedure. The binarization procedure may be performed by a binarizer 312 in the entropy decoder 310.

The decoding apparatus performs entropy decoding on the target syntax element (S710). The decoding apparatus, while sequentially decoding and parsing each bin for the target syntax element from the input bit(s) in the bitstream, compares the derived bin string with the available bin strings for the syntax element. If the derived bin string is the same as one of the available bin strings, a value corresponding to that bin string is derived as the value of the syntax element. Otherwise, the decoding apparatus performs the above procedure again after further parsing the next bit in the bitstream. Through this process, the corresponding information may be signaled using a variable length bit without using a start bit or an end bit for the specific information (specific syntax element) in the bitstream. Thereby, fewer bits may be allocated to lower values and overall coding efficiency may be improved.

The decoding apparatus may decode each bin in the bin string from the bitstream using context-based or bypass-based decoding, based on an entropy coding technique such as CABAC or CAVLC. The entropy decoding procedure may be performed by an entropy decoding processor 313 in the entropy decoder 310. The bitstream may include various information for image/video decoding as described above. As described above, the bitstream may be delivered to the decoding apparatus over a (digital) storage medium or a network.

In this document, a table (syntax table) including syntax elements may be used to indicate signaling of information from the encoding apparatus to the decoding apparatus. The order of syntax elements in the table including the syntax elements used in the present document may indicate a parsing order of syntax elements from the bitstream. The encoding apparatus may configure and encode the syntax table such that the syntax elements may be parsed by the decoding apparatus in parsing order, and the decoding apparatus may parse and decode the syntax elements of the syntax table from the bitstream according to the parsing order to obtain values of the syntax elements.

Figure 20:
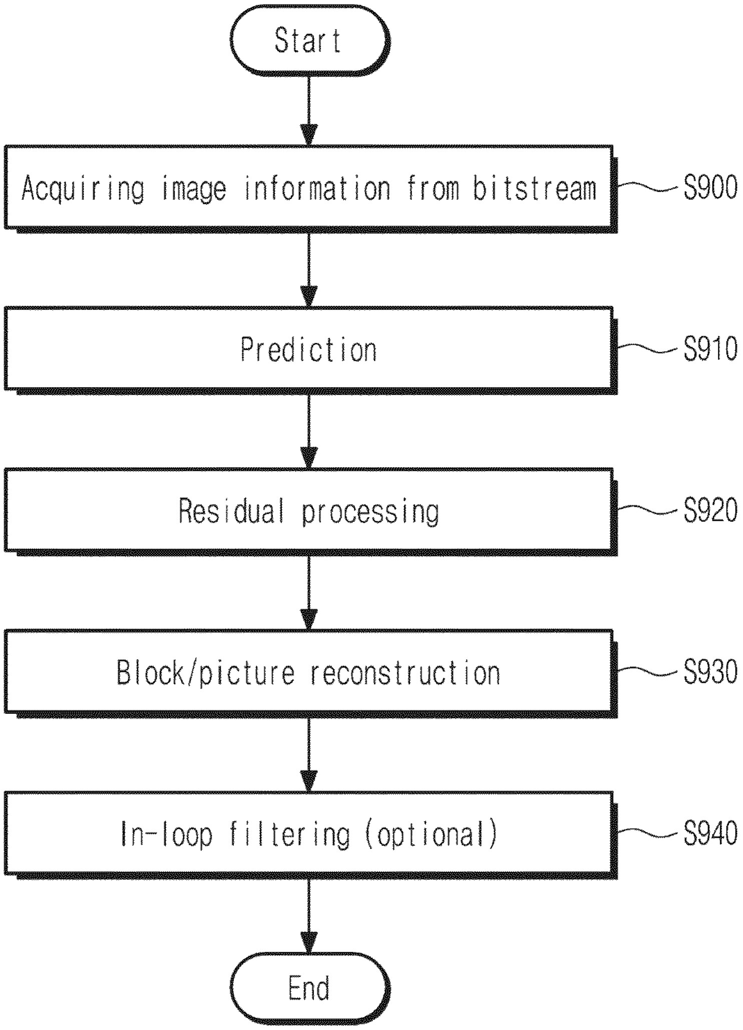
FIG. 20 illustrates a picture decoding method according to embodiments.

FIG. 20 illustrates a picture decoding method according to embodiments

Overview of Image/video Coding Procedure:

In image/video coding, pictures constituting the image/video may be encoded/decoded according to a decoding order. A picture order corresponding to an output order of decoded pictures may be set differently from the decoding order, and forward prediction as well as backward prediction may be performed in inter prediction based thereon.

FIG. 20 illustrates an example of a schematic picture decoding procedure to which the embodiment(s) of the present document are applicable. In FIG. 20, S900 may be performed by the entropy decoder 310 of the decoding apparatus described above with reference to FIG. 3, S910 may be performed by the predictor 330, S920 may be performed by the residual processor 320, S930 may be performed by the adder 340, and S940 may be performed by the filter 350. S900 may include the information decoding procedure described in this document, S910 may include the inter/intra prediction procedure described in this document, S920 may include the residual processing procedure described in this document, S930 may include the block/picture reconstruction procedure described in this document, and S940 may include the in-loop filtering procedure described in this document.

As shown in FIG. 20, the picture decoding procedure may, as described with reference to FIG. 3, broadly include a procedure of acquiring image/video information (through decoding) from the bitstream (S900), a picture reconstruction procedure (S910 to S930), and an in-loop filtering procedure (S940) for the reconstructed picture. The picture reconstruction procedure may be performed based on the prediction samples and the residual samples obtained through the inter/intra prediction (S910) and residual processing (S920, dequantization and inverse transform of quantized transform coefficients) described in this document. A modified reconstructed picture may be generated through the in-loop filtering procedure for a reconstructed picture generated through the picture reconstruction procedure. The modified reconstructed picture may be output as a decoded picture and may be stored in a decoded picture buffer or a memory 360 of the decoding apparatus so as to be used as a reference picture in an inter prediction procedure when decoding a picture. In some cases, the in-loop filtering procedure may be omitted. In this case, the reconstructed picture may be output as a decoded picture and may be stored in the decoded picture buffer or the memory 360 of the decoding apparatus so as to be used as a reference picture in the prediction procedure when decoding a picture. The in-loop filtering procedure S940 may include a deblocking filtering procedure, a sample adaptive offset (SAO) procedure, an adaptive loop filter (ALF) procedure, and/or a bi-lateral filter procedure as described above, and some or all of the procedures may be omitted. In addition, one or some of the deblocking filtering procedure, SAO procedure, ALF procedure, and bilateral filter procedure may be sequentially applied, or all the procedures may be sequentially applied. For example, the SAO procedure may be performed after the deblocking filtering procedure is applied to the reconstructed picture. Alternatively, for example, the ALF procedure may be performed after the deblocking filtering procedure is applied to the reconstructed picture. The procedures may also be performed by the encoding apparatus in a similar manner.

Figure 21:
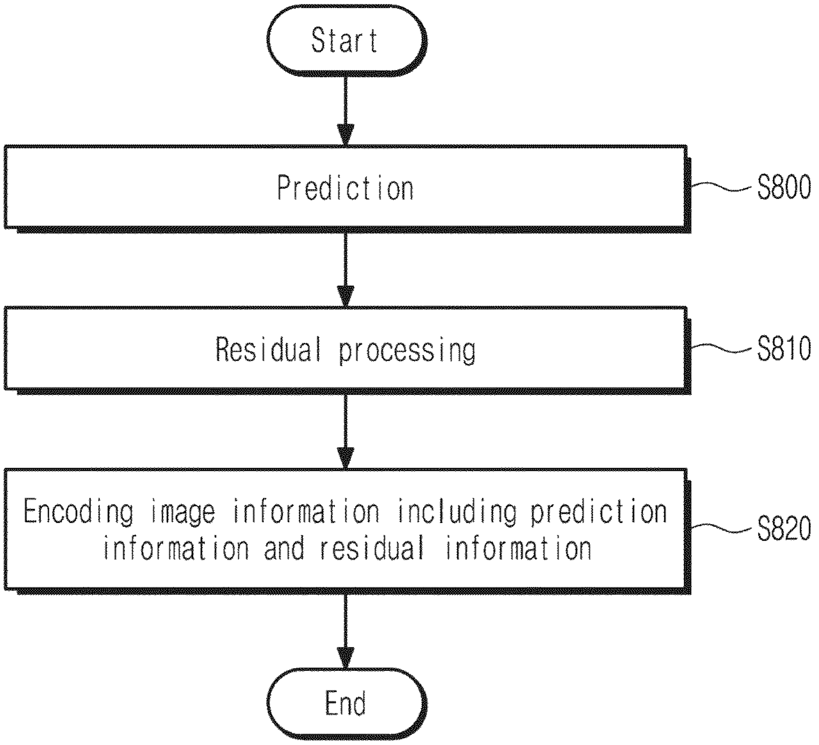
FIG. 21 illustrates a picture encoding method according to embodiments.

FIG. 21 illustrates a picture encoding method according to embodiments.

FIG. 21 illustrates an example of a schematic picture encoding procedure to which embodiment(s) of the present document are applicable. In FIG. 21, S800 may be performed by the predictor 220 of the encoding apparatus described above with reference to FIG. 2, S810 may be performed by the residual processor 230, and S820 may be the entropy encoder 240. S800 may include the inter/intra prediction procedure described in this document, S810 may include the residual processing procedure described in this document, and S820 may include the information encoding procedure described in this document.

As shown in FIG. 21, the picture encoding procedure may broadly include, as described with reference to FIG. 2, a procedure for generating a reconstructed picture for the current picture, a procedure (optional) for applying in-loop filtering to the reconstructed picture, as well as a procedure for encoding information (e.g., prediction information, residual information, partitioning information) for picture reconstruction and outputting the same as a bitstream. The encoding apparatus may derive the (modified) residual samples from the quantized transform coefficients through the dequantizer 234 and the inverse transformer 235 and generate a reconstructed picture based on the prediction samples and the (modified) residual samples. The generated reconstructed picture may be the same as the reconstructed picture generated by the decoding apparatus described above. The modified reconstructed picture may be generated through an in-loop filtering procedure for the reconstructed picture. It may be stored in the decoded picture buffer or the memory 270, and be used as a reference picture in the prediction procedure when the picture is encoded later as in the decoding apparatus. As described above, in some cases, part or all of the in-loop filtering procedure may be omitted. When the in-loop filtering procedure is performed, the (in-loop) filtering related information (parameter) may be encoded by the entropy encoder 240 and output in a bitstream form, and the decoding apparatus may perform the in-loop filtering procedure in the same manner as in the encoding apparatus based on the filtering related information.

Through the in-loop filtering procedure, noise generated during image/video coding, such as blocking artifacts and ringing artifacts, may be reduced, and subjective/objective visual quality may be improved. In addition, as both the encoding apparatus and the decoding apparatus perform the in-loop filtering procedure, the encoding apparatus and the decoding apparatus may derive the same prediction result, improve reliability of picture coding, and reduce the amount of data to be transmitted for the picture coding.

As described above, the picture reconstruction procedure may be performed by the encoding apparatus as well as the decoding apparatus. A reconstructed block may be generated based on intra prediction/inter prediction in each block unit, and a reconstructed picture including the reconstructed blocks may be generated. When the current picture/slice/tile group is an I picture/slice/tile group, blocks included in the current picture/slice/tile group may be reconstructed based only on intra prediction. When the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group, and intra prediction may be applied to the other blocks. The color component of the picture may include a luma component and a chroma component, and the methods and embodiments proposed in this document may be applied to the luma component and chroma component unless explicitly restricted herein.

Example of Coding Layers and Structure:

Coded video/images according to this document may be processed, for example, according to the coding layers and structure described below.

Figure 22:
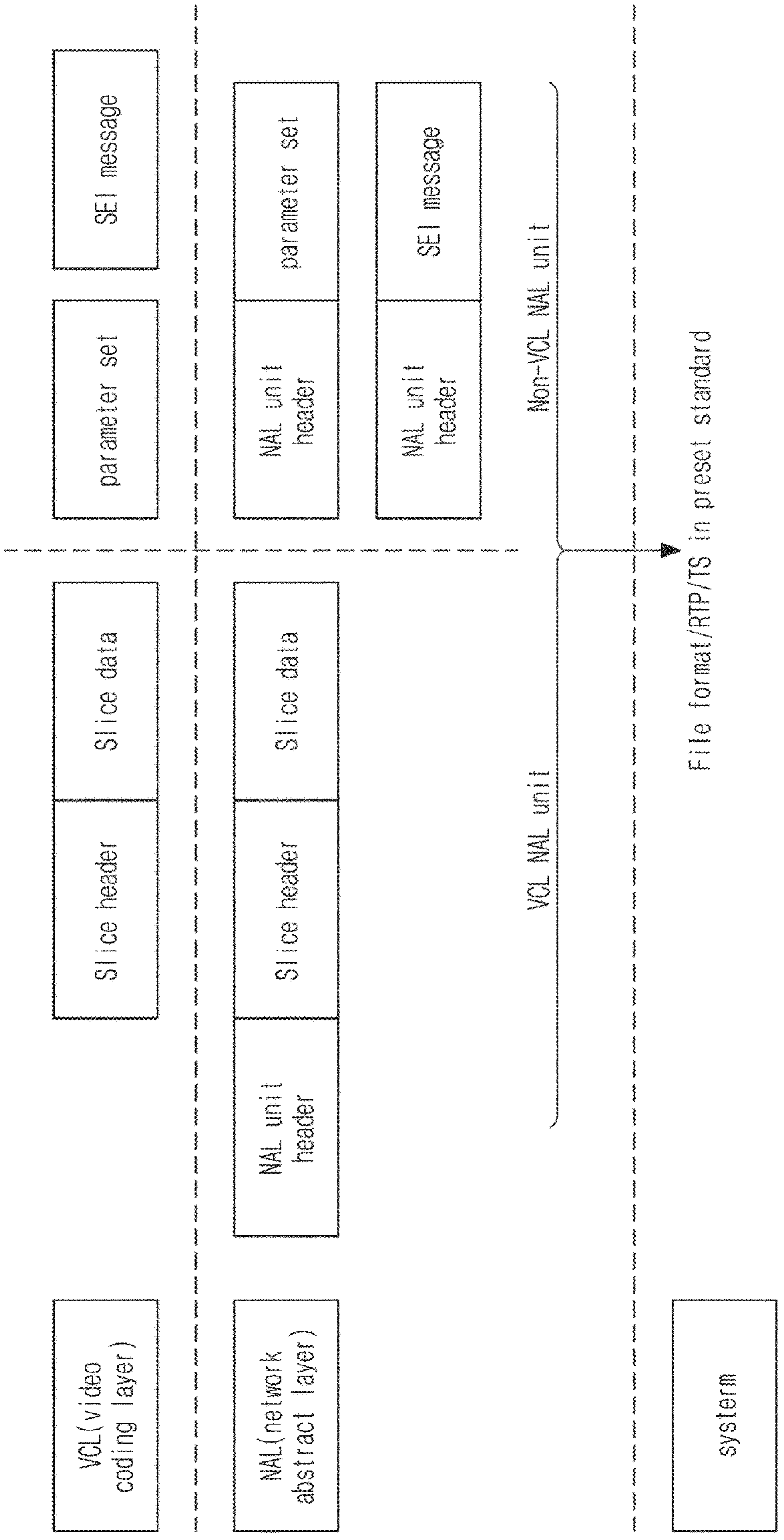
FIG. 22 illustrates a layer structure for a coded image according to embodiments.

FIG. 22 illustrates a layer structure for a coded image according to embodiments.

FIG. 22 illustrates a layer structure for coded images.

The structure for coded images is divided into a video coding layer (VCL), which handles the decoding process of the image/video and the image/video itself, a subsystem that transmits and stores the coded information, and a network abstraction layer (NAL) situated between the VCL and the subsystem, responsible for network adaptation functions.

In the VCL, VCL data including compressed image data (slice data) may be generated, or a parameter set containing information, such as a picture parameter set (PSP), a sequence parameter set (SPS), or a video parameter set (VPS), or a supplemental enhancement information (SEI) message, which is additionally required for an image decoding process, may be generated.

In the NAL, a NAL unit may be generated by adding header information (NAL unit header) to a raw byte sequence payload (RBSP) generated in the VCL. Here, the RBSP refers to the slice data, parameter set, SEI message, etc., generated in the VCL. The NAL unit header may include NAL unit type information specified according to RBSP data included in the corresponding NAL unit.

The NAL unit may be classified into a VCL NAL unit and a Non-VCL NAL unit according to the RBSP generated in the VCL. The VCL NAL unit may refer to a NAL unit that containing information (slice data) about the image, and the Non-VCL NAL unit may refer to a NAL unit containing information (parameter set or SEI message) required to decode the image.

The above-described VCL NAL unit and Non-VCL NAL unit may be transmitted over a network with header information attached according to the data standard of the subsystem. For example, the NAL unit may be transformed into a data format of a predetermined standard, such as the H.266/VVC file format, real-time transport protocol (RTP), or transport stream (TS), and transmitted over various networks.

As described above, the NAL unit type of the NAL unit may be specified according to the RBSP data structure included in the NAL unit, and information on the NAL unit type may be stored and signaled in the NAL unit header.

For example, the NAL unit may be classified into a VCL NAL unit type and a non-VCL NAL unit type according to whether the NAL unit includes information (slice data) about an image. The VCL NAL unit type may be classified according to the characteristics and type of pictures included in the VCL NAL unit, and the non-VCL NAL unit type may be classified according to types of parameter sets.

The following is an example of the NAL unit type specified according to the type of parameter set included in the non-VCL NAL unit type: APS (Adaptation Parameter Set) NAL unit: type for a NAL unit including an APS. DPS (Decoding Parameter Set) NAL unit: Type for a NAL unit including a DPS. VPS (Video Parameter Set) NAL unit: Type for a NAL unit including a VPS. SPS (Sequence Parameter Set) NAL unit: Type for a NAL unit including an SPS. PPS (Picture Parameter Set) NAL unit: Type for a NAL unit including a PPS.

The aforementioned NAL unit types may have syntax information for the NAL unit type, and the syntax information may be stored and signaled in a NAL unit header. For example, the syntax information may be nal_unit_type, and NAL unit types may be specified by the value of nal_unit_type The slice header (slice header syntax) may include information/parameters that may be commonly applied to a slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). In this document, high level syntax (HLS) may include at least one of the APS syntax, PPS syntax, SPS syntax, VPS syntax, DPS syntax, or slice header syntax.

In this document, the image/video information encoded by the encoding apparatus and signaled to the decoding apparatus in the form of a bitstream may include not only in-picture partitioning related information, intra/inter prediction information, residual information, and in-loop filtering information, but also information included in the slice header, information included in the APS, information included in the PPS, information included in the SPS, and/or information included in the VPS.

Coding Descriptors

The following descriptors in this document specify the parsing process of each syntax element: ae(v): context-adaptive arithmetic entropy-coded syntax element. b(8): byte having any pattern of bit string (8 bits). The parsing process for this descriptor is specified by the return value of the function read_bits(8). f(n): fixed-pattern bit string using n bits written (from left to right) with the left bit first. The parsing process for this descriptor is specified by the return value of the function read_bits(n). i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first. se(v): signed integer 0-th order Exp-Golomb-coded syntax element with the left bit first. The parsing process for this descriptor is specified with the order k equal to 0. st(v): null-terminated string encoded as universal coded character set (UCS) transmission format-8 (UTF-8) characters as specified in ISO/IEC 10646. The parsing process is specified as follows: st(v) begins at a byte-aligned position in the bitstream and reads and returns a series of bytes from the bitstream, beginning at the current position and continuing up to but not including the next byte-aligned byte that is equal to 0x00, and advances the bitstream pointer by (stringLength+1)*8 bit positions, where stringLength is equal to the number of bytes returned. The st(v) syntax descriptor is only used in this Specification when the current position in the bitstream is a byte-aligned position. tu(v): truncated unary using up to maxVal bits with maxVal defined in the semantics of the syntax element. u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first. ue(v): unsigned integer 0-th order Exp-Golomb-coded syntax element with the left bit first. The parsing process for this descriptor is specified with the order k equal to 0.

Hereinafter, with reference to the drawings, high level syntax signaling and semantics are described.

FIGS. 23A, 23B, 23C, 23D, and 23E illustrate picture_header_structure according to embodiments.

Picture Header and Slice Header

A coded picture may consist of one or more slices. Parameters describing a coded picture are signaled within a picture header (PH) and parameters describing a slice are signaled within slice header. PH is carried in its own NAL unit type. SH is present in the beginning of a NAL unit containing payload of a slice (i.e., slice data). Details of syntax and semantics of PH and SH can be found in the section 7 of the VVC specification.

A coded picture may consist of one or more slices. Parameters describing a coded picture are signaled within a picture header (PH) and parameters describing a slice are signaled within a slice header. PH is carried in its own NAL unit type. SH is present in the beginning of a NAL unit containing payload of a slice (i.e., slice data). Details of syntax and semantics of the PH and SH can be found in Section 7 of the VVC specification.

SEI Messages:

Neural-Network Post-Filter SEI Messages

General Post-Processing Filtering Process Using NNPFs

Input to this process is a bitstream BitstreamToFilter. Output of this process is a list of NNPF output pictures ListNnpfOutputPics.

First, BitstreamToFilter is decoded, and the list CroppedDecodedPictures is set to be the list of the cropped decoded pictures in output order resulted from decoding BitstreamToFilter.

Second, the filtering process for one picture is repeatedly invoked, in output order, for each cropped decoded picture that is in CroppedDecodedPictures and for which one or more NNPFs are activated.

The order of the pictures in ListNnpfOutputPics is output order.

Within ListNnpfOutputPics, there shall be no more than one picture pertaining to any particular output time instance. When for any particular picture in CroppedDecodedPictures, there are multiple NNPFs activated and only one of the NNPFs is allowed to be selected to be applied although any of the NNPFs may be selected, the above constraint shall apply regardless of which NNPF is selected to be applied to the particular picture.

Filtering Process for One Picture Using an NNPF

The filtering process applies to each cropped decoded picture (referred to as the current picture) that is in CroppedDecodedPictures and for which one or more NNPFs are activated.

When applying an NNPF to the current picture, the filtered and/or interpolated pictures are generated by the NNPF by applying the NNPF process specified in the semantics of the NNPFC SEI message, in a patch-wise manner, to the current picture.

When applying an NNPF to the current picture, the order of the pictures generated by the NNPF by applying the NNPF process being stored into the output tensor of the NNPF is output order.

When the applied NNPF is the last NNPF that is applied to the current picture, the pictures generated by the NNPF and output by the NNPF process are included into ListNnpfOutputPics, in the same order as when the pictures are stored into the output tensor of the NNPF.

FIGS. 24A, 24B, and 24C illustrate syntax for a neural-network post-filter characteristics SEI message according to embodiments.

The syntax of the NNPFC SEI message related to the neural-network post-filter characteristics SEI message NNPFC is shown in FIGS. 24A, 24B, and 24C.

The NNPFC SEI message specifies a neural network that may be used as a post-processing filter. The use of the specified neural-network post-processing filters (NNPFs) for specific pictures is indicated with a neural-network post-filter activation (NNPFA) SEI message.

Use of this SEI message requires the definition of the following variables:

Input picture width and height in units of luma samples (denoted herein by CroppedWidth and CroppedHeight, respectively).

Luma sample array CroppedYPic[idx] and chroma sample arrays CroppedCbPic[idx] and CroppedCrPic[idx], when present, of the input pictures with index idx in the range of 0 to numInputPics−1, inclusive, that are used as input for the NNPF.

Bit depth BitDepthY for the luma sample array of the input pictures.

Bit depth BitDepthC for the chroma sample arrays, if any, of the input pictures.

A chroma format indicator, denoted herein by ChromaFormatIdc

When nnpfc_auxiliary_inp_idc is equal to 1, a filtering strength control value array StrengthControlVal[idx] shall contain real numbers in the range of 0 to 1, inclusive, of the input pictures with index idx in the range of 0 to numInputPics−1, inclusive.

The input picture with index 0 corresponds to the picture for which the NNPF defined by this NNPFC SEI message is activated by an NNPFA SEI message. Input pictures with index i in the range of 1 to numInputPics−1, inclusive, precedes the input picture with index i−1 in output order.

The variables SubWidthC and SubHeightC are derived from ChromaFormatIdc.

Two or more NNPFC SEI messages may be present for the same picture. When two or more NNPFC SEI messages with different values of nnpfc_id are present or activated for the same picture, they may have the same or different values of nnpfc_purpose and nnpfc_mode_idc.

nnpfc_purpose indicates the purpose of the NNPF as specified in Table 6 (Definition of nnpfc_purpose), where (nnpfc_purpose & bitMask) not equal to 0 indicates that the NNPF has the purpose associated with the bitMask value in Table 6. When nnpfc_purpose is greater than 0 and (nnpfc_purpose & bitMask) is equal to 0, the purpose associated with the bitMask value is not applicable to the NNPF. When nnpfc_pupose is equal to 0, the NNPF may be used as determined by the application.

The value of nnpfc_purpose shall be in the range of 0 to 63, inclusive, in bitstreams conforming to this version of this document. Values of 64 to 65 535, inclusive, for nnpfc_purpose are reserved for future use by ITU-T | ISO/IEC and shall not be present in bitstreams conforming to this version of this document. Decoders conforming to this version of this document shall ignore NNPFC SEI messages with nnpfc_purpose in the range of 64 to 65,535.

TABLE 6

| bitMask | Interpretation |
|---|---|
| 0x01 | General visual quality improvement |
| 0x02 | Chroma upsampling (from the 4:2:0 chroma format to the 4:2:2 or 4:4:4 chroma format, or from the 4:2:2 chroma format to the 4:4:4 chroma format) |
| 0x04 | Resolution resampling (increasing or decreasing the width or height) |
| 0x08 | Picture rate upsampling |
| 0x10 | Bit depth upsampling (increasing the luma bit depth or the chroma bit depth) |
| 0x20 | Colourization |

The variables chromaUpsamplingFlag, resolutionResamplingFlag, pictureRateUpsamplingFlag, bitDepthUpsamplingFlag, and colourizationFlag, specifying whether nnpfc_purpose indicates the purpose of the NNPF to include chroma upsampling, resolution resampling, picture rate upsampling, bit depth upsampling, and colorization, respectively, are derived as follows:

$$chromaUpsamplingFlag = ((\text{nnpfc\_purpose} \;\&\; 0x02) > 0)\ ?\ 1{:}0 \tag{76}$$

$$resolutionResamplingFlag = ((\text{nnpfc\_purpose} \;\&\; 0x04) > 0)\ ?\ 1{:}0$$

$$pictureRateUpsamplingFlag = ((\text{nnpfc\_purpose} \;\&\; 0x08) > 0)\ ?\ 1{:}0$$

$$bitDepthUpsamplingFlag = ((\text{nnpfc\_purpose} \;\&\; 0x10) > 0)\ ?\ 1{:}0$$

$$colourizationFlag = ((\text{nnpfc\_purpose} \;\&\; 0x20) > 0)\ ?\ 1{:}0$$

When a reserved value of nnpfc_purpose is taken into use in the future by ITU-T ISO/IEC, the syntax of this SEI message may be extended with syntax elements depending on whether nnpfc_purpose is equal to that value.

When ChromaFormatIdc is equal to 3, chromaUpsamplingFlag shall be equal to 0.

When ChromaFormatIdc or chromaUpsamplingFlag is not equal to 0, colourizationFlag shall be equal to 0.

When pictureRateUpsamplingFlag is equal to 1 and the input picture with index 0 is associated with a frame packing arrangement SEI message with fp_arrangement_type equal to 5, all input pictures are associated with a frame packing arrangement SEI message with fp_arrangement_type equal to 5 and the same value of fp_current_frame_is_frame0_flag.

nnpfc_id contains an identification number that may be used to identify an NNPF. The value of nnpfc_id shall be in the range of 0 to 232-2, inclusive. Values of nnpfc_id from 256 to 511, inclusive, and from 231 to 232-2, inclusive, are reserved for future use by ITU-T ISO/IEC. Decoders conforming to this version of this document encountering an NNPFC SEI message with nnpfc_id in the range of 256 to 511, inclusive, or in the range of 231 to 232-2, inclusive, shall ignore the SEI message.

When an NNPFC SEI message is the first NNPFC SEI message, in decoding order, that has a particular value of nnpfc_id within the current CLVS, the following applies:

This SEI message specifies a base NNPF.

This SEI message pertains to the current decoded picture and all subsequent decoded pictures of the current layer, in output order, until the end of the current CLVS.

nnpfc_base_flag equal to 1 specifies that the SEI message specifies the base NNPF. nnpf_base_flag equal to 0 specifies that the SEI message specifies an update relative to the base NNPF.

The following constraints apply to the value of nnpfc_base_flag.

When an NNPFC SEI message is the first NNPFC SEI message, in decoding order, that has a particular value of nnpfc_id within the current CLVS, the value of nnpfc_base_flag shall be equal to 1.

When an NNPFC SEI message nnpfcB is not the first NNPFC SEI message, in decoding order, that has a particular value of nnpfc_id within the current CLVS and the value of nnpfc_base_flag is equal to 1, the NNPFC SEI message shall be a repetition of the first NNPFC SEI message nnpfcA with the same value of nnpfc_id, in decoding order. That is, the payload content of nnpfcB shall be the same as that of nnpfcA.

When nnpfc_base_flag is equal to 0, the following applies.

This SEI message defines an update relative to the preceding base NNPF in decoding order with the same value of nnpfc_id. Updates are not cumulative. Rather, each update is applied on the base NNPF, which is the NNPF specified by the first NNPFC SEI message, in decoding order, that has a particular value of nnpfc_id within the current CLVS. The NNPF defined by this SEI message is obtained by applying the update defined by this SEI message relative to the base NNPF with the same value of nnpfc_id.

This SEI message pertains to the current decoded picture and all subsequent decoded pictures of the current layer, in output order, until the end of the current CLVS or up to but excluding the decoded picture that follows the current decoded picture in output order within the current CLVS and is associated with a subsequent NNPFC SEI message, in decoding order, having nnpfc_base_flag equal to 0 and the particular value of nnpfc_id within the current CLVS, whichever is earlier.

nnpfc_mode_idc equal to 0 indicates that this SEI message contains an ISO/IEC 15938-17 bitstream that specifies a base NNPF (when nnpfc_base_flag is equal to 1) or is an update relative to the base NNPF with the same value of nnpfc_id (when nnpfc_base_flag is equal to 0).

When nnpfc_base_flag is equal to 1, nnpfc_mode_idc equal to 1 specifies that the base NNPF associated with the value of nnpfc_id is a neural network identified by the URI indicated by nnpfc_uri with the format identified by the tag URI nnpfc_tag_uri.

When nnpfc_base_flag is equal to 0, nnpfc_mode_idc equal to 1 specifies that an update relative to the base NNPF with the same value of nnpfc_id is defined by the URI indicated by nnpfc_uri with the format identified by the tag URI nnpfc_tag_uri.

The value of nnpfc_mode_idc shall be in the range of 0 to 1, inclusive, in bitstreams conforming to this version of this document. Values of 2 to 255, inclusive, for nnpfc_mode_idc are reserved for future use by ITU-T | ISO/IEC and shall not be present in bitstreams conforming to this version of this document. Decoders conforming to this version of this document shall ignore NNPFC SEI messages with nnpfc_mode_idc in the range of 2 to 255, inclusive. Values of nnpfc_mode_idc greater than 255 shall not be present in bitstreams conforming to this version of this document and are not reserved for future use.

nnpfc_reserved_zero_bit_a shall be equal to 0 in bitstreams conforming to this version of this document. Decoders shall ignore NNPFC SEI messages in which nnpfc_reserved_zero_bit_a is not equal to 0.

nnpfc_tag_uri contains a tag URI with syntax and semantics as specified in IETF RFC 4151, identifying the format and related information about the neural network used as a base NNPF or an update relative to the base NNPF with the same value of nnpfc_id specified by nnpfc_uri.

nnpfc_tag_uri may enable unique identification of the format of neural network data specified by nnrpf_uri without the need for a central registration authority.

nnpfc_tag_uri equal to "tag:iso.org,2023:15938-17" indicates that the neural network data identified by nnpfc_uri conforms to ISO/IEC 15938-17.

nnpfc_uri contains a URI with syntax and semantics as specified in IETF Internet Standard 66, identifying the neural network used as a base NNPF or an update relative to the base NNPF with the same value of nnpfc_id.

nnpfc_property_present_flag equal to 1 specifies that syntax elements related to the filter purpose, input format, output format, and complexity are present. nnpfc_property_present_flag equal to 0 specifies that no syntax elements related to the filter purpose, input format, output format, and complexity are present.

When nnpfc_base_flag is equal to 1, nnpfc_property_present_flag shall be equal to 1.

When nnpfc_property_present_flag is equal to 0, the values of all syntax elements that may be present only when nnpfc_property_present_flag is equal to 1 are inferred to be equal to their corresponding syntax elements, respectively, in the NNPFC SEI message that contains the base NNPF for which this SEI message provides an update.

When an NNPFC SEI message nnpfcCurr is not the first NNPFC SEI message, in decoding order, that has a particular value of nnpfc_id within the current CLVS, and is not a repetition of the first NNPFC SEI message with that particular nnpfc_id (i.e., the value of nnpfc_base_flag is equal to 0), and the value of nnpfc_property_present_flag is equal to 1, the following constraints apply.

The value of nnpfc_purpose in the NNPFC SEI message shall be the same as the value of nnpfc_purpose in the first NNPFC SEI message, in decoding order, that has the particular value of nnpfc_id within the current CLVS.

The values of syntax elements following nnpfc_property_present_flag and preceding nnpfc_complexity_info_present_flag, in decoding order, in the NNPFC SEI message shall be the same as the values of corresponding syntax elements in the first NNPFC SEI message, in decoding order, that has the particular value of nnpfc_id within the current CLVS.

Either nnpfc_complexity_info_present_flag shall be equal to 0 or both nnpfc_complexity_info_present_flag shall be equal to 1 in the first NNPFC SEI message, in decoding order, that has the particular value of nnpfc_id within the current CLVS (denoted as nnpfcBase below) and all the followings apply.

nnpfc_parameter_type_idc in nnpfcCurr shall be equal to nnpfc_parameter_type_idc in nnpfcBase.

nnpfc_log2_parameter_bit_length_minus3 in nnpfcCurr, when present, shall be less than or equal to nnpfc_log2_parameter_bit_length_minus3 in nnpfcBase.

If nnpfc_num_parameters_idc in nnpfcBase is equal to 0, nnpfc_num_parameters_idc in nnpfcCurr shall be equal to 0.

Otherwise (if nnpfc_num_parameters_idc in nnpfcBase is greater than 0), nnpfc_num_parameters_idc in nnpfcCurr shall be greater than 0 and less than or equal to nnpfc_num_parameters_idc in nnpfcBase.

If nnpfc_num_kmac_operations_idc in nnpfcBase is equal to 0, nnpfc_num_kmac_operations_idc in nnpfcCurr shall be equal to 0.

Otherwise (if nnpfc_num_kmac_operations_idc in nnpfcBase is greater than 0), nnpfc_num_kmac_operations_idc in nnpfcCurr shall be greater than 0 and less than or equal to nnpfc_num_kmac_operations_idc in nnpfcBase.

If nnpfc_total_kilobyte_size in nnpfcBase is equal to 0, nnpfc_total_kilobyte_size in nnpfcCurr shall be equal to 0.

Otherwise (if nnpfc_total_kilobyte_size in nnpfcBase is greater than 0), nnpfc_total_kilobyte_size in nnpfcCurr shall be greater than 0 and less than or equal to nnpfc_total_kilobyte_size in nnpfcBase.

nnpfc_num_input_pics_minus1+1 specifies the number of pictures used as input for the NNPF. The value of nnpfc_num_input_pics_minus1 shall be in the range of 0 to 63, inclusive. When pictureRateUpsamplingFlag is equal to 1, the value of nnpfc_num_input_pics_minus1 shall be greater than 0.

The variable numInputPics, specifying the number of pictures used as input for the NNPF, is derived as follows:

numInputPics=nnpfc_num_input_pics_minus1+1 nnpfc_input_pic_output_flag[i] equal to 1 indicates that for the i-th input picture, the NNPF generates a corresponding output picture. nnpfc_input_pic_output_flag[i] equal to 0 indicates that for the i-th input picture, the NNPF does not generate a corresponding output picture. When nnpfc_num_input_pics_minus1 is equal to 0, nnpfc_input_pic_output_flag[0] is inferred to be equal to 1. When pictureRateUpsamplingFlag is equal to 0 and nnpfc_num_input_pics_minus1 is greater than 0, nnpfc_input_pic_output_flag[i] shall be equal to 1 for at least one value of i in the range of 0 to nnpfc_num_input_pics_minus1, inclusive.

nnpfc_absent_input_pic_zero_flag equal to 1 indicates that the NNPF expects an input picture that is not present in the bitstream to be represented by sample arrays with sample values equal to 0. nnpfc_absent_input_pic_flag equal to 0 indicates that the NNPF expects an input picture that is not present in the bitstream to be represented by the closest input picture in output order within the bitstream.

nnpfc_out_sub_c_flag specifies the values of the variables outSubWidthC and outSubHeightC when chromaUpsamplingFlag is equal to 1. nnpfc_out_sub_c_flag equal to 1 specifies that outSubWidthC is equal to 1 and outSubHeightC is equal to 1. nnpfc_out_sub_c_flag equal to 0 specifies that outSubWidthC is equal to 2 and outSubHeightC is equal to 1. When ChromaFormatIdc is equal to 2 and nnpfc_out_sub_c_flag is present, the value of nnpfc_out_sub_c_flag shall be equal to 1.

nnpfc_out_colour_format_idc, when colourizationFlag is equal to 1, specifies the color format of the NNPF output and consequently the values of the variables outSubWidthC and outSubHeightC. nnpfc_out_colour_format_idc equal to 1 specifies that the color format of the NNPF output is the 4:2:0 format and outSubWidthC and outSubHeightC are both equal to 2. nnpfc_out_colour_format_idc equal to 2 specifies that the color format of the NNPF output is the 4:2:2 format, outSubWidthC is equal to 2, and outSubHeightC is equal to 1. nnpfc_out_colour_format_idc equal to 3 specifies that the color format of the NNPF output is the 4:4:4 format and outSubWidthC and outSubHeightC are both equal to 1. The value of nnpfc_out_colour_format_idc shall not be equal to 0.

When chromaUpsamplingFlag and colourizationFlag are both equal to 0, outSubWidthC and outSubHeightC are inferred to be equal to SubWidthC and SubHeightC, respectively.

nnpfc_pic_width_num_minus1+1 and nnpfc_pic_width_denom_minus1+1 specify the numerator and denominator, respectively, for the resampling ratio of the NNPF output picture width relative to CroppedWidth. The value of (nnpfc_pic_width_num_minus1+1)÷(nnpfc_pic_width_denom_minus1+1) shall be in the range of 1÷16 to 16, inclusive. When nnpfc_pic_width_num_minus1 and nnpfc_pic_width_denom_minus1 are not present, the values of nnpfc_pic_width_num_minus1 and nnpfc_pic_width_denom_minus1 are both inferred to be equal to 0.

The variable nnpfcOutputPicWidth, indicating the width of the luma sample arrays of the picture resulting from applying the NNPF identified by nnpfc_id to the input picture, is derived as follows:

$$nnpfcOutputPicWidth = Ceil(CroppedWidth * (\text{nnpfc\_pic\_width\_num\_minus1} + 1) \div (\text{nnpfc\_pic\_width\_denom\_minus1} + 1)) \quad (78)$$

It is a requirement of bitstream conformance that the value of nnpfcOutputPicWidth % outSubWidthC shall be equal to 0.

nnpfc_pic_height_num_minus1+1 and nnpfc_pic_height_ denom_minus1+1 specify the numerator and denominator, respectively, for the resampling ratio of the NNPF output picture height relative to CroppedHeight. The value of (nnpfc_pic_height_num_minus1+1)÷(nnpfc_pic_height_denom_minus1+1) shall be in the range of 1÷16 to 16, inclusive. When nnpfc_pic_height_num_minus1 and nnpfc_pic_height_denom_minus1 are not present, the values of nnpfc_pic_height_num_minus1 and nnpfc_pic_height_denom_minus1 are both inferred to be equal to 0.

The variable nnpfcOutputPicHeight, indicating the height of the luma sample arrays of the picture resulting from applying the NNPF identified by nnpfc_id to the input picture, is derived as follows:

$$nnpfcOutputPicHeight = Ceil(CroppedHeight * (\text{nnpfc\_pic\_height\_num\_minus1} + 1) \div (\text{nnpfc\_pic\_height\_denom\_minus1} + 1)) \quad (79)$$

It is a requirement of bitstream conformance that the value of nnpfcOutputPicHeight % outSubHeightC shall be equal to 0.

When nnpfc_pic_width_num_minus1, nnpfc_pic_width_denom_minus1, nnpfc_pic_height_num_minus1, and nnpfc_pic_height_denom_minus1 are present, at least one of the followings shall be true.

The value of nnpfcOutputPicWidth is not equal to CroppedWidth.

The value of nnpfcOutputPicHeight is not equal to CroppedHeight. nnpfc_interpolated_pics[i] specifies the number of interpolated pictures generated by the NNPF between the i-th and (i+1)-th pictures used as input for the NNPF. The value of nnpfc_interpolated_pics[i] shall be in the range of 0 to 63, inclusive. The value of nnpfc_interpolated_pics[i] shall be greater than 0 for at least one value of i in the range of 0 to nnpfc_num_input_pics_minus1−1, inclusive.

The variables NumInpPicsInOutputTensor, specifying the number of pictures that have a corresponding input picture and are present in the output tensor of the NNPF, InpIdx [idx], specifying the input picture index of the idx-th picture that is present in the output tensor of the NNPF and has a corresponding input picture, and numOutputPics, specifying the total number of pictures present in the output tensor of the NNPF, are derived as follows.

```
for( i = 0, numOutputPics = 0; i < numInputPics; i++ )
if( nnpfc_input_pic_output_flag[ i ] ) {
InpIdx[ numOutputPics ] = i
numOutputPics++
}
NumInpPicsInOutputTensor = numOutputPics
if( pictureRateUpsamplingFlag )
for( i = 0; i <= numInputPics − 2; i++ )
numOutputPics += nnpfc_interpolated_pics[ i ]
```

nnpfc_component_last_flag equal to 1 indicates that the last dimension in the input tensor inputTensor to the NNPF and the output tensor outputTensor resulting from the NNPF is used for a current channel. nnpfc_component_last_flag equal to 0 indicates that the third dimension in the input tensor inputTensor to the NNPF and the output tensor outputTensor resulting from the NNPF is used for the current channel.

The first dimension in the input tensor and the output tensor is used for the batch index, which is a practice in some neural network frameworks. While formulae in the semantics of this SEI message use the batch size corresponding to the batch index equal to 0, it is up to the post-processing implementation to determine the batch size used as input to the neural network inference.

For example, when nnpfc_inp_order_idc is equal to 3 and nnpfc_auxiliary_inp_idc is equal to 1, there are 7 channels in the input tensor, including four luma matrices, two chroma matrices, and one auxiliary input matrix. In this case, the process DeriveInputTensors( ) would derive these 7 channels of the input tensor one by one, and when a particular one of these channels is processed, that channel is referred to as the current channel during the process.

nnpfc_inp_format_idc indicates the method of converting a sample value of the input picture to an input value to the NNPF. When nnpfc_inp_format_idc is equal to 0, the input values to the NNPF are real numbers and the functions InpY( ) and InpC( ) are specified as follows.

```
InpY( x ) = x ÷ ( ( 1 << BitDepthY ) − 1 )
InpC( x )= x ÷ ( ( 1 << BitDepthC ) − 1 )
When nnpfc_inp_format_idc is equal to 1, the input values to the NNPF are
unsigned
integer numbers and the functions InpY( ) and InpC( ) are specified as follows.
shiftY = BitDepthY − inpTensorBitDepthY
if( inpTensorBitDepthY >= BitDepthY)
InpY( x ) = x << ( inpTensorBitDepthY − BitDepthY )
else
InpY(x) = Clip3(0, (1 << inpTensorBitDepthY ) − 1, (x + (1 << (shiftY
− 1 ) ) ) >> shiftY )
shiftC = BitDepthC − inpTensorBitDepthC
If inpTensorBitDepthC >= BitDepthC
InpC(x) = x << ( inpTensorBitDepthC − BitDepthC )
else
InpC(x) = Clip3(0, (1 << inpTensorBitDepthC ) − 1, (x + (1 << (shiftC − 1 ) ) ) >>
shiftC )
```

The variable inpTensorBitDepthY is derived from the syntax element nnpfc_inp_tensor_luma_bitdepth_minus8 as specified below. The variable inpTensorBitDepthC is derived from the syntax element nnpfc_inp_tensor_chroma_bitdepth_minus8 as specified below.

Values of nnpfc_inp_format_idc greater than 1 are reserved for future specification by ITU-T | ISO/IEC and shall not be present in bitstreams conforming to this version of this document. Decoders conforming to this version of this document shall ignore NNPFC SEI messages that contain reserved values of nnpfc_inp_format_idc.

nnpfc_auxiliary_inp_idc greater than 0 indicates that auxiliary input data is present in the input tensor of the NNPF. nnpfc_auxiliary_inp_idc equal to 0 indicates that auxiliary input data is not present in the input tensor. nnpfc_auxiliary_inp_idc equal to 1 specifies that auxiliary input data is derived as specified in the formula (inpTensorBitDepthY=nnpfc_inp_tensor_luma_bitdepth_minus8+8).

The value of nnpfc_auxiliary_inp_idc shall be in the range of 0 to 1, inclusive, in bitstreams conforming to this version of this document. Values of 2 to 255, inclusive, for nnpfc_auxiliary_inp_idc are reserved for future use by ITU-T | ISO/IEC and shall not be present in bitstreams conforming to this version of this document. Decoders conforming to this version of this document shall ignore NNPFC SEI messages with nnpfc_auxiliary_inp_idc in the range of 2 to 255, inclusive. Values of nnpfc_auxiliary_inp_idc greater than 255 shall not be present in bitstreams conforming to this version of this document and are not reserved for future use.

nnpfc_inp_order_idc indicates the method of ordering the sample arrays of an input picture to form an input tensor to the NNPF.

The value of nnpfc_inp_order_idc shall be in the range of 0 to 3, inclusive, in bitstreams conforming to this version of this document. Values of 4 to 255, inclusive, for nnpfc_inp_order_idc are reserved for future use by ITU-T | ISO/IEC and shall not be present in bitstreams conforming to this version of this document. Decoders conforming to this version of this document shall ignore NNPFC SEI messages with nnpfc_inp_order_idc in the range of 4 to 255, inclusive. Values of nnpfc_inp_order_idc greater than 255 shall not be present in bitstreams conforming to this version of this document and are not reserved for future use.

When ChromaFormatIdc is not equal to 1, nnpfc_inp_order_idc shall not be equal to 3.

When ChromaFormatIdc is equal to 0, nnpfc_inp_order_idc shall be equal to 0.

When chromaUpsamplingFlag is equal to 1, nnpfc_inp_order_idc shall not be equal to 0.

Table 7 (Description of nnpfc_inp_order_idc values) contains an informative description of the values of nnpfc_inp_order_idc.

TABLE 7

| nnpfc_inp_order_idc | Description |
|---|---|
| 0 | If nnpfc_auxiliary_inp_idc is equal to 0, one luma matrix is present in the input tensor for each input picture, and the number of channels is 1. Otherwise, when nnpfc_auxiliary_inp_idc is equal to 1, one luma matrix and one auxiliary input matrix are present, and the number of channels is 2. |
| 1 | If nnpfc_auxiliary_inp_idc is equal to 0, two chroma matrices are present in the input tensor, and the number of channels is 2. Otherwise, when nnpfc_auxiliary_inp_idc is equal to 1, two chroma matrices and one auxiliary input matrix are present, and the number of channels is 3. |
| 2 | If nnpfc_auxiliary_inp_idc is equal to 0, one luma and two chroma matrices are present in the input tensor, and the number of channels is 3. Otherwise, when nnpfc_auxiliary_inp_idc is equal to 1, one luma matrix, two chroma matrices and one auxiliary input matrix are present, and the number of channels is 4. |
| 3 | If nnpfc_auxiliary_inp_idc is equal to 0, four luma matrices and two chroma matrices are present in the input tensor, and the number of channels is 6. Otherwise, when nnpfc_auxiliary_inp_idc is equal to 1, four luma matrices, two chroma matrices, and one auxiliary input matrix are present in the input tensor, and the number of channels is 7. The luma channels are derived in an interleaved manner as illustrated in FIGURE 12. This nnpfc_inp_order_idc can only be used when the input chroma format is 4:2:0. |
| 4 . . . 255 | Reserved |

Figures 25, 26:
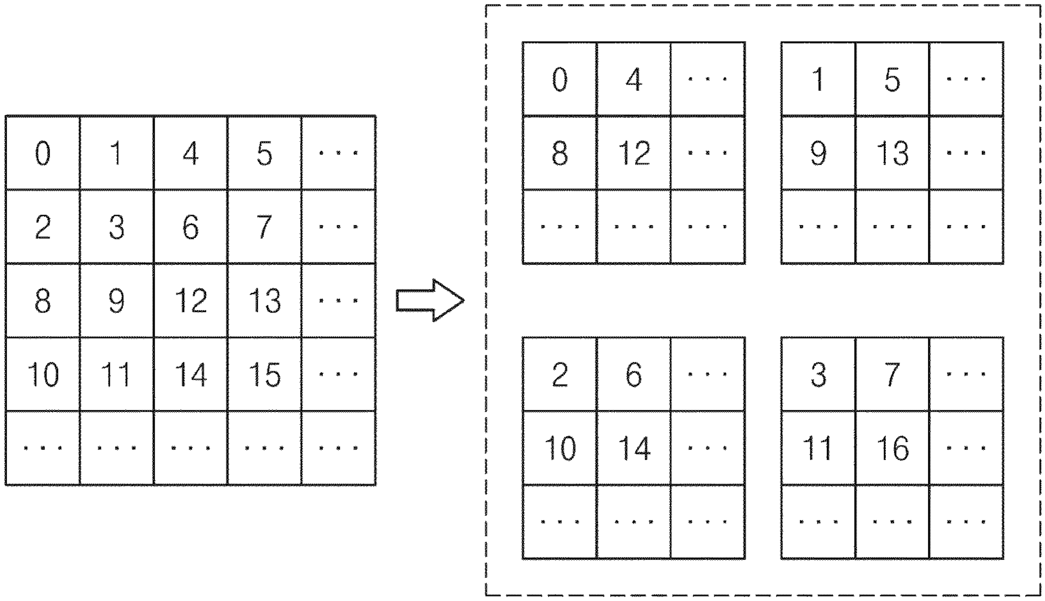
FIG. 25 illustrates a process of deriving a luma channel from a luma component according to embodiments.
FIG. 26 illustrates syntax for a neural-network post-filter activation SEI message according to embodiments.

FIG. 25 illustrates a process of deriving a luma channel from a luma component according to embodiments.

FIG. 25 is an illustration of deriving four luma channels (right) from the luma component when nnpfc_inp_order_idc is equal to 3.

nnpfc_inp_tensor_luma_bitdepth_minus8+8 specifies the bit depth of luma sample values in the input integer tensor. The value of inpTensorBitDepthY is derived as follows.

inpTensorBitDepthY=nnpfc_inp_tensor_luma_bitdepth_minus8+8 (85)

It is a requirement of bitstream conformance that the value of nnpfc_inp_tensor_luma_bitdepth_minus8 shall be in the range of 0 to 24, inclusive.

nnpfc_inp_tensor_chroma_bitdepth_minus8+8 specifies the bit depth of chroma sample values in the input integer tensor. The value of inpTensorBitDepthC is derived as follows.

inpTensorBitDepthC=nnpfc_inp_tensor_chroma_bitdepth_minus8+8

It is a requirement of bitstream conformance that the value of nnpfc_inp_tensor_chroma_bitdepth_minus8 shall be in the range of 0 to 24, inclusive.

When nnpfc_auxiliary_inp_idc is equal to 1, the variable strengthControlScaledVal is derived as follows.

```
for( i = 0; i < numInputPics; i++ )
if( nnpfc_inp_format_idc = = 1 )
if( nnpfc_inp_order_idc = = 0 || nnpfc_inp_order_idc = = 2 ||
nnpfc_inp_order_idc = = 3 )
strengthControlScaledVal[ i ] =
Floor ( StrengthControlVal[ i ] * ( ( 1 << inpTensorBitDepthY ) − 1 ) )
else if( nnpfc_inp_order_idc = = 1 )
strengthControlScaledVal[ i ] =
Floor ( StrengthControlVal[ i ] * ( ( 1 << inpTensorBitDepthC ) − 1 ) )
else
strengthControlScaledVal[ i ] = StrengthControlVal[ i ]
```

A patch is a rectangular array of samples extracted from a component (e.g., a luma or chroma component) of a picture.

The process DeriveInputTensorso for deriving the input tensor inputTensor for a given vertical sample coordinate cTop and horizontal sample coordinate cLeft specifying the top-left sample location for the patch of samples included in the input tensor, and is defined as follows.

```
for( i = 0; i < numInputPics; i++ ) {
  if( nnpfc_inp_order_idc = = 0 )
  for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
    inpVal = InpY( InpSampleVal( cTop + yP, cLeft + xP, CroppedHeight,
      CroppedWidth, CroppedYPic[ i ], 0 ) )
      yPovlp = yP + nnpfc_overlap
      xPovlp = xP + nnpfc_overlap
      if( !nnpfc_component_last_flag )
      inputTensor[ 0 ][ i ][ 0 ][ yPovlp ][ xPovlp ] = inpVal
      else
      inputTensor[ 0 ][ i ][ yPovlp ][ xPovlp ][ 0 ] = inpVal
      if( nnpfc_auxiliary_inp_idc = = 1 )
      if( !nnpfc_component_last_flag )
      inputTensor[ 0 ][ i ][ 1 ][ yPovlp ][ xPovlp ] = strengthControlScaledVal[ i ]
      else
      inputTensor[ 0 ][ i ][ yPovlp ][ xPovlp ][ 1 ] = strengthControlScaledVal[ i ]
      }
  else if( nnpfc_inp_order_idc = = 1 )
    for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
    inpCbVal = InpC( InpSampleVal( cTop + yP, cLeft + xP, CroppedHeight / SubHeightC,
    CroppedWidth / SubWidthC, CroppedCbPic[ i ], 1 ) )
    inpCrVal = InpC( InpSampleVal( cTop + yP, cLeft + xP, CroppedHeight / SubHeightC,
    CroppedWidth / SubWidthC, CroppedCrPic[ i ], 2 ) )
    yPovlp = yP + nnpfc_overlap
    xPovlp = xP + nnpfc_overlap
    if( !nnpfc_component_last_flag ) {
    inputTensor[ 0 ][ i ][ 0 ][ yPovlp ][ xPovlp ] = inpCbVal
    inputTensor[ 0 ][ i ][ 1 ][ yPovlp ][ xPovlp ] = inpCrVal
    } else {
    inputTensor[ 0 ][ i ][ yPovlp ][ xPovlp ][ 0 ] = inpCbVal
    inputTensor[ 0 ][ i ][ yPovlp ][ xPovlp ][ 1 ] = inpCrVal
    }
    if( nnpfc_auxiliary_inp_idc = = 1 )
    if( !nnpfc_component_last_flag )
    inputTensor[ 0 ][ i ][ 2 ][ yPovlp ][ xPovlp ] = strengthControlScaledVal[ i ]
    else
    inputTensor[ 0 ][ i ][ yPovlp ][ xPovlp ][ 2 ] = strengthControlScaledVal[ i ]
    }
  else if( nnpfc_inp_order_idc = = 2 )
    for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
    yY = cTop + yP
    xY = cLeft + xP
    yC = yY / SubHeightC
    xC = xY / SubWidthC
    inpYVal = InpY( InpSampleVal( yY, xY, CroppedHeight,
    CroppedWidth, CroppedYPic[ i ], 0 ) )
    inpCbVal = InpC( InpSampleVal( yC, xC, CroppedHeight / SubHeightC,
    CroppedWidth / SubWidthC, CroppedCbPic[ i ], 1 ) )
    inpCrVal = InpC( InpSampleVal( yC, xC, CroppedHeight / SubHeightC,
```

-continued

```
    CroppedWidth / SubWidthC, CroppedCrPic[ i ], 2 ) )
    yPovlp = yP + nnpfc_overlap
    xPovlp = xP + nnpfc_overlap
    if( !nnpfc_component_last_flag ) {
      inputTensor[ 0 ][ i ][ 0 ][ yPovlp ][ xPovlp ] = inpYVal
      inputTensor[ 0 ][ i ][ 1 ][ yPovlp ][ xPovlp ] = inpCbVal
      inputTensor[ 0 ][ i ][ 2 ][ yPovlp ][ xPovlp ] = inpCrVal
    } else {
      inputTensor[ 0 ][ i ][ yPovlp ][ xPovlp ][ 0 ] = inpYVal
      inputTensor[ 0 ][ i ][ yPovlp ][ xPovlp ][ 1 ] = inpCbVal
      inputTensor[ 0 ][ i ][ yPovlp ][ xPovlp ][ 2 ] = inpCrVal
      }
    if( nnpfc_auxiliary_inp_idc = = 1 )
      if( !nnpfc_component_last_flag )
      inputTensor[ 0 ][ i ][ 3 ][ yPovlp ][ xPovlp ] = strengthControlScaledVal[ i ]
      else
      inputTensor[ 0 ][ i ][ yPovlp ][ xPovlp ][ 3 ] = strengthControlScaledVal[ i ]
      }
  else if( nnpfc_inp_order_idc = = 3 )
    for( yP = −nnpfc_overlap; yP < inpPatchHeight + nnpfc_overlap; yP++)
    for( xP = −nnpfc_overlap; xP < inpPatchWidth + nnpfc_overlap; xP++ ) {
      yTL = cTop + yP * 2
      xTL = cLeft + xP * 2
      yBR = yTL + 1
      xBR = xTL + 1
      yC = cTop / 2 + yP
      xC = cLeft / 2 + xP
      inpTLVal = InpY( InpSampleVal( yTL, xTL, CroppedHeight,
      CroppedWidth, CroppedYPic[ i ], 0 ) )
      inpTRVal = InpY( InpSampleVal( yTL, xBR, CroppedHeight,
      CroppedWidth, CroppedYPic[ i ], 0 ) )
      inpBLVal = InpY( InpSampleVal( yBR, xTL, CroppedHeight,
      CroppedWidth, CroppedYPic[ i ], 0 ) )
      inpBRVal = InpY( InpSampleVal( yBR, xBR, CroppedHeight,
      CroppedWidth, CroppedYPic[ i ], 0 ) )
      inpCbVal = InpC( InpSampleVal( yC, xC, CroppedHeight / 2,
      CroppedWidth / 2, CroppedCbPic[ i ], 1 ) )
        inpCrVal = InpC( InpSampleVal( yC, xC, CroppedHeight / 2,
          CroppedWidth / 2, CroppedCrPic[ i ], 2 ) )
        yPovlp = yP + nnpfc_overlap
        xPovlp = xP + nnpfc_overlap
        if( !nnpfc_component_last_flag ) {
        inputTensor[ 0 ][ i ][ 0 ][ yPovlp ][ xPovlp ] = inpTLVal
        inputTensor[ 0 ][ i ][ 1 ][ yPovlp ][ xPovlp ] = inpTRVal
        inputTensor[ 0 ][ i ][ 2 ][ yPovlp ][ xPovlp ] = inpBLVal
        inputTensor[ 0 ][ i ][ 3 ][ yPovlp ][ xPovlp ] = inpBRVal
        inputTensor[ 0 ][ i ][ 4 ][ yPovlp ][ xPovlp ] = inpCbVal
        inputTensor[ 0 ][ i ][ 5 ][ yPovlp ][ xPovlp ] = inpCrVal
        } else {
          inputTensor[ 0 ][ i ][ yPovlp ][ xPovlp ][ 0 ] = inpTLVal
          inputTensor[ 0 ][ i ][ yPovlp ][ xPovlp ][ 1 ] = inpTRVal
          inputTensor[ 0 ][ i ][ yPovlp ][ xPovlp ][ 2 ] = inpBLVal
          inputTensor[ 0 ][ i ][ yPovlp ][ xPovlp ][ 3 ] = inpBRVal
          inputTensor[ 0 ][ i ][ yPovlp ][ xPovlp ][ 4 ] = inpCbVal
          inputTensor[ 0 ][ i ][ yPovlp ][ xPovlp ][ 5 ] = inpCrVal
        }
      if( nnpfc_auxiliary_inp_idc = = 1 )
        if( !nnpfc_component_last_flag )
        inputTensor[ 0 ][ i ][ 6 ][ yPovlp ][ xPovlp ] = strengthControlScaledVal[ i ]
      else
        inputTensor[ 0 ][ i ][ yPovlp ][ xPovlp ][ 6 ] = strengthControlScaledVal[ i ]
      }
}
```

nnpfc_out_format_idc equal to 0 indicates that the sample values output by the NNPF are real numbers where the value range of 0 to 1, inclusive, maps linearly to the unsigned integer value range of 0 to (1<<bitDepth)−1, inclusive, for any desired bit depth bitDepth for subsequent post-processing or display.

nnpfc_out_format_idc equal to 1 indicates that the luma sample values output by the NNPF are unsigned integer numbers in the range of 0 to (1<<outTensorBitDepthY)−1, inclusive, and that the chroma sample values output by the NNPF are unsigned integer numbers in the range of 0 to (1<<outTensorBitDepthC)−1, inclusive.

Values of nnpfc_out_format_idc greater than 1 are reserved for future specification by ITU-T | ISO/IEC and shall not be present in bitstreams conforming to this version of this document. Decoders conforming to this version of this document shall ignore NNPFC SEI messages that contain reserved values of nnpfc_out_format_idc.

nnpfc_out_order_idc indicates the output order of samples resulting from the NNPF.

The value of nnpfc_out_order_idc shall be in the range of 0 to 3, inclusive, in bitstreams conforming to this version of this document. Values of 4 to 255, inclusive, for nnpfc_out_order_idc are reserved for future use by ITU-T | ISO/IEC and shall not be present in bitstreams conforming to this version of this document. Decoders conforming to this version of this document shall ignore NNPFC SEI messages with nnpfc_out_order_idc in the range of 4 to 255, inclusive. Values of nnpfc_out_order_idc greater than 255 shall not be present in bitstreams conforming to this version of this document and are not reserved for future use.

When chromaUpsamplingFlag is equal to 1, nnpfc_out_order_idc shall not be equal to 0 or 3.

When colourizationFlag is equal to 1, nnpfc_out_order_idc shall not be equal to 0.

Table 8 (Description of nnpfc_out_order_idc values) contains an informative description of nnpfc_out_order_idc values.

TABLE 8

| nnpfc_out_ order_idc | Description |
|---|---|
| 0 | Only the luma matrix is present in the output tensor, thus the number of channels is 1. |
| 1 | Only the chroma matrices are present in the output tensor, thus the number of channels is 2. |
| 2 | The luma and chroma matrices are present in the output tensor, thus the number of channels is 3. |
| 3 | Four luma matrices and two chroma matrices are present in the output tensor, thus the number of channels is 6. This nnpfc_out_order_idc can only be used when the output chroma format is 4:2:0. |
| 4 . . . 255 | Reserved |

nnpfc_out_tensor_luma_bitdepth_minus8+8 specifies the bit depth of luma sample values in the output integer tensor. The value of nnpfc_out_tensor_luma_bitdepth_minus8 shall be in the range of 0 to 24, inclusive. The value of outTensorflitDepthY is derived as follows.

outTensorflitDepthY=nnpfc_out_tensor_luma_bitdepth_minus8+8 nnpfc_out_tensor_chroma_bitdepth_minus8+8 specifies the bit depth of chroma sample values in the output integer tensor. The value of nnpfc_out_tensor_chroma_bitdepth_minus8 shall be in the range of 0 to 24, inclusive. The value of outTensorflitDepthC is derived as follows.

outTensorflitDepthC=nnpfc_out_tensor_chroma_bitdepth_minus8+8

When bitDepthUpsamplingFlag is equal to 1, the value of nnpfc_out_format_idc shall be equal to 1 and at least one of the following conditions shall be true.

nnpfc_out_tensor_luma_bitdepth_minus8 is present and outTensorflitDepthY is greater than BitDepthY nnpfc_out_tensor_chroma_bitdepth_minus8 is present and outTensorflitDepthC is greater than BitDepthC.

When nnpfc_inp_tensor_luma_bitdepth_minus8, nnpfc_inp_tensor_chroma_bitdepth_minus8, nnpfc_out_tensor_luma_bitdepth_minus8, and nnpfc_out_tensor_chroma_bitdepth_minus8 are present, and outTensorBitDepthY is greater than inpTensorBitDepthY, outTensorBitDepthC shall not be less than inpTensorBitDepthC. When nnpfc_inp_tensor_luma_bitdepth_minus8, nnpfc_inp_tensor_chroma_bitdepth_minus8, nnpfc_out_tensor_luma_bitdepth_minus8, and nnpfc_out_tensor_chroma_bitdepth_minus8 are present, and outTensorBitDepthC is greater than inpTensorBitDepthC, outTensorBitDepthY shall not be less than inpTensorBitDepthY The process StoreOutputTensorso for deriving sample values in the filtered output sample arrays FilteredYPic, FilteredCbPic, and FilteredCrPic from the output tensor outputTensor for a given vertical sample coordinate cTop and horizontal sample coordinate cLeft specifying the top-left sample location for the patch of samples included in the input tensor is specified as follows.

```
for( i = 0; i < numOutputPics; i++ ) {
  if( nnpfc__out__order__idc = = 0 )
    for( yP = 0; yP < outPatchHeight; yP++)
    for( xP = 0; xP < outPatchWidth; xP++ ) {
      yY = cTop * outPatchHeight / inpPatchHeight + yP
      xY = cLeft * outPatchWidth / inpPatchWidth + xP
      if ( yY < nnpfcOutputPicHeight && xY < nnpfcOutputPicWidth )
        if( !nnpfc__component__last__flag )
        FilteredYPic[ i ][ xY ][yY ] = outputTensor[ 0 ][ i ][ 0 ][ yP ][ xP ]
          else
        FilteredYPic[ i ][ xY ][ yY ] = outputTensor[ 0 ][ i ][ yP ][ xP ][ 0 ] }
  else if( nnpfc__out__order__idc = = 1 ) (91)
    for( yP = 0; yP < outPatchCHeight; yP++)
    for( xP = 0; xP < outPatchCWidth; xP++ ) {
      xSrc = cLeft * horCScaling + xP
      ySrc = cTop * verCScaling + yP
      if ( ySrc < nnpfcOutputPicHeight / outSubHeightC &&
        xSrc < nnpfcOutputPicWidth / outSubWidthC )
      if( !nnpfc__component__last__flag ) {
      FilteredCbPic[ i ][ xSrc ][ ySrc ] = outputTensor[ 0 ][ i ][ 0 ][ yP ][ xP ]
      FilteredCrPic[ i ][ xSrc ][ ySrc ] = outputTensor[ 0 ][ i ][ 1 ][ yP ][ xP ]
      } else {
      FilteredCbPic[ i ][ xSrc ][ ySrc ] = outputTensor[ 0 ][ i ][ yP ][ xP ][ 0 ]
      FilteredCrPic[ i ][ xSrc ][ ySrc ] = outputTensor[ 0 ][ i ][ yP ][ xP ][ 1 ]
          }
      }
  else if( nnpfc__out__order__idc = = 2 )
    for( yP = 0; yP < outPatchHeight; yP++)
    for( xP = 0; xP < outPatchWidth; xP++ ) {
      yY = cTop * outPatchHeight / inpPatchHeight + yP
      xY = cLeft * outPatchWidth / inpPatchWidth + xP
      yC = yY / outSubHeightC
      xC = xY / outSubWidthC
      yPc = ( yP / outSubHeightC ) * outSubHeightC
      xPc = ( xP / outSubWidthC ) * outSubWidthC
```

-continued

```
        if ( yY < nnpfcOutputPicHeight && xY < nnpfcOutputPicWidth )
        if( !nnpfc_component_last_flag ) {
        FilteredYPic[ i ][ xY ][ yY ] = outputTensor[ 0 ][ i ][ 0 ][ yP ][ xP ]
        FilteredCbPic[ i ][ xC ][ yC ] = outputTensor[ 0 ][ i ][ 1 ][ yPc ][ xPc ]
        FilteredCrPic[ i ][ xC ][ yC ] = outputTensor[ 0 ][ i ][ 2 ][ yPc ][ xPc ]
        } else {
        FilteredYPic[ i ][ xY ][ yY ] = outputTensor[ 0 ][ i ][ yP ][ xP ][ 0 ]
        FilteredCbPic[ i ][ xC ][ yC ] = outputTensor[ 0 ][ i ][ yPc ][ xPc ][ 1 ]
        FilteredCrPic[ i ][ xC ][ yC ] = outputTensor[ 0 ][ i ][ yPc ][ xPc ][ 2 ]
            }
        }
  else if( nnpfc_out_order_idc = = 3 )
     for( yP = 0; yP < outPatchHeight; yP++ )
     for( xP = 0; xP < outPatchWidth; xP++ ) {
        ySrc = cTop / 2 * outPatchHeight / inpPatchHeight + yP
        xSrc = cLeft / 2 * outPatchWidth / inpPatchWidth + xP
        if ( ySrc < nnpfcOutputPicHeight / 2 &&
        xSrc < nnpfcOutputPicWidth / 2 )
        if( !nnpfc_component_last_flag ) {
     FilteredYPic[ i ][ xSrc * 2 ][ ySrc * 2 ] = outputTensor[ 0 ][ i ][ 0 ][ yP ][ xP ]
     FilteredYPic[ i ][ xSrc * 2 + 1 ][ ySrc * 2 ] = outputTensor[ 0 ][ i ][ 1 ][ yP ][ xP ]
     FilteredYPic[ i ][ xSrc * 2 ][ ySrc * 2 + 1 ] = outputTensor[ 0 ][ i ][ 2 ][ yP ][ xP ]
     FilteredYPic[ i ][ xSrc * 2 + 1][ ySrc * 2 + 1 ] = outputTensor[ 0 ][ i ][ 3 ][ yP ][ xP ]
     FilteredCbPic[ i ][ xSrc ][ ySrc ] = outputTensor[ 0 ][ i ][ 4 ][ yP ][ xP ]
     FilteredCrPic[ i ][ xSrc ][ ySrc ] = outputTensor[ 0 ][ i ][ 5 ][ yP ][ xP ]
        } else {
     FilteredYPic[ i ][ xSrc * 2 ][ ySrc * 2 ] = outputTensor[ 0 ][ i ][ yP ][ xP ][ 0 ]
     FilteredYPic[ i ][ xSrc * 2 + 1 ][ ySrc * 2 ] = outputTensor[ 0 ][ i ][ yP ][ xP ][ 1 ]
     FilteredYPic[ i ][ xSrc * 2 ][ ySrc * 2 + 1 ] = outputTensor[ 0 ][ i ][ yP ][ xP ][ 2 ]
     FilteredYPic[ i ][ xSrc * 2 + 1][ ySrc * 2 + 1 ] = outputTensor[ 0 ][ i ][ yP ][ xP ][ 3 ]
     FilteredCbPic[ i ][ xSrc ][ ySrc ] = outputTensor[ 0 ][ i ][ yP ][ xP ][ 4 ]
     FilteredCrPic[ i ][ xSrc ][ ySrc ] = outputTensor[ 0 ][ i ][ yP ][ xP ][ 5 ]
            }
        }
}
```

nnpfc_separate_colour_description_present_flag equal to 1 indicates that a distinct combination of color primaries, transfer characteristics, matrix coefficients, and scaling and offset values applied in association with the matrix coefficients for the picture resulting from the NNPF is specified in the SEI message syntax structure. nnpfc_separate_colour_description_present_flag equal to 0 indicates that the combination of color primaries, transfer characteristics, matrix coefficients, and scaling and offset values applied in association with the matrix coefficients for the picture resulting from the NNPF is the same as specified in VUI parameters for the CLVS.

nnpfc_colour_primaries has the same semantics as the syntax element vui_colour_primaries, except for the followings.

nnpfc_colour_primaries specifies the color primaries of the picture resulting from applying the NNPF specified in the SEI message, rather than the color primaries used for the CLVS.

When nnpfc_colour_primaries is not present in the NNPFC SEI message, the value of nnpfc_colour_primaries is inferred to be equal to vui_colour_primaries.

nnpfc_transfer_characteristics has the same semantics as the syntax element vui_transfer_characteristics, except for the followings.

nnpfc_transfer_characteristics specifies the transfer characteristics of the picture resulting from applying the NNPF specified in the SEI message, rather than the transfer characteristics used for the CLVS.

When nnpfc_transfer_characteristics is not present in the NNPFC SEI message, the value of nnpfc_transfer_characteristics is inferred to be equal to vui_transfer_characteristics.

nnpfc_matrix_coeffs describes the equations used in deriving luma and chroma signals from the green, blue, and red, or Y, Z, and X primaries. The semantics of this function apply to the pictures resulting from applying the NNPF specified in this SEI message and are as specified for MatrixCoefficients in Rec. ITU-T H.273 | ISO/IEC 23091-2 with BitDepthY and BitDepthC being equal to outTensorBitDepthY and outTensorBitDepthC, respectively.

When nnpfc_matrix_coeffs is not present in the NNPFC SEI message, the value of nnpfc_matrix_coeffs is inferred to be equal to vui_matrix_coeffs.

nnpfc_matrix_coeffs shall not be equal to 0 unless both of the following conditions are true.

nnpfc_out_tensor_chroma_bitdepth_minus8 is equal to nnpfc_out_tensor_luma_bitdepth_minus8.

nnpfc_out_order_idc is equal to 2, outSubHeightC is equal to 1, and outSubWidthC is equal to 1.

nnpfc_matrix_coeffs shall not be equal to 8 unless one of the following conditions is true.

nnpfc_out_tensor_chroma_bitdepth_minus8 is equal to nnpfc_out_tensor_luma_bitdepth_minus8.

nnpfc_out_tensor_chroma_bitdepth_minus8 is equal to nnpfc_out_tensor_luma_bitdepth_minus8+1, nnpfc_out_order_idc is equal to 2, outSubHeightC is equal to 1, and outSubWidthC is equal to 1.

nnpfc_full_range_flag indicates the scaling and offset values applied in association with the matrix coefficients as specified by nnpfc_matrix_coeffs. Its semantics are as specified for the parameter VideoFullRangeFlag in Rec. ITU-T H.273 | ISO/IEC 23091-2. When not present, the value of nnpfc_full_range_flag is inferred to be equal to 0.

nnpfc_chroma_loc_info_present_flag equal to 1 indicates the presence of the syntax element nnpfc_chroma_sample_loc_type_frame in the NNPFC SEI message. nnpfc_chroma_loc_info_present_flag equal to 0 indicates the absence of the syntax element nnpfc_chroma_sample_loc_type_frame in the NNPFC SEI message. When colourizationFlag is equal to 0 or nnpfc_out_colour_format_idc is not equal to 1, the value of nnpfc_chroma_loc_info_present_flag shall be equal to 0.

nnpfc_chroma_sample_loc_type_frame not equal to 6 and nnpfc_out_colour_format_idc equal to 1 specify the location of chroma samples of the output pictures. nnpfc_chroma_sample_loc_type_frame equal to 6 and nnpfc_out_colour_format_idc equal to 1 indicate that the location of the chroma samples is unknown or unspecified or specified by other means not specified in this document. The value of nnpfc_chroma_sample_loc_type_frame shall be in the range of 0 to 6, inclusive.

nnpfc_overlap indicates the overlapping horizontal and vertical sample counts of adjacent input tensors of the NNPF. The value of nnpfc_overlap shall be in the range of 0 to 16,383, inclusive.

nnpfc_constant_patch_size_flag equal to 1 indicates that the NNPF accepts exactly the patch size indicated by nnpfc_patch_width_minus1 and nnpfc_patch_height_minus1 as input. nnpfc_constant_patch_size_flag equal to 0 indicates that the NNPF accepts as input any patch size with width inpPatchWidth and height inpPatchHeight. In this case, the width of an extended patch (i.e., a patch plus the overlapping area), which is equal to inpPatchWidth+2*nnpfc_overlap, is a positive integer multiple of nnpfc_extended_patch_width_cd_delta_minus1+1+2*nnpfc_overlap, and the height of the extended patch, which is equal to inpPatchHeight+2*nnpfc_overlap, is a positive integer multiple of nnpfc_extended_patch_height_cd_delta_minus1+1+2*nnpfc_overlap.

nnpfc_patch_width_minus1 plus 1, when nnpfc_constant_ patch_size_flag is equal to 1, indicates the horizontal sample counts of the patch size required for the input to the NNPF. The value of nnpfc_patch_width_minus1 shall be in the range of 0 to Min(32,766, CroppedWidth−1), inclusive.

nnpfc_patch_height_minus1 plus 1, when nnpfc_constant_patch_size_flag is equal to 1, indicates the vertical sample counts of the patch size required for the input to the NNPF. The value of nnpfc_patch_height_minus1 shall be in the range of 0 to Min(32,766, CroppedHeight−1), inclusive.

nnpfc_extended_patch_width_cd_delta_minus1+1+2*nnpfc_overlap, when nnpfc_constant_patch_size_flag is equal to 0, indicates a common divisor of all allowed values of the width of an extended patch required for the input to the NNPF. The value of nnpfc_extended_patch_width_cd_delta_minus1 shall be in the range of 0 to Min(32,766, CroppedWidth−1), inclusive.

nnpfc_extended_patch_height_cd_delta_minus1+1+2*nnpfc_overlap, when nnpfc_constant_patch_size_flag is equal to 0, indicates a common divisor of all allowed values of the height of an extended patch required for the input to the NNPF. The value of nnpfc_extended_patch_height_cd_delta_minus1 shall be in the range of 0 to Min(32,766, CroppedHeight−1), inclusive.

Let the variables inpPatchWidth and inpPatchHeight be the patch size width and the patch size height, respectively.

When nnpfc_constant_patch_size_flag is equal to 0, the following applies.

The values of inpPatchWidth and inpPatchHeight are either provided by external means not specified in this document or set by the post-processor itself.

The value of inpPatchWidth+2*nnpfc_overlap shall be a positive integer multiple of nnpfc_extended_patch_width_cd_delta_minus1+1+2*nnpfc_overlap, and inpPatchWidth shall be less than or equal to CroppedWidth. The value of inpPatchHeight+2*nnpfc_overlap shall be a positive integer multiple of nnpfc_extended_patch_height_cd_delta_minus1+1+2*nnpfc_overlap, and inpPatchHeight shall be less than or equal to CroppedHeight.

Otherwise (when nnpfc_constant_patch_size_flag is equal to 1), the value of inpPatchWidth is set equal to nnpfc_patch_width_minus1+1, and the value of inpPatchHeight is set equal to nnpfc_patch_height_minus1+1.

The variables outPatchWidth, outPatchHeight, horCScaling, verCScaling, outPatchCWidth, and outPatchCHeight are derived as follows.

$$outPatchWidth = (nnpfcOutputPicWidth * inpPatchWidth)/CroppedWidth$$

$$outPatchHeight = (nnpfcOutputPicHeight * inpPatchHeight)/CroppedHeight$$

$$horCScaling = SubWidthC/outSubWidthC$$

$$verCScaling = SubHeightC/outSubHeightC$$

$$outPatchCWidth = outPatchWidth * horCScaling$$

$$outPatchCHeight = outPatchHeight * verCScaling$$

It is a requirement of bitstream conformance that outPatchWidth*CroppedWidth shall be equal to nnpfcOutputPicWidth*inpPatchWidth and outPatchHeight*CroppedHeight shall be equal to nnpfcOutputPicHeight*inpPatchHeight.

nnpfc_padding_type indicates the process of padding when referencing sample locations outside the boundaries of the input picture as described in Table 9 (Informative description of nnpfc_padding_type values). The value of nnpfc_padding_type shall be in the range of 0 to 4, inclusive, in bitstreams conforming to this version of this document. Values of 5 to 15, inclusive, for nnpfc_padding_type are reserved for future use by ITU-T | ISO/IEC and shall not be present in bitstreams conforming to this version of this document. Decoders conforming to this version of this document shall ignore NNPFC SEI messages with nnpfc_padding_type in the range of 5 to 15, inclusive. Values of nnpfc_padding_type greater than 15 shall not be present in bitstreams conforming to this version of this document and are not reserved for future use.

TABLE 9

| nnpfc_padding_type | Description |
|---|---|
| 0 | Zero padding |
| 1 | Replication padding |
| 2 | Reflection padding |
| 3 | Wrap-around padding |
| 4 | Fixed padding |
| 5 . . . 15 | reserved |

nnpfc_luma_padding_val indicates the luma value to be used for padding when nnpfc_padding_type is equal to 4. The value of nnpfc_luma_padding_val shall be in the range of 0 to (1<<BitDepthY)−1, inclusive.

nnpfc_cb_padding_val indicates the Cb value to be used for padding when nnpfc_padding_type is equal to 4. The value of nnpfc_cbpadding_val shall be in the range of 0 to (1<<BitDepthC)−1, inclusive.

nnpfc_cr_padding_val indicates the Cr value to be used for padding when nnpfc_padding_type is equal to 4. The value of nnpfc_crpadding_val shall be in the range of 0 to (1<<BitDepthC)−1, inclusive.

The function InpSampleVal(y, x, picHeight, picWidth, croppedPic, cIdx) having a vertical sample location y, a horizontal sample location x, a picture height picHeight, a picture width picWidth, sample array croppedPic, and component index cIdx (equal to 0 for luma, 1 for Cb, and 2 for Cr) as inputs returns the value of sampleVal derived as follows.

For the inputs to the function InpSampleVal( ), the vertical location is listed before the horizontal location for compatibility with input tensor conventions of some inference engines.

```
if( nnpfc_padding_type = = 0 )
  if( y < 0 || x < 0 || y >= picHeight || x >= picWidth )
    sampleVal = 0
  else
    sampleVal = croppedPic[ x ][ y ] (98)
else if( nnpfc_padding_type = = 1 )
  sampleVal = croppedPic[ Clip3( 0, picWidth − 1, x ) ][ Clip3( 0, picHeight − 1, y ) ]
else if( nnpfc_padding_type = = 2 )
  sampleVal = croppedPic[ Reflect( picWidth − 1, x ) ][ Reflect( picHeight − 1, y ) ]
else if( nnpfc_padding_type = = 3 )
  if( y >= 0 && y < picHeight )
    sampleVal = croppedPic[ Wrap( picWidth − 1, x ) ][ y ]
else if( nnpfc_padding_type = = 4 )
  if( y < 0 || x < 0 || y >= picHeight || x >= picWidth )
    sampleVal = ( cIdx = = 0 ? nnpfc_luma_padding_val :
      ( cIdx = = 1 ? nnpfc_cb_padding_val : nnpfc_cr_padding_val ) )
  else
    sampleVal = croppedPic[ x ][ y ]
```

An NNPF PostProcessingFilter( ) is the target NNPF as derived in the semantics of the NNPFA SEI message. The following example process may be used, with the NNPF PostProcessingFilter( ), to generate, in a patch-wise manner, the filtered and/or interpolated pictures, which contain Y, Cb, and Cr sample arrays FilteredYPic, FilteredCbPic, and FilteredCrPic, respectively, as indicated by nnpfc_out_order_idc.

```
if( nnpfc_inp_order_idc = = 0 || nnpfc_inp_order_idc = = 2 )
  for( cTop = 0; cTop < CroppedHeight; cTop += inpPatchHeight )
    for( cLeft = 0; cLeft < CroppedWidth; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 1 )
  for( cTop = 0; cTop < CroppedHeight / SubHeightC; cTop += inpPatchHeight )
  for( cLeft = 0; cLeft < CroppedWidth / SubWidthC; cLeft += inpPatchWidth ) {
      DeriveInputTensors( )
      outputTensor = PostProcessingFilter( inputTensor )
      StoreOutputTensors( )
    }
else if( nnpfc_inp_order_idc = = 3 )
  for( cTop = 0; cTop < CroppedHeight; cTop += inpPatchHeight * 2 )
    for( cLeft = 0; cLeft < CroppedWidth; cLeft += inpPatchWidth * 2 ) {
      DeriveInputTensors( )
      outputTensor = PostProcessingFilter( inputTensor )
      StoreOutputTensors( )
    }
```

An NNPF-generated picture with index i contains sample arrays FilteredYPic[i], FilteredCbPic[i], and FilteredCrPic[i], when present, that are derived by the equation (cLeft=0; cLeft<CroppedWidth/SubWidthC; cLeft+=inpPatchWidth) above. An NNPF-generated picture does not include the overlap regions.

The NNPF process consists of the process defined by the equation (cLeft=0; cLeft<CroppedWidth/SubWidthC; cLeft+=inpPatchWidth) followed by outputting NNPF-generated pictures in ascending order of the index, where all NNPF-generated pictures interpolated by the NNPF are output and the NNPF-generated pictures that correspond to any input pictures to the NNPF are output as specified in the semantics of the NNPFA SEI message.

nnpfc_complexity_info_present_flag equal to 1 specifies that one or more syntax elements that indicate the complexity of the NNPF associated with nnpfc_id are present. nnpfc_complexity_info_present_flag equal to 0 specifies that no syntax elements that indicate the complexity of the NNPF associated with the nnpfc_id are present.

nnpfc_parameter_type_idc equal to 0 indicates that the neural network uses only integer parameters. nnpfc_parameter_type_flag equal to 1 indicates that the neural network may use floating point or integer parameters. nnpfc_parameter_type_idc equal to 2 indicates that the neural network uses only binary parameters. nnpfc_parameter_type_idc equal to 3 is reserved for future use by ITU-T | ISO/IEC and shall not be present in bitstreams conforming to this version of this document. Decoders conforming to this version of this document shall ignore NNPFC SEI messages with nnpfc_parameter_type_idc equal to 3.

nnpfc_log2_parameter_bit_length_minus3 equal to 0, 1, 2, and 3 indicates that the neural network does not use parameters of bit length greater than 8, 16, 32, and 64, respectively. When nnpfc_parameter_type_idc is present and nnpfc_log2_parameter_bit_length_minus3 is not present, the neural network does not use parameters of bit length greater than 1.

nnpfc_num_parameters_idc indicates the maximum number of neural network parameters for the NNPF in units of a power of 2,048. nnpfc_num_parameters_idc equal to 0 indicates that the maximum number of neural network parameters is unknown. The value of nnpfc_num_parameters_idc shall be in the range of 0 to 52, inclusive. Values of nnpfc_num_parameters_idc greater than 52 are reserved for future use by ITU-T | ISO/IEC and shall not be present in bitstreams conforming to this version of this document. Decoders conforming to this version of this document shall ignore NNPFC SEI messages with nnpfc_num_parameters_idc greater than 52.

If the value of nnpfc_num_parameters_idc is greater than 0, the variable maxNumParameters is derived as follows.

$$maxNumParameters = (2048 \ll \text{nnpfc\_num\_parameters\_idc}) - 1$$

It is a requirement of bitstream conformance that the number of neural network parameters of the NNPF shall be less than or equal to maxNumParameters.

nnpfc_num_kmac_operations_idc greater than 0 indicates that the maximum number of multiply-accumulate operations per sample of the NNPF is less than or equal to nnpfc_num_kmac_operations_idc*1000. nnpfc_num_kmac_operations_idc equal to 0 indicates that the maximum number of multiply-accumulate operations of the network is unknown. The value of nnpfc_num_kmac_operations_idc shall be in the range of 0 to 232-2(2), inclusive.

nnpfc_total_kilobyte_size greater than 0 indicates a total size (in kilobytes) required to store the uncompressed parameters for the neural network. The total size (in bits) is a number greater than or equal to the sum of bits used to store each parameter. nnpfc_total_kilobyte_size is the total size (in bits) divided by 8,000, rounded up. nnpfc_total_kilobyte_size equal to 0 indicates that the total size required to store the parameters for the neural network is unknown. The value of nnpfc_total_kilobyte_size shall be in the range of 0 to 232−2(2), inclusive.

nnpfc_metadata_extension_num_bits equal to 0 specifies that nnpfc_reserved_metadata_extension is not present. nnpfc_metadata_extension_num_bits greater than 0 specifies the length (in bits) of nnpfc_reserved_metadata_extension. nnpfc_metadata_extension_num_bits shall be equal to 0 in this version of this document. Values in the range of 1 to 2,048, inclusive, for nnpfc_metadata_extension_num_bits are reserved for future use by ITU-T | ISO/IEC and shall not be present in bitstreams conforming to this version of this document. Decoders conforming to this version of this document shall allow any value of nnpfc_metadata_extension_num_bits in the range of 0 to 2,048, inclusive. Values of nnpfc_metadata_extension_num_bits greater than 2,048 shall not be present in bitstreams conforming to this version of this document and are not reserved for future use.

nnpfc_reserved_metadata_extension shall not be present in bitstreams conforming to this version of this document. However, decoders conforming to this version of this document shall ignore the presence and value of nnpfc_reserved_metadata_extension. When nnpfc_reserved_metadata_extension is present, the length (in bits) of nnpfc_reserved_metadata_extension is equal to nnpfc_metadata_extension_num_bits.

nnpfc_reserved_zero_bit_b shall be equal to 0 in bitstreams conforming to this version of this document. Decoders shall ignore NNPFC SEI messages in which nnpfc_reserved_zero_bit_b is not equal to 0.

nnpfc_payload_byte[i] contains the i-th byte of a bitstream conforming to ISO/IEC 15938-17. The byte sequence nnpfc_payload_byte[i] for all present values of i shall be a complete bitstream that conforms to ISO/IEC 15938-17.

FIG. 26 illustrates syntax for a neural-network post-filter activation SEI message according to embodiments.

Hereinafter, the semantics of the neural network post-filter activation (NNPFA) SEI message are described with reference to FIG. 26.

The NNPFA SEI message activates or de-activates the use of the target neural-network post-processing filter (NNPF), identified by nnpfa_target_id and nnpfa_target_base_flag, for post-processing filtering of a set of pictures. For a particular picture for which the NNPF is activated, the target NNPF is derived as follows.

If nnpfa_target_base_flag is equal to 1, the target NNPF is the base NNPF with nnpfc_id equal to nnpfa_target_id.

Otherwise (if nnpfa_target_base_flag is equal to 0), the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

There may be several NNPFA SEI messages present for the same picture, for example, when the NNPFs are meant for different purposes or for filtering of different color components.

nnpfa_target_id indicates the target NNPF, which is specified by one or more NNPFC SEI messages that pertain to the current picture and have nnpfc_id equal to nnpfa_target_id. The value of nnpfa_target_id shall be in the range of 0 to 232-2, inclusive.

An NNPFA SEI message with a particular value of nnpfa_target_id shall not be present in a current PU unless one or both of the following conditions are true.

Within the current CLVS, there is an NNPFC SEI message with nnpfc_id equal to the particular value of nnpfa_target_id present in a PU preceding the current PU in decoding order.

There is an NNPFC SEI message with nnpfc_id equal to the particular value of nnpfa_target_id in the current PU.

When a PU contains both an NNPFC SEI message with a particular value of nnpfc_id and an NNPFA SEI message with nnpfa_target_id equal to the particular value of nnpfc_id, the NNPFC SEI message shall precede the NNPFA SEI message in decoding order.

nnpfa_cancel_flag equal to 1 indicates that the persistence of the target NNPF established by any previous NNPFA SEI message with the same nnpfa_target_id as the current SEI message is cancelled. That is, the target NNPF is no longer used unless it is activated by another NNPFA SEI message with the same nnpfa_target_id as the current SEI message and nnpfa_cancel_flag equal to 0. nnpfa_cancel_flag equal to 0 indicates that the nnpfa_target_base_flag, nnpfa_persistence_flag, and nnpfa_num_output_entries follow.

nnpfa_target_base_flag equal to 1 specifies that the target NNPF is the base NNPF with nnpfc_id equal to nnpfa_target_id. nnpfa_target_base_flag equal to 0 specifies that the target NNPF is the NNPF specified by the last NNPFC SEI message with nnpfc_id equal to nnpfa_target_id that precedes the first VCL NAL unit of the current picture in decoding order and is not a repetition of the NNPFC SEI message that contains the base NNPF.

nnpfa_persistence_flag specifies the persistence of the target NNPF for the current layer.

nnpfa_persistence_flag equal to 0 specifies that the target NNPF may be used for post-processing filtering for the current picture only.

nnpfa_persistence_flag equal to 1 specifies that the target NNPF may be used for post-processing filtering for the current picture and all subsequent pictures of the current layer until one or more of the following conditions are true.

A new CLVS of the current layer begins. The bitstream ends. A picture in the current layer associated with an NNPFA SEI message with the same nnpfa_target_id as the current SEI message and nnpfa_cancel_flag equal to 1 is output, following the current picture in output order.

The target NNPF is not applied for a subsequent picture in the current layer associated with an NNPFA SEI message with the same nnpfa_target_id as the current SEI message and nnpfa_cancel_flag equal to 1.

Let nnpfcTargetPictures be a set of pictures to which the last NNPFC SEI message with nnpfc_id equal to nnpfa_target_id that precedes the current NNPFA SEI message in decoding order pertains. Let nnpfaTargetPictures be a set of pictures for which the target NNPF is activated by the current NNPFA SEI message. It is a requirement of bitstream conformance that any picture included in nnpfaTargetPictures shall also be included in nnpfcTargetPictures.

nnpfa_num_output_entries specifies the number of syntax elements nnpfa_output_flag[i] present in the NNPFA SEI message. The value of nnpfa_num_output_entries shall be in the range of 0 to NumInpPicsInOutputTensor, inclusive.

nnpfa_output_flag[i] equal to 1 specifies that the NNPF-generated picture that corresponds to the input picture having index InpIdx[i] is output by the NNPF process activated by this NNPFA SEI message, where the NNPF process is specified in the semantics of the NNPFC SEI message. nnpfa_output_flag[i] equal to 0 specifies that the NNPF-generated picture that corresponds to the input picture having index InpIdx[i] is not output by the NNPF process activated by this NNPFA SEI message. When nnpfa_num_output_entries is less than NumInpPicsInOutputTensor, nnpfa_output_flag[i] is inferred to be equal to 1 for each value of i in the range of nnpfa_num_output_entries to NumInpPicsInOutputTensor−1, inclusive.

FIG. 27 illustrates syntax of a neural-network post-filter group characteristics SEI message according to embodiments.

Hereinafter, the semantics of the Neural-network post-filter group characteristics (NNPFGC) SEI message are described with reference to FIG. 27.

The NNPFGC SEI message specifies a neural network post-filter (NNPF) group. When the NNPF group defines an NNPF cascade or defines NNPFs or NNPF groups of NNPF cascades that are alternatives to each other, it is indicated by the SEI message. The use of NNPF groups of NNPF cascades for specific pictures is indicated with a neural-network post-filter group activation (NNPFGA) SEI message.

nnpfgc_id contains an identification number that may be used to identify an NNPF group. The value of nnpfgc_id shall be in the range of 0 to 232-2, inclusive. Values of nnpfgc_id from 256 to 511, inclusive, and from 231 to 232-2, inclusive, are reserved for future use by ITU-T ISO/IEC. Decoders conforming to this version of this document encountering an NNPFGC SEI message with nnpfgc_id in the range of 256 to 511, inclusive, or in the range of 231 to 232-2, inclusive, shall ignore the SEI message. The value of nnpfgc_id shall not be equal to any value of nnpfc_id of any NNPFC SEI message present in the same CLVS. When the value of nnpfgc_id in an NNPFGC SEI message nnpfgcSeiA is equal to the value of nnpfgc_id in another NNPFGC SEI message nnpfgcSeiB present in the same CLVS, nnpfgcSeiA and nnpfgcSeiB shall be identical.

nnpfgc_grouping_type equal to 0 indicates that this SEI message specifies a group of cascaded neural-network post-filters.

nnpfgc_grouping_type equal to 1 indicates that the NNPFs or NNPF groups identified by nnpfgc_member_id[i] are alternatives to each other out of which the post-processor should select only one to be applied.

nnpfgc_grouping_type equal to 2 indicates that this SEI message specifies a group of NNPFs that are intended to be used jointly and are activated in an alternating manner such that at most one of these NNPFs is activated for any picture.

nnpfgc_grouping_type equal to 3 indicates that the NNPFs or NNPF groups identified by nnpfgc_member_id[i] are intended to be used in parallel.

nnpfgc_grouping_type equal to 4 indicates that the NNPFs or NNPF groups identified by nnpfgc_member_id[i] are optional, i.e., may or may not be applied by the post-processor.

The value of nnpfgc_grouping_type shall be in the range of 0 to 255, inclusive. Values of nnpfgc_grouping_type in the range of 5 to 255, inclusive, are reserved for future specification by ITU-T | ISO/IEC and shall not be present in bitstreams conforming to this version of this document. Decoders conforming to this version of this document shall ignore NNPFGC SEI messages with nnpfgc_grouping_type in the range of 5 to 255, inclusive.

nnpfgc_purpose has the same semantics as nnpfc_purpose but with an exception that the semantics are specified for the NNPF group defined by this SEI message rather than the NNPF defined by an NNPFC SEI message.

nnpfgc_num_members_minus2+2 indicates the number of NNPF groups or NNPFs in the NNPF group that this SEI message defines.

nnpfgc_member_id[i] indicates the i-th member in the NNPF group defined by this SEI message as follows.

If there is an NNPF with nnpfc_id equal to nnpfgc_member_id[i] defined in the CLVS, the i-th member in the NNPF group defined by this SEI message is an NNPF that has nnpfc_id equal to nnpfgc_member_id[i].

Otherwise (if there is no NNPF with nnpfc_id equal to nnpfgc_member_id[i] defined in the CLVS), the i-th member in the NNPF group defined by this SEI message is an NNPF group with nnpfgc_id equal to nnpfgc_member_id[i].

When a value of nnpfgc_member_id[i] references the value of nnpfgc_id in an NNPFGC SEI message nnpfgcSei, it is a requirement of bitstream conformance that the NNPFGC SEI message nnpfgcSei shall have nnpfgc_grouping_type equal to 0. When nnpfgc_grouping_type is equal to 0 or 2, it is a requirement of bitstream conformance that there is an NNPF with nnpfc_id equal to nnpfgc_member_id [i] defined in the CLVS. When nnpfgc_grouping_type is equal to 1, 3, or 4, it is a requirement of bitstream conformance that there is an NNPF with nnpfc_id equal to nnpfgc_member_id[i] or an NNPF group with nnpfgc_id equal to nnpfgc_member_id[i] defined in the CLVS.

When nnpfgc_grouping_type is equal to 0, the NNPFs with nnpfc_id equal to nnpfgc_member_id[i] are executed in cascade in ascending order of i, as activated by an NNPFGA SEI message with nnpfga_target_id equal to nnpfgc_id.

nnpfgc_complexity_info_present_flag, nnpfgc_parameter_type_idc, nnpfgc_log2_parameter_bit_length_minus3, nnpfgc_num_parameters_idc, nnpfgc_num_kmac_operations_idc, and nnpfgc_total_kilobyte_size have the semantics of nnpfc_complexity_info_present_flag, nnpfc_parameter_type_idc, nnpfc_log2_parameter_bit_length_minus3, nnpfc_num_parameters_idc, nnpfc_num_kmac_operations_idc, and nnpfc_total_kilobyte_size, respectively, but with an exception that the semantics are specified for the NNPF defined by this SEI message rather than the NNPF defined by an NNPFC SEI message. When nnpfgc_grouping_type is equal to 1, nnpfgc_complexity_info_present_flag shall be equal to 0.

FIG. 28 illustrates syntax of a neural-network post-filter group activation SEI message according to embodiments.

Hereinafter, the semantics of the neural-network post-filter group activation (NNPFGA) SEI message are described with reference to FIG. 28.

The NNPFGA SEI message activates or deactivates the use of the target neural-network post-processing filter group (NNPFG) among NNPF groups, identified by nnpfga_target_id, for post-processing filtering of a set of pictures. nnpfgc_grouping_type for the identified NNPF group shall be equal to 0 (cascade) or 1 (alternatives). When nnpfgc_grouping_type is equal to 1, each member of the group shall have the same number of input pictures and NNPF output pictures. For a particular picture for which the NNPFG is activated, the target NNPFG precedes the first VCL NAL unit of the current picture in decoding order, and the NNPFs of the target NNPFG are defined by the NNPFC SEI messages that have nnpfc_id equal to any value of nnpfgc_member_id[i] of the target NNPFG and are present in the current picture unit or precede the current picture in decoding order.

Use of this SEI message requires the definition of the following variables.

Input picture width and height in units of luma samples, denoted herein by InitCroppedWidth[idx] and InitCroppedHeight[idx], respectively, of the candidate input pictures with index idx in the range of 0 to numCandInputPics−1, inclusive, that may be used as input for the NNPFG.

Luma sample array InitCroppedYPic[idx] and chroma sample arrays InitCroppedCbPic[idx] and InitCroppedCrPic[idx], when present, the width and height of the candidate input pictures with index idx in the range of 0 to numCandInputPics−1, inclusive, that may be used as input for the NNPFG.

Bit depth BitDepthY for the luma sample array of the candidate input pictures.

Bit depth BitDepthC for the chroma sample arrays, if any, of the candidate input pictures.

A chroma format indicator, denoted herein by ChromaFormatIdc.

When nnpfc_auxiliary_inp_idc is equal to 1, a filtering strength control value array StrengthControlVal[idx] shall contain real numbers in the range of 0 to 1, inclusive, of the candidate input pictures with index idx in the range of 0 to numCandInputPics−1, inclusive.

The candidate input picture with index 0 corresponds to the picture for which the NNPFG is activated by this NNPFGA SEI message. The candidate input picture with index i in the range of 1 to numCandInputPics−1, inclusive, precedes the candidate input picture with index i−1 in output order. Let candInputPicList[0] be the list of candidate input pictures in inverse output order.

nnpfga_target_id indicates the target NNPFG which is specified by the NNPFGC SEI message that pertains to the current picture and has nnpfgc_id equal to nnpfga_target_id.

The value of nnpfga_target_id shall be in the range of 0 to 232-2, inclusive.

An NNPFGA SEI message with a particular value of nnpfga_target_id shall not be present in a current PU unless there is an NNPFGC SEI message with nnpfgc_id equal to the particular value of nnpfga_target_id and nnpfgc_grouping_type equal to 0 present in the current PU or in a PU that precedes the current PU in decoding order within the current CLVS.

When a PU contains both an NNPFGC SEI message with a particular value of nnpfgc_id and an NNPFGA SEI message with nnpfga_target_id equal to the particular value of nnpfgc_id, the NNPFGC SEI message shall precede the NNPFGA SEI message in decoding order.

nnpfga_cancel_flag equal to 1 indicates that the persistence of the target NNPFG established by any previous NNPFGA SEI message with the same nnpfga_target_id as the current SEI message is cancelled, i.e., the target NNPFG is no longer used unless it is activated by another NNPFGA SEI message with the same nnpfga_target_id as the current SEI message and nnpfga_cancel_flag equal to 0. nnpfga_cancel_flag equal to 0 indicates that the target NNPFG is activated for use.

nnpfga_persistence_flag specifies the persistence of the target NNPFG for the current layer.

nnpfga_persistence_flag equal to 0 specifies that the target NNPFG may be used for post-processing filtering for the current picture only.

nnpfga_persistence_flag equal to 1 specifies that the target NNPFG may be used for post-processing filtering for the current picture and all subsequent pictures of the current layer in output order until one or more of the following conditions are true.

A new CLVS of the current layer begins.

The bitstream ends.

A picture in the current layer associated with an NNPFGA SEI message with the same nnpfga_target_id as the current SEI message that follows the current picture in output order.

NOTE—The target NNPFG is not applied for the subsequent picture in the current layer associated with an NNPFGA SEI message with the same nnpfga_target_id as the current SEI message.

Let nnpfgcTargetPictures be a set of pictures to which the last NNPFGC SEI message with nnpfgc_id equal to nnpfga_target_id that precedes the current NNPFGA SEI message in decoding order pertains. Let nnpfgaTargetPictures be a set of pictures for which the target NNPFG is activated by the current NNPFGA SEI message. It is a requirement of bitstream conformance that any picture included in nnpfga-TargetPictures shall also be included in nnpfgcTargetPictures.

nnpfga_num_filters_minus2+2 indicates the number of NNPFs in the NNPFG that this SEI message activates. The value of nnpfga_num_filters_minus2 shall be equal to the value of nnpfgc_num_members_minus2 in an NNPFGC SEI message with nnpfgc_id equal to nnpfga_target_id.

nnpfga_target_base_flag[i] equal to 1 specifies that the i-th NNPF in the target NNPFG is the base NNPF with nnpfc_id equal to nnpfgc_member_id[i] in an NNPFGC SEI message with nnpfgc_id equal to nnpfga_target_id. nnpfga_target_base_flag[i] equal to 0 specifies that the i-th NNPF in the target NNPFG is the NNPF specified by the last NNPFC SEI message that has nnpfc_id equal to nnpfgc_member_id [i] in an NNPFGC SEI message with nnpfgc_id equal to nnpfga_target_id, precedes the first VCL NAL unit of the current picture in decoding order, and is not a repetition of the NNPFC SEI message that contains the base NNPF.

nnpfga_input_all_pics_flag[i] equal to 1 specifies that the input pictures to the i-th NNPF are selected from the list of candidate input pictures candInputPicList[i] without skipping. nnpfga_input_all_pics_flag[i] equal to 0 specifies that the input pictures to the i-th NNPF are selected from the list of candidate input pictures candInputPicList[i] in a manner that some candidate input pictures are skipped.

nnpfga_num_input_pics_minus1[i] specifies the number of input pictures to the i-th NNPF in the target NNPFG. When present, nnpfga_num_input_pics_minus1[i] shall be equal to nnpfc_num_input_pics_minus1 for an NNPF with nnpfc_id equal to nnpfgc_member_id[i] of an NNPFGC SEI message with nnpfgc_id equal to nnpfga_target_id. When not present, nnpfga_num_input_pics_minus1[i] is inferred to be equal to nnpfc_num_input_pics_minus1 for an NNPF with nnpfc_id equal to nnpfgc_member_id[i] in an NNPFGC SEI message with nnpfgc_id equal to nnpfga_target_id.

nnpfga_input_pic_skip_count[i][j] specifies a j-th picture count that is skipped in the list of candidate input pictures candInputPicList[i] when selecting input pictures for the NNPF activated by the i-th loop entry. When nnpfga_input_pic_skip_count[i][j] is not present, it is inferred to be equal to 0 for all values of j in the range of 0 to nnpfga_num_input_pics_minus1[i], inclusive. The variable numCandInputPics, which indicates the number of candidate input pictures to the NNPFG, is derived as follows.

```
numCandInputPics = 0
for( j = 0; j <= nnpfga_num_input_pics_minus1[ 0 ]; j++ )
  numCandInputPics += 1 + nnpfga_input_pic_skip_count[ 0 ][ j ]
```

Let candInputPicList[m] in the range of 1 to nnpfga_num_ filters_minus2+1, inclusive, be a list of pictures in inverse output order that is initially empty and formed in descending order of n in the range of 0 to m−1, inclusive. It includes each picture that is output by the NNPF process of the n-th loop entry that has no corresponding picture already present in candInputPicList[m], and lastly includes each picture present in candInputPicList[0] that has no corresponding picture already present in candInputPicList[m]. When a candidate input picture candInputPicList[m][idx] for any value of m in the range of 1 to nnpfga_num_filters_minus2+1, inclusive, is an NNPF output picture of the n-th NNPF process with the value of n being less than the value of m, the width and height of the candidate input picture are equal to nnpfcOutputPicWidth and nnpfcOutputPicHeight of the NNPF output picture, respectively.

The list of input pictures inputPicList[m] to the NNPF of the m-th loop entry is derived as follows.

```
for( k = 0, candIdx = 0; k <= nnpfga_num_input_pics_minus1[ m ]; k++, candIdx++ ) {
  candIdx += nnpfga_input_pic_skip_count[ m ][ k ]
  inputPicList[ m ][ k ] = candInputPicList[ m ][ candIdx ]
}
```

It is a requirement of bitstream conformance that candIdx shall not exceed the number of pictures in candInputPicList [m].

It is a requirement of bitstream conformance that the pictures present in inputPicList[m] shall have the same width, height, bit depth, and chroma format for any value of m in the range of 1 to nnpfga_num_filters_minus2+1, inclusive.

To interpret the NNPFC SEI message with nnpfc_id equal to nnpfgc_member_id[i] in an NNPFGC SEI message with nnpfgc_id equal to nnpfga_target_id, the following variables are specified for the i-th loop entry:

The variables BitDepthY, BitDepthC, and ChromaFormatIdc are used as provided for the interpretation of this SEI message.

CroppedWidth and CroppedHeight are set equal to the width and height of the pictures in inputPicList[i], respectively, in units of luma samples.

For each input picture k in the range of 0 to nnpfga_num_input_pics_minus1[i], inclusive, the following applies.

CroppedYPic[k], CroppedCbPic[k], and CroppedCrPic [k], when present, are set equal to respective sample array of inputPicList[i][k].

When nnpfc_auxiliary_inp_idc is equal to 1 for the NNPF with nnpfc_id equal to nnpfgc_member_id[i] in an NNPFGC SEI message with nnpfgc_id equal to nnpfga_target_id, the following applies.

It is a requirement of bitstream conformance that inputPicList[i][k] shall be the same as candInputPicList[0][idx] for any value of idx in the range of 0 to nnpfga_num_input_pics_minus1[i]. numCandInputPics−1, inclusive.

StrengthControlVal[k] is set equal to InitStrengthControlVal[idx]. nnpfga_num_output_entries[i] specifies the number of syntax elements nnpfga_output_flag[i][j] present in the NNPFGA SEI message. The value of nnpfga_num_output_entries[i] shall be in the range of 0 to NumInpPicsInOutputTensor, inclusive, for an NNPFGC SEI message with nnpfc_id equal to nnpfgc_member_id[i] and nnpfgc_id equal to nnpfga_target_id.

nnpfga_output_flag[i][j] equal to 1 specifies that the NNPF-generated picture that corresponds to the input picture having index InpIdx[j] derived for the i-th NNPF of the target NNPFG is output by the NNPF process activated by this loop entry, where the NNPF process is specified in the semantics of the NNPFC SEI message. nnpfga_output_flag [i][j] equal to 0 specifies that the NNPF-generated picture that corresponds to the input picture having index InpIdx[j] derived for the i-th NNPF of the target NNPFG is not output by the NNPF process activated by this loop entry.

When nnpfga_num_output_entries[i] is less than NumInpPicsInOutputTensor derived for the i-th NNPF of the target NNPFG, nnpfga_output_flag[i][j] is inferred to be equal to 1 for each value of i in the range of nnpfga_num_output_entries[i] to NumInpPicsInOutputTensor−1, inclusive.

NnpfgaOutputPicList, which is the list of pictures output by the NNPF process of the NNPFG in output order, is initially empty and formed in descending order of n in the range of 0 to nnpfga_num_filters_minus2+1, inclusive, by including each picture that is output by the NNPF process of the n-th loop entry that has no corresponding picture already present in NnpfgaOutputPicList.

FIG. 29 illustrates source picture timing information according to embodiments.

The source picture timing information (SPTI) SEI message indicates the temporal distance between source pictures associated with the corresponding decoded output pictures prior to encoding. For example, for camera-captured content, the temporal distance between source pictures is the difference between the time at which an image sensor is exposed to produce a source picture associated with the current decoded picture and the time at which the image sensor is exposed to produce the source picture associated with a previous decoded picture in output order. The information provided by the SPTI SEI message pertains only to picture(s) starting from the picture in the current layer in the access unit that contains the SPTI SEI message and all subsequent pictures of the current layer in output order.

spti_cancel_flag equal to 1 indicates that the SPTI SEI message cancels the persistence of any previous SPTI SEI message in output order that applies to the current layer. spti_cancel_flag equal to 0 indicates that source picture timing information follows.

spti_persistence_flag specifies the persistence of the SPTI SEI message for the current layer.

spti_persistence_flag equal to 0 specifies that the SPTI SEI message applies to the current decoded picture only.

spti_persistence_flag equal to 1 specifies that the SPTI SEI message applies to the current decoded picture and persists for all subsequent pictures of the current layer in output order until one or more of the following conditions are true. spti_persistence_flag equal to 1 indicates that the message applies to multiple sublayers.

A new CLVS of the current layer begins.

The bitstream ends.

A picture in the current layer in an AU associated with an SPTI SEI message is output following the current picture in output order.

spti_source_timing_equals_output_timing_flag equal to 1 indicates the timing of source pictures is the same as the timing of corresponding decoded output pictures. spti_source_timing_equals_output_timing_flag equal to 0 indicates the timing of source pictures may not be the same as the timing of corresponding decoded output pictures.

When spti_source_timing_equals_output_timing_flag is equal to 1 and a picture timing SEI message is present for the current picture, source picture timing may be determined from information conveyed in the picture timing SEI message.

spti_source_type_present_flag equal to 1 indicates the syntax element spti_source_type is present in the SEI message. spti_source_type_present_flag equal to 0 indicates the syntax element spti_source_type is not present in the SEI message.

spti_source_type indicates the timing relationship between source pictures and corresponding decoded output pictures as specified in Table 10 (Interpretation of spti_source_type), where (spti_source_type & bitMask) not equal to 0 indicates that the timing relationship has the interpretation associated with the bitMask value in Table 10 (Interpretation of spti_source_type). When spti_source_type is greater than 0 and (spti_source_type & bitMask) is equal to 0, the interpretation associated with the bitMask value is not applicable to the SPTI SEI message. When spti_source_type is equal to 0, the timing relationship may be specified by the application.

The value of spti_source_type shall be in the range of 0 to 127, inclusive, in bitstreams conforming to this version of this document. Values of 128 to 255, inclusive, for spti_source_type are reserved for future use by ITU-T | ISO/IEC and shall not be present in bitstreams conforming to this version of this document. Decoders conforming to this version of this document shall ignore SPTI SEI messages with spti_source_type in the range of 128 to 255, inclusive.

TABLE 10

| bitMask | Interpretation |
|---|---|
| 0x01 | Slow motion: The absolute value of the temporal distance between consecutive source pictures is likely to be less than the temporal distance between corresponding decoded output pictures. |
| 0x02 | Sped-up motion: The absolute value of the temporal distance between consecutive source pictures is likely to be greater than the temporal distance between corresponding decoded output pictures. |
| 0x04 | High-speed imaging: The absolute value of the temporal distance between consecutive source pictures is likely to be less than 1/120 seconds. |
| 0x08 | Time-lapse imaging: The temporal distance between source pictures is likely to be greater than 1.001/24 seconds. |
| 0x10 | Temporal reversal: The absolute value of the temporal distance between consecutive source pictures is indicated to be negative (i.e., decoded pictures are output in reverse temporal order relative to the timing of the corresponding source pictures). |
| 0x20 | Still image/freeze frame: The temporal distance between source pictures is likely to be 0 (i.e., two or more decoded pictures are likely to represent the same source picture). |
| 0x40 | Sporadic or event-driven: The temporal distance between source pictures is likely to be non-constant. |

The value of (spti_source_type & 0x04) & (spti_source_type & 0x08) shall be zero (For example, spti_source_type shall not simultaneously indicate high-speed imaging and time-lapse imaging).

spti_time_scale specifies the number of time units that pass in one second. The value of spti_time_scale shall not be equal to 0. For example, a time coordinate system that measures time using a 27 MHz clock has spti_time_scale of 27 000 000.

spti_num_units_in_elemental_interval specifies the number of time units of a clock operating at the frequency spti_time_scale Hz that corresponds to the indicated elemental source picture interval of consecutive pictures in output order in the CLVS. The value of spti_num_units_in_elemental_interval shall not be equal to 0.

The elemental source picture interval, indicated by the variable ElementalSourcePictureInterval, in units of seconds, is equal to the quotient of spti_num_units_in_elemental_interval divided by spti_time_scale. For example, to represent an elemental source picture interval equal to 0.04 seconds, spti_time_scale may be equal to 27,000,000 and spti_num_units_in_elemental_interval may be equal to 1,080,000.

The method of indicating the elemental source picture interval is similar to that used in Rec. ITU-T H.266 | ISO/JEC 23090-3, with spti_time_scale being similar to that syntax's time_scale and spti_num_units_in_elemental_interval being similar to that syntax's num_units_in_tick, and thus the variable ElementalSourcePictureInterval being similar to the variable ClockTick in Rec. ITU-T H.266 | ISO/IEC 23090-3.

spti_max_sublayers_minus_1+1 specifies the maximum number of temporal sublayers for which a picture interval scale factor (spti_sublayer_interval_scale_factor[i]) and synthesized flag (spti_sublayer_synthesized_picture_flag[i]) information are signaled. When spti_max_sublayers_minus_1 is not present, it is inferred to be equal to TemporalId.

spti_sublayer_interval_scale_factor[i], when present, specifies a scale factor used in determining the source picture interval of corresponding pictures in the CLVS having TemporalId equal to i relative to the previous output picture with TemporalId less than or equal to i. The value 0 may be used to indicate that the source picture corresponding to the current decoded output picture is identical to the source picture corresponding to the previous decoded output picture with TemporalId less than or equal to i.

The indicated source picture interval associated with an output picture having TemporalId equal to i, relative to the previous output picture with TemporalId less than or equal to i, denoted by the variable SourcePictureInterval[i], in units of seconds, is derived as follows.

```
SourcePictureInterval[ i ] = ElementalSourcePictureInterval *
spti_sublayer_interval_scale_factor[ i ] *
  ( 1 − 2 * temporalReversalFlag )
```

If spti_source_type_present_flag is equal to 1, the variable temporalReversalFlag is equal to (spti_source_type & 0x10)?1:0. Otherwise (i.e. if spti_source_type_present_flag is equal to 0), the variable temporalReversalFlag is equal to 0.

Since ElementalSourcePictureInterval is multiplied by spti_sublayer_interval_scale_factor[i] when calculating SourcePictureInterval[i], the same value of SourcePictureInterval[i] may be represented in various ways by applying a scale factor to the value of spti_time_scale and applying the same scale factor to spti_num_units_in_elemental_interval or spti_sublayer_interval_scale_factor[i]. There is no assumption that common scale factors have been removed or that the value of spti_sublayer_interval_scale_factor[i] is equal to 1 for the greatest value of i. The reason for allowing the same value to be represented in various ways is, at least in part, to allow spti_time_scale to be selected to correspond to other timing-related elements used in the system environment, such as the clock rate of 27 MHz used in some multimedia communication systems.

spti_sublayer_synthesized_picture_flag[i], when present, equal to 1 indicates that decoded output pictures belonging to the i-th temporal sublayer are synthesized and do not correspond to unmodified original source pictures. spti_sublayer_synthesized_picture_flag[i] equal to 0 provides no such indication. When not present, the value of spti_sublayer_synthesized_picture_flag[i] is inferred to be equal to 0.

When TemporalId of an SPTI SEI message is greater than 0, and the SPTI SEI message persists for one or more pictures with lower TemporalId, an encoder may include the information of the SPTI SEI message in one or more SPTI SEI messages with lower TemporalId, in order to avoid loss of information when pictures in temporal sublayer(s) are lost or removed.

FIGS. 30A and 30B illustrate an object mask information SEI message according to embodiments.

The object mask information (OMI) SEI message provides object mask information related to an object mask picture in the auxiliary picture layer associated with the primary picture layer (referred to as the current primary picture layer) in which the SEI message is present. If the OMI SEI message is present, it shall be present in the primary picture layer. One primary picture layer may be associated with one or more auxiliary picture layers. For each of the associated auxiliary picture layers containing the object mask picture with nuh_layer_id equal to sdi_layer_id[i], the value of sdi_aux_id[i] shall be equal to AUX_OBJECT_MASK for any value of i in the range of 0 to sdi_max_layers_minus1, inclusive.

Use of this SEI message requires the definition of the following variables.

- A cropped picture width and picture height in units of luma samples, denoted herein by CroppedWidth and CroppedHeight, respectively.
- A conformance cropping window left offset, ConfWinLeftOffset
- A conformance cropping window top offset, ConfWinTopOffset
- A chroma format indicator, denoted herein by ChromaFormatIdc The variables SubWidthC and SubHeightC are derived from ChromaFormatIdc. omi_cancel_flag equal to 1 indicates that the SEI message cancels the persistence of any previous object mask information SEI message in the same layer, if present, in output order. omi_cancel_flag equal to 0 indicates that object mask information follows.

omi_persistence_flag specifies the persistence of the object mask information provided in this SEI message. omi_persistence_flag equal to 0 specifies that the object mask information applies to the current picture only. omi_persistence_flag equal to 1 specifies that the object mask information applies to the current picture and all subsequent pictures in the same layer in output order until one or more of the following conditions are true.

- A new CLVS of the current layer begins.
- The bitstream ends.
- A picture in the current layer in a PU containing an object mask information SEI message is output, following the current picture in output order.

When a CVS does not contain an SDI SEI message with sdi_aux_id[i] equal to AUX_OBJECT_MASK for at least one value of i, the OMI SEI message shall be ignored.

When an AU contains both an SDI SEI message with sdi_aux_id[i] equal to AUX_OBJECT_MASK for at least one value of i and an OMI SEI message, the SDI SEI message shall precede the OMI SEI message in decoding order.

omi_num_aux_pic_layer indicates the number of auxiliary picture layers associated with the current primary picture layer. It is a requirement of bitstream conformance that the value of omi_num_aux_pic_layer shall be equal to numAuxLayer, where the variable numAuxLayer is derived as follows.

omiPrimaryLayerId is indicated by the value of nuh_layer_id of the NAL unit that contains the SEI message.

```
numAuxLayer = 0;
for( i = 0; i <= sdi_max_layers_minus1; i++ )
  if( sdi_aux_id[ i ] = = AUX_OBJECT_MASK )
    for( j = 0; j <= sdi_num_associated_primary_layers_minus1[ i ]; j++ )
      if( sdi_layer_id[ sdi_associated_primary_layer_idx[ i ][ j ] ] = = omiPrimaryLayerId )
        numAuxLayer++;
```

omi_mask_id_length_minus1+1 specifies the length (in bits) of syntax element omi_mask_id[i][j].

omi_mask_sample_value_length_minus8+8 specifies the length (in bits) of syntax element omi_aux_sample_value[i][j]. The value of omi_mask_sample_value_length_minus8 shall be in the range of 0 to 8.

omi_mask_confidence_info_present_flag equal to 1 indicates that syntax element omi_mask_confidence[i][j] are present. omi_mask_confidence_info_present_flag equal to 0 indicates that the syntax element omi_mask_confidence[i][j] are not present.

omi_mask_confidence_length_minus1+1 specifies the length (in bits) of the syntax element omi_mask_confidence[i][j].

omi_mask_depth_info_present_flag equal to 1 indicates that syntax element omi_mask_depth[i][j] are present. omi_mask_depth_info_present_flag equal to 0 indicates that the syntax element omi_mask_depth[i][j] are not present.

omi_mask_depth_length_minus1+1 specifies the length (in bits) of the syntax element omi_mask_depth[i][j].

It is a requirement of bitstream conformance that the values of omi_num_aux_pic_layer, omi_mask_id length_minus1, omi_mask_sample_value_length_minus8, omi_mask_confidence_info_present_flag, omi_mask_confidence_length_minus1 (if present), omi_mask_depth_info_present_flag, and omi_mask_depth_length_minus1 (if present) shall be the same for all object_mask_info( ) syntax structures within a CLVS.

omi_mask_label_info_present_flag equal to 1 indicates that syntax elements omi_mask_label_language_present_flag and omi_mask_label[i][j] are present. omi_mask_label_info_present_flag equal to 0 indicates that the syntax elements omi_mask_label_language_present_flag and omi_mask_label[i][j] are not present.

omi_mask_label_language_present_flag equal to 1 indicates that a syntax element omi_mask_label_language is present. omi_mask_label_language_present_flag equal to 0 indicates that the syntax element omi_mask_label_language is not present.

omi_bit_equal_to_zero shall be equal to 0.

omi_mask_label_language contains a language tag as specified by IETF RFC 5646 and a null termination byte equal to 0x00. The length of the syntax element omi_mask_label_language shall be less than or equal to 255 bytes, not including the null termination byte. When not present, the language of the label is unspecified.

omi_mask_pic_update_flag[i] equal to 1 indicates the object mask information related to the object mask picture in the i-th auxiliary picture layer associated with the current primary picture layer may be updated. omi_mask_pic_update_flag[i] equal to 0 indicates there is no change to the mask information of the object mask picture in the i-th auxiliary picture layer associated with the current primary picture layer. When omi_mask_pic_update_flag[i] is equal to 0, the persistence mechanism is used. That is, the object mask information is inherited from the last OMI SEI message present in the same layer in decoding order which the message signals the mask information related to the object mask picture in the i-th auxiliary picture layer associated with the current primary picture layer.

omi_num_mask_in_pic_update[i] specifies the number of object masks in the object mask picture in the i-th auxiliary picture layer associated with the current primary picture layer. omi_num_mask_in_pic_update [i] shall be in the range of 0 to (1<<(omi_mask_id_length_minus1+1))−1, inclusive.

omi_mask_id[i][j] indicates the identifier of the j-th object mask of the object mask picture in the i-th auxiliary picture layer associated with the current primary picture layer. The length of the syntax element omi_mask_id[i][j] is omi_mask_id_length_minus1+1 bits.

The variable maskId[i][j], which specifies the identifier of the j-th object mask of the object mask picture in the i-th auxiliary picture layer associated with the current primary picture layer, is derived as follows.

```
for(i = 0; i < omi_num_aux_pic_layer; i++)
for(j = 0; j < omi_num_mask_in_pic_update[ i ]; j++)
maskId[ i ][ j ] = omi_mask_id[ i ][ j ] + (1<<(omi_mask_id_length_minus1 + 1))*i
```

omi_aux_sample_value[i][j] specifies the value of the samples within the area of the j-th object mask of the object mask picture in the i-th auxiliary picture layer associated with the current primary picture layer.

omi_mask_cancel[i][j] equal to 1 cancels the persistence scope of the j-th object mask of the object mask picture in the i-th auxiliary picture layer associated with the current primary picture. omi_mask_cancel[i][j] equal to 0 specifies that the information about the j-th object mask of the object mask picture in the i-th auxiliary picture layer associated with the current primary picture layer is signaled.

It is a requirement of bitstream conformance that when omi_mask_id[i][j] with a particular value is parsed for the first time in the current CLVS, the value of the omi_mask_cancel[i][j] shall be equal to 0.

omi_mask_bounding_box_present_flag[i][j] equal to 1 specifies that the syntax elements omi_mask_top[i][j], omi_mask_left[i][j], omi_mask_width[i][j], and omi_mask_height[i][j] are present. omi_mask_bounding_box_present_flag[i][j] equal to 0 indicates the syntax elements omi_mask_top[i][j], omi_mask_left[i][j], omi_mask_width[i][j], and omi_mask_height[i][j] are not present.

omi_mask_top[i][j], omi_mask_left[i][j], omi_mask_width[i][j], and omi_mask_height[i][j] specify the coordinates of the top-left corner and the width and height of the bounding box of the j-th object mask in the cropped decoded object mask picture in the i-th auxiliary picture layer associated with the current primary picture layer, relative to the conformance cropping window specified by the active SPS, respectively.

The value of omi_mask_left[i][j] shall be in the range of 0 to (CroppedWidth/SubWidthC−1), inclusive, where CroppedWidth and SubWidthC are associated with the object mask picture in the i-th auxiliary picture layer associated with the current primary picture layer. When not present, the value of omi_mask_left[i][j] is inferred to be 0.

The value of omi_mask_top[i][j] shall be in the range of 0 to (CroppedHeight/SubHeightC−1), inclusive, where CroppedHeight and SubHeightC are associated with the object mask picture in the i-th auxiliary picture layer associated with the current primary picture layer. When not present, the value of omi_mask_top[i][j] is inferred to be 0.

The value of omi_mask_width[i][j] shall be in the range of 0 to (CroppedWidth/SubWidthC−omi_mask_left[i][j]), inclusive. When not present, the value of omi_mask_width [i][j] is inferred to be (CroppedWidth/SubWidthC−omi_mask_left[i][j]).

The value of omi_mask_height[i][j] shall be in the range of 0 to (CroppedHeight/SubHeightC−omi_mask_top[i][j]), inclusive. When not present, the value of omi_mask_height [i][j] is inferred to be (CroppedHeight/SubWidthC−omi_mask_top[i][j]).

The identified object mask is within a bounding box containing luma samples with horizontal coordinates from SubWidthC*(ConfWinLeftOffset+omi_mask_left[i][j]) to SubWidthC*(ConfWinLeftOffset+omi_mask_left[i][j]+omi_mask_width[i][j])−1, inclusive, and vertical coordinates from SubHeightC*(ConfWinTopOffset+omi_mask_top[i][j]) to SubHeightC*(ConfWinTopOffset+omi_mask_top[i][j]+omi_mask_height[i][j])−1, inclusive.

The variable pI[i][x][y] is the decoded value of the sample at the relative sample location (x, y) in the cropped object mask picture in the i-th auxiliary picture layer associated with the current primary picture layer. The following process is to determine the mask area in an auxiliary picture.

```
for( i = 0; i < omi_num_aux_pic_layer; i++ )
  for( j = 0; j < omi_num_mask_in_pic_update[ i ]; j++ )
    if( pI[ i ][ x ][ y ] = = omi_aux_sample_value [ i ][ j ]
        && x >= omi_mask_left[ i ][ j ]
        && x < omi_mask_left[ i ][ j ] + omi_mask_width[ i ][ j ]
        && y >= omi_mask_top[ i ][ j ]
        && y < omi_mask_top[ i ][ j ] + omi_mask_height[ i ][ j ] )
```

the sample at location (x, y) is associated with the object mask with the identifier of maskId[i][j]

omi_mask_confidence[i][j] specifies the degree of confidence associated with the j-th object mask of the object mask picture in the i-th auxiliary picture layer associated with the current primary picture layer, in units of 2−(omi_mask_confidence_length_minus1+1), such that a greater value of omi_mask_confidence[i][j] indicates a higher degree of confidence. The length of the syntax element omi_mask_confidence[i][j] is omi_mask_confidence_length_minus1+1 bits.

omi_mask_depth[i][j] specifies the object depth associated with the j-th object mask of the object mask picture in the i-th auxiliary picture layer associated with the current primary picture layer. A smaller value of omi_mask_depth indicates a shorter distance to the object. The length of the syntax element omi_mask_depth[i][j] is omi_mask_depth_length_minus1+1 bits.

omi_mask_label[i][j] specifies the contents of the label associated with the j-th object mask of the object mask picture in the i-th auxiliary picture layer associated with the current primary picture layer. The length of the syntax element omi_mask_label[i][j] shall be less than or equal to 255 bytes, not including the null termination byte.

FIG. 31 illustrates an SEI processing order SEI message according to embodiments.

The SEI processing order (SPO) SEI message carries information indicating the preferred processing order, as determined by the encoder (i.e., the content producer), for multiple types of SEI messages that may be present in a CVS.

The semantics of the SPO SEI message uses the concept of types of SEI messages. SEI messages that have different values of payloadType are considered different types of SEI messages. Additionally, different SEI messages that have the same value of payloadType but are differentiated by values of syntax elements in the SEI payload are considered different types of SEI messages. Such differentiation by the values of the syntax elements in the SEI payload is to be performed by comparing values sent using the syntax element po_sei_prefix_data_bit[i][j] (when present) or values sent as SEI messages within a processing order nesting SEI message (when present). For example, neural-network post-filter characteristics (NNPFC) SEI messages may be differentiated by having different values of nnpfc_id.

When the i-th SEI message seiA in any SPO SEI message has po_sei_wrapping_flag[i] and po_sei_prefix_flag[i] both equal to 0, there shall be no other SEI message seiB included in the same SPO SEI message or in a different SPO SEI message in the current CVS for which all the followings are true.

The value of po_sei_payloadtype[i] of seiB is the same as that for seiA.

The value of po_sei_wrapping_flag[i] of seiB is equal to 0.

The value of po_sei_prefix_flag[i] of seiB is equal to 1.

When an SPO SEI message with a particular value of po_id is present in any access unit of a CVS, an SPO SEI message with the particular value of po_id shall be present in the first access unit of the CVS in decoding order. The number of SEI messages and the payloadType codes of the SEI messages indicated within each SPO SEI message with the same value of po_id persist in decoding order from the current access unit to the end of the CVS in output order.

The SPO SEI message may carry one or more SEI prefix indications of a particular payloadType. Each SEI prefix indication is a bit string that follows the SEI payload syntax of that value of payloadType and contains a number of complete syntax elements starting from the first syntax element in the SEI payload. These SEI prefix indications should provide sufficient information to determine the specific processing order for types of SEI messages having the same value of payloadType but a different preferred processing order.

po_id contains an identification number to identify the SPO SEI message.

A processing chain consists of a list of types of SEI messages identified by an SPO SEI message in the preferred processing order indicated in the SPO SEI message.

Each SEI message type in the processing chain indicated by the SPO SEI message is identified by the syntax elements po_sei_payload_type[i], po_sei_wrapping_flag[i], po_sei_processing_order[i] and, when present, po_num_bits_in_prefix_indication_minus1[i] and po_prefix_data_bit [i][j].

An SEI message type is not required to belong to any processing chain and may belong to any number of processing chains identified by SPO SEI messages with different values of po_id.

Each SEI message of an SEI message type identified within the SPO SEI message has the same persistence scope as when the SEI message is carried outside of the SPO SEI message and not identified within an SPO SEI message.

Processing chains may be alternatives to each other. In other words, at most one processing chain may be selected to be applied. Alternatively, they may be complementary. In other words, two or more processing chains may be selected and applied separately, such that each processing chain generates one output.

po_num_sei_messages_minus2+2 indicates the number of types of SEI messages for which the preferred order of processing is indicated in the SPO SEI message.

po_sei_wrapping_flag[i] equal to 1 specifies that one or more processing order nesting SEI messages with both the following constraints being met should be present:

pon_target_po_id[j] with any value of j is equal to po_id.

There is a k-th loop entry in the processing order nesting SEI message such that the payloadType of the k-th nesting SEI message is equal to po_sei_payload_type[i], and pon_processing_order[k] is equal to po_sei_processing_order[i].

When po_sei_wrapping_flag[i] is equal to 0, an SEI message with payloadType equal to po_sei_payload_type[i] (and, when po_sei_prefix_flag[i] is equal to 1, prefix data that matches the values of po_sei_prefix_data_bit[i][j]) should be present outside of the processing order nesting SEI message.

po_sei_wrapping_flag[i] equal to 1 enables SEI messages to be carried within the processing order nesting SEI message to prevent such SEI messages from being incorrectly interpreted by decoders that do not process the SPO SEI message. Thus, po_sei_wrapping_flag[i] equal to 1 is intended to be used when po_sei_wrapping_flag[i] equal to 0 can lead to unintended results being produced by such decoders.

po_sei_importance_flag[i] indicates the degree of importance determined by the encoder for the type of the SEI message with index i.

If the decoding system cannot interpret or does not support the functionality indicated by any SEI message that has po_sei_importance_flag[i] equal to 1, it shall ignore the entire SPO SEI message.

po_sei_payloadtype[i] specifies the value of payloadType of the i-th type of SEI message.

po_sei_prefix_flag[i] equal to 1 specifies that syntax elements po_num_bits_in_prefix_indication_minus1[i] and part of po_sei_prefix_data_bit[i][j] are present. po_sei_prefix_flag[i] equal to 0 specifies that these syntax elements are not present.

SeiProcessingOrderSeiList is set to consist of the values of payloadType, 3, 4, 5, 19, 137, 142, 144, 147, 148, 149, 165, 177, 210, and 211. The value of po_sei_payload_type[i] for i in the range of 0 to po_num_sei_messages_minus2+1, inclusive, shall be equal to a value in SeiProcessingOrderSeiList.

po_sei_processing_order[i] indicates the preferred order of processing of the i-th type of SEI message for which preferred processing order information is provided in the SPO SEI message. For any two different integer values of m and n, po_sei_processing_order[m] less than po_sei_processing_order[n] indicates that the type of SEI message associated with index m should be processed before the type of SEI message associated with index n, and po_sei_processing_order[m] equal to po_sei_processing_order[n] indicates that there is no preferred order of processing between the types of SEI messages associated with indexes m and n (e.g., they may indicate different properties that are both applicable at that stage, or alternative processes that may be applied, or one may indicate a property and the other may indicate a process).

For i greater than 0, po_sei_processing_order[i] shall be greater than or equal to po_sei_processing_order[i−1].

po_num_bits_in_prefix_indication_minus1[i] and po_sei_prefix_data_bit[i][j], when present, have the same semantics as the syntax elements num_bits_in_prefix_indication_minus1[i] and sei_prefix_data_bit[i][j] of the SEI prefix indication SEI message, with prefix_sei_payload_type replaced by po_sei_payload_type[i].

When two or more SPO SEI messages with a particular value of po_id are present in a CVS, the values of po_num_sei_messages_minus2 and, for each value of i, the values of po_sei_wrapping_flag[i], po_sei_prefix_flag[i], po_sei_importance_flag[i], po_sei_payload_type[i], and po_sei_processing_order[i] shall be the same as in the other SPO SEI messages in the CVS with the same value of po_id.

po_byte_alignment_bit_equal_to_one shall be equal to 1.

FIG. 32 illustrates a processing order nesting SEI message according to embodiments.

The processing order nesting (PON) SEI message includes one or more SEI messages that should be applied only as parts of the processing chain identified by an associated SEI processing order SEI message and should not be applied in a manner that would contradict with the processing chain identified by the associated SEI processing order SEI message.

The SEI messages contained in a PON SEI message are referred to as PON-nested SEI messages.

An encoder may include multiple PON SEI messages in the same access unit. For example, a first PON SEI message in an access unit may contain a PON-nested SEI message that applies to multiple processing chains and one or more other PON SEI messages in the same access unit that apply to a single processing chain only.

It is a requirement of bitstream conformance that the semantics and effect of an SEI message that is not a PON-nested SEI message shall not depend on any PON-nested SEI message. Consequences of this constraint include the following specific constraints, in which an associated SEI message is considered to be an SEI message that affects the semantics or effect of a particular SEI message:

When a neural-network post-filter characteristics SEI message is present with a particular value of nnpfc_id that is a PON-nested SEI message, any associated neural-network post-filter activation SEI messages with nnpfa_target_id equal to the particular value of nnpfc_id shall also be PON-nested SEI messages.

When a neural-network post-filter activation (NNPFA) SEI message is present with nnpfa_persistence_flag equal to 1 and a particular value of nnpfa_target_id that is not a PON-nested SEI message, the next picture in output order in the same CLVS that has an NNPFA SEI message with the same value of nnpfa_target_id (if any) shall not have an associated NNPFA SEI message that is a PON-nested SEI message.

When a film grain characteristics SEI message is present with fg_characteristics_persistence_flag equal to 1 that is not a PON-nested SEI message, there shall not be an associated film grain characteristics SEI message that is a PON-nested SEI message in the same CLVS.

When a frame packing arrangement SEI message is present with fp_arrangement_persistence_flag equal to 1 that is not a PON-nested SEI message, there shall not be an associated frame packing arrangement SEI message in the same CLVS with fp_arrangement_cancel_flag equal to 1 or the same value of fp_arrangement_id that is a PON-nested SEI message.

When a content color volume SEI message is present with ccv_persistence_flag equal to 1 that is not a PON-nested SEI message, there shall not be an associated frame packing arrangement SEI message in the same CLVS that is a PON-nested SEI message.

When an equirectangular projection SEI message is present with erp_persistence_flag equal to 1 that is not a PON-nested SEI message, there shall not be an associated equirectangular projection SEI message in the same CLVS that is a PON-nested SEI message.

When a generalized cubemap project SEI message is present with gcmp_persistence_flag equal to 1 that is not a PON-nested SEI message, there shall not be an associated generalized cubemap project SEI message in the same CLVS that is a PON-nested SEI message.

When a sphere rotation SEI message is present with sphere_rotation_persistence_flag equal to 1 that is not a PON-nested SEI message, there shall not be an associated sphere rotation SEI message in the same CLVS that is a PON-nested SEI message.

When a region-wise packing SEI message is present with rwp_persistence_flag equal to 1 that is not a PON-nested SEI message, there shall not be an associated region-wise packing SEI message in the same CLVS that is a PON-nested SEI message.

When an omnidirectional viewport SEI message is present with omni viewport_persistence_flag equal to 1 that is not a PON-nested SEI message, there shall not be an associated omnidirectional viewport SEI message in the same CLVS that is a PON-nested SEI message.

When a sample aspect ratio SEI message is present with sari_persistence_flag equal to 1 that is not a PON-nested SEI message, there shall not be an associated sample aspect ratio SEI message in the same CLVS that is a PON-nested SEI message.

When an annotated regions SEI message is present that is not a PON-nested SEI message, there shall not be an associated annotated regions SEI message in the same CLVS that is a PON-nested SEI message.

When an alpha channel information SEI message is present that is not a PON-nested SEI message, there shall not be an associated alpha channel information SEI message in the same CLVS that is a PON-nested SEI message.

When a display orientation SEI message is present that is not a PON-nested SEI message, there shall not be an associated display orientation SEI message in the same CLVS that is a PON-nested SEI message.

When a color transform indication SEI message is present with colour_transform_persistence_flag equal to 1 that is not a PON-nested SEI message, there shall not be an associated color transform indication SEI message in the same CLVS with colour_transform_cancel_flag equal to 1 or the same value of colour_transform_id that is a PON-nested SEI message.

pon_num_po_ids_minus1+1 specifies the number of the SEI processing order SEI messages associated with this PON SEI message.

pon_target_po_id[i] indicates po_id of the i-th associated SEI processing order SEI message.

pon_num_seis_minus1+1 specifies the number of the PON-nested SEI messages that are included in this PON SEI message.

pon_processing_order[i] specifies the position of the i-th processing-order-nested SEI message within the processing order defined by the associated SEI processing order SEI message. When i is greater than 0, pon_processing_order[i] shall be greater than or equal to pon_processing_order[i−1].

For each associated SEI processing order SEI message, there shall be at least one value of i in the range of 0 to pon_num_seis_minus1, inclusive, in the associated SEI processing order SEI message with some entry k for which all the followings are true.

po_sei_processing_order[k] is equal to pon_processing_order[i]

po_sei_payload_type[k] is equal to the value of payloadType of the i-th PON-nested SEI message.

When po_sei_prefix_flag[k] is equal to 1, po_sei_prefix_data_bit[k][j] for j in the range of 0 to po_num_bits_in_prefix_indication_minus1[k], inclusive, contain the same content as the po_num_bits_in_prefix_indication_minus1[k] plus 1 initial bit of the SEI message payload of the i-th PON-nested SEI message.

The i-th PON-nested SEI message shall be applied as the k-th loop entry of the associated SEI processing order SEI message.

Handling of a Processing Chain

Processing chains are alternative to each other. That is, at most one processing chain may be selected to be applied by a decoding system at one time.

The decoding system may select and apply a processing chain as follows.

First, the bitstream is decoded, and the list PoPicList is set to be the list of the cropped decoded pictures in output order that resulted from decoding the bitstream, and a processing chain is selected.

(Option 1: picture-by-picture for one filter, zig zag, breadth first) For each of the SEI message types of the selected processing chain, the following applies in a non-decreasing order of the corresponding values of po_sei_processing_order[i].

When an SEI message associated with the i-th SEI message type persists for picA or a picture for which an NNPF that generated picA was activated by a preceding process in the processing chain, the following applies for each picture picA in PoPicList in output order.

When picA is not a cropped decoded picture, the following exceptions apply for the interpretation of the SEI message.

The interface variables for interpretation of the SEI message are derived from picA instead of the syntax elements indicating properties for the corresponding cropped decoded picture.

The semantics of the SEI message, or the semantics of the SEI message and, when the SEI message is an NNPFA SEI message, the associated NNPFC SEI message, apply to pictures in PoPicList instead of cropped decoded pictures.

When the i-th SEI message type is present in SpoProcessingList, the process implied by the SEI message is performed, and PoPicList is updated by replacing pictures with the corresponding processed pictures, if any, resulting from the process and inserting the other pictures, if any, resulting from the process into PoPicList such that the output order is obeyed.

(Option 2: filter-by-filter filtering for one picture, zag zip, depth first) The following is repeatedly applied, in output order, for each picture picA in PoPicList. When a set of SEI messages associated with SEI message types in SpoProcessingList of the selected processing chain persist for picA, the followings apply.

The followings apply for each set of SEI messages in a non-decreasing order of the corresponding values of po_sei_processing_order[i].

When the current SEI message is not the first message in the set of the SEI messages, the following exceptions apply for the interpretation of the SEI message:

The interface variables for interpretation of the SEI message are derived from the pictures in the updated PoPicList instead of the syntax elements indicating properties for the respective cropped decoded pictures.

The semantics of the SEI message, or the semantics of the SEI message and, when the SEI message is an NNPFA SEI message, the associated NNPFC SEI message, apply to pictures in PoPicList instead of the cropped decoded pictures.

The process implied by the SEI message is invoked repeatedly, in output order, for picA and each of the pictures in PoPicList that are, or correspond to, interpolated or extrapolated pictures generated by the application of the process implied by any preceding SEI message, if any, to picA. After each invocation of the process, PoPicList is updated by replacing pictures with the corresponding processed pictures, if any, resulting from the process and inserting the other pictures, if any, into PoPicList such that the output order is obeyed.

FIG. 33 illustrates syntax for an encoder optimization information SEI message according to embodiments.

The encoder optimization information SEI message is used to indicate whether the video has been optimized for human viewing or machine analysis and which type of optimization has been applied in pre-processing or encoding.

eoi_cancel_flag equal to 1 specifies that the persistence of the encoder optimization information SEI message included in any previous PU in output order is canceled. eoi_cancel_flag equal to 0 indicates that th optimization information that has been applied in pre-processing or encoding follows.

eoi_persistence_flag specifies the persistence of the optimization information provided in this SEI message. eoi_persistence_flag equal to 0 specifies that the optimization information applies for the current picture only. eoi_persistence_flag equal to 1 specifies that the optimization information applies for the current picture and all subsequent pictures of the current layer in output order until one or more of the following conditions are true.

A new CLVS of the current layer begins.

The bitstream ends.

A picture in the current layer associated with an encoder optimization information SEI message is output, following the current picture in output order.

eoi_for_human_viewing_idc equal to 3 specifies that purposes for the applied optimization include human viewing. eoi_for_human_viewing_idc equal to 2 specifies that the video is suitable but not specifically optimized for human viewing. eoi_for_huma_viewing_idc equal to 1 specifies that the video is unsuitable for human viewing. eoi_for_human_viewing_idc equal to 0 specifies that it is unknown whether the video is suitable for human viewing.

eoi_for_machine_analysis_idc equal to 3 specifies that purposes for the applied optimization include machine analysis. eoi_for_machine_analysis_idc equal to 2 specifies that the video is suitable but not specifically optimized for machine analysis. eoi_for_machine_analysis_idc equal to 1 specifies that the video is unsuitable for machine analysis. eoi_for_machine_analysis_idc equal to 0 specifies that it is unknown whether the video is suitable for machine analysis.

It is a requirement of bitstream conformance that both the values of eoi_for_human_viewing_idc and eoi_for_machine_analysis_idc shall not be equal to 1. eoi_type indicates the types of the optimization method as specified in Table x1, where (eoi_type & bitMask) not equal to 0 indicates that the optimization type with the value of bitMask in Table 11 (Definition of eoi_type) has been applied. When eoi_type is greater than 0 and (eoi_type & bitMask) is equal to 0, the optimization type with the value of bitMask has not been applied. When eoi_type is equal to 0, optimization as determined by the application has been used.

TABLE 11

| bitmask | Interpretation |
|---|---|
| 0x01 | Object-based optimization; the pictures for which this SEI message persists have been pre-processed or encoded so that detected objects in the pictures are optimized with respect to other parts of the pictures for the indicated optimization purposes |
| 0x02 | Temporal resampling optimization |
| 0x04 | Spatial resampling optimization |
| 0x08 | Temporal quality optimization in a manner that quality fluctuates temporally |
| 0x10 | Spatial quality optimization; the pictures for which this SEI message persists have been pre-processed or encoded to reduce unnecessary information or improve the quality of necessary information.(e.g to reduce the amount of noise and remove speckles at the picture-level) |
| 0x20 | Privacy protection optimization; the pictures for which this SEI message persists have been pre-processed or encoded to protect personal information. (e.g. removal or replacing of personal identifiable information, pseudonymization, anonymization) |

EoiTemporalQualityFlag, EoiSpatialQualityFlag, and EoiPrivacyProtectionFlag, which specify whether eoi_type indicates the type of the optimization including object-based optimization, temporal resampling optimization, spatial resampling optimization, temporal quality optimization, spatial quality optimization, and privacy protection optimization, are derived as follows.

$$EoiObjectBasedFlag = ((\text{eoi\_type} \,\&\, 0x01) > 0)\ ?\ 1:0 \tag{xx}$$

$$EoiTemporalResamplingFlag = ((\text{eoi\_type} \,\&\, 0x02) > 0)\ ?\ 1:0$$

$$EoiSpatialResamplingFlag = ((\text{eoi\_type} \,\&\, 0x04) > 0)\ ?\ 1:0$$

$$EoiTemporalQualityFlag = ((\text{eoi\_type} \,\&\, 0x08) > 0)\ ?\ 1:0$$

$$EoiSpatialQualityFlag = ((\text{eoi\_type} \,\&\, 0x10) > 0)\ ?\ 1:0$$

$$EoiPrivacyProtectionFlag = ((\text{eoi\_type} \,\&\, 0x20) > 0)\ ?\ 1:0$$

For example, when certain highest temporal sublayers have been encoded with such coarse quantization that human viewers perceive the quality fluctuation annoying, but machine task performance is not compromised, eoi_for_human_viewing_flag and eoi_for_machine_analaysis_flag may be set equal to 0 and 1, respectively, and eoi_type may be set equal to a value that causes EoiTemporalQualityFlag to be equal to 1.

When eoi_persistence_flag is equal to 0, it is a requirement of bitstream conformance that EoiTemporalResamplingFlag shall be equal to 0 and EoiTemporalQualityFlag shall be equal to 0.

eoi_object_based_idc, when present, indicates the type of object-based optimization as specified in Table 12 (Definition of eoi_object_based_idc), where (eoi_object_based_idc & bitMask) not equal to 0 indicates that the object-based optimization type associated with the value of bitMask in Table 12 has been applied. When eoi_object_based_idc is greater than 0 and (eoi_object_based_idc & bitMask) is equal to 0, the object-based optimization type associated with the value of bitMask has not been applied. When eoi_object_based_idc is equal to 0, the object-based optimization type defined by the application has been applied. The value of eoi_object_based_idc shall be in the range of 0 to 7, inclusive, in bitstreams conforming to this version of this specification. Values of 8 to 65 535, inclusive, for eoi_object_based_idc are reserved for future use by ITU-T | ISO/IEC and shall not be present in bitstreams conforming to this version of this specification. When the value of eoi_object_based_idc is in the range of 8 to 65,535, inclusive, decoders conforming to this version of this specification shall ignore eoi_object_based_idc.

TABLE 12

| bitMask | Interpretation |
|---|---|
| 0x01 | Areas outside the detected objects have been blurred prior to encoding. |
| 0x02 | Areas outside the detected objects have been encoded with coarser transform-domain quantization than the quantization used for the detected objects. |
| 0x04 | Areas outside the detected objects have been overwritten. For example, an encoding system can overwrite areas outside the detected objects with a constant sample value. |

eoi_temporal_resampling_type_flag equal to 0 specifies that the temporal resampling optimization is a subsampling operation. eoi_temporal_resampling_type_flag equal to 1 specifies that the temporal resampling optimization is an upsampling operation.

eoi_num_int_pics greater than 0 indicates that the count of pictures that the encoding system has excluded between each pair of coded pictures in output order (when eoi_temporal_resampling_type_flag is equal to 0) or added between each pair of source pictures for encoding (when eoi_temporal_resampling_type_flag is equal to 1) within the persistence of this SEI message is constant. When eoi_temporal_resampling_type_flag is equal to 0 and eoi_num_int_pics is greater than 0, eoi_num_int_pics specifies the count of pictures that the encoding system has excluded between each pair of coded pictures in output order. When eoi_temporal_resampling_type_flag is equal to 1 and eoi_num_int_pics is greater than 0, eoi_num_int_pics specifies the count of pictures that the encoding system has added between each pair of source pictures for encoding.

eoi_num_int_pics equal to 0 indicates that the count of pictures that the encoding system has excluded between each pair of coded pictures in output order (when eoi_temporal_resampling_type_flag is equal to 0) or added between each pair of source pictures for encoding (when eoi_temporal_resampling_type_flag is equal to 1) within the persistence of this SEI message is unknown or variable.

The value of eoi_num_int_pics shall be in the range of 0 to 63, inclusive. eoi_spatial_resampling_type_flag equal to 0 specifies that the spatial resampling optimization is a subsampling operation. eoi_spatial_resampling_type_flag equal to 1 specifies that the spatial resampling optimization is an up-sampling operation.

eoi_privacy_protection_type_idc, when present, indicates the type of privacy protection optimization as specified in Table 13 (Definition of eoi_privacy_protection_type_idc).

TABLE 13

| eoi_privacy_protection_type_idc | Interpretation |
|---|---|
| 0 | Unknown or determined by the application. |
| 1 | Blurring; personal information is blurred to make it unidentifiable. |
| 2 | Replacing; personal information is replaced with something different from the original to make it unidentifiable. |
| 3 | Masking; personal information is masked so that it cannot be identified |
| 4 . . . 15 | Reserved for future use. |

eoi_privacy_protected_info_type, when present, indicates the types of protected information as specified in Table 14, where eoi_privacy_protected_info_type greater than 0 and (eoi_privacy_protected_info_type & bitMask) not equal to 0 indicate that the information type with the value of bitMask in Table 14 (Definition of eoi_privacy_protection_info_type) has been protected. When eoi_privacy_protected_info_type is equal to 0, an application-defined type of information has been protected. The value of eoi_privacy_protection_info_type shall be in the range of 0 to 7, inclusive, in bitstreams conforming to this version of this specification. Values of 8 to 255, inclusive, for eoi_privacy_protected_info_type are reserved for future use by TU-T ISO/IEC and shall not be present in bitstreams conforming to this version of this specification. When the value of eoi_privacy_protected_info_type is in the range of 8 to 255, inclusive, decoders conforming to this version of this specification shall ignore eoi_privacy_protected_info_type.

TABLE 14

| bitMask | Interpretation |
|---|---|
| 0x01 | Information that identifies a person is protected. For example, the face of the person. |
| 0x02 | Information that can identify vehicles is protected. For example, the license plate of the vehicle. |
| 0x04 | Information that can infer locations is protected. For example text or images on signs. |

FIG. 34 illustrates syntax for a text description information SEI message according to embodiments.

The text description information SEI message provides text description about one or more pictures.

txt_descr_id indicates the identifier value of this text description information SEI message. The value of txt_descr_id shall be in the range of 1 to 16383, inclusive. Value 0 is reserved.

txt_cancel_flag equal to 1 indicates that the text description information SEI message cancels the persistence of any previous text description information SEI message with the same txt_descr_id in output order that applies to the current layer. txt_cancel_flag equal to 0 indicates that text description information follows.

txt_persistence_flag specifies the persistence of the text information description SEI message for the current layer.

txt_persistence_flag equal to 0 specifies that the text description information applies to the current decoded picture only.

txt_persistence_flag equal to 1 specifies that the text description information SEI message applies to the current decoded picture and persists for all subsequent pictures of the current layer in output order until one or more of the following conditions are true.

A new CLVS of the current layer begins.

The bitstream ends.

A picture in the current layer in an AU associated with a text description information SEI message with the same txt_descr_id is output, following the current picture in output order.

txt_descr_purpose indicates the purpose of the text description SEI as specified in Table 15 (Definition of txt_descr_purpose). The value of text_descr_purpose shall be in the range of 0 to 5, inclusive. Values in the range of 6 to 255, inclusive, for text_descr_purpose are reserved for future use by ITU-T | ISO/IEC and shall not be present in bitstreams conforming to this version of this specification. Decoders conforming to this version of this specification shall allow any value of text_descr_purpose in the range of 0 to 255, inclusive.

TABLE 15

| Value | Interpretation |
|---|---|
| 0 | Application defined |
| 1 | Copyright information |
| 2 | AI marking information |
| 3 | General comment information |
| 4 | Content advisory rating information conforming to US. And Canadian Rating Region Tables (RRT) |
| 5 | Tag URI for identifying the bitstream |
| 6 . . . 255 | Reserved |

txt_num_strings_minus1+1 indicates the number of entries for txt_descr_string_lang[i] and txt_descr_string[i] that follows.

txt_descr_string_lang[i] specifies the language of the txt_descr_string[i]. The language of the txt_descr_string[i] shall be given by a language tag as defined by IETF RFC 5646. The length of txt_descr_string_lang[i] shall be in the range of 0 to 49, inclusive.

txt_descr_string[i] specifies i-th text description information string whose value is interpreted as specified by the txt_descr_purpose.

When txt_descr_purpose is equal to 0, the interpretation of information included in the txt_descr_string is defined by the application.

When txt_descr_purpose is equal to 1, txt_descr_string[i] specifies copyright information that pertains to the picture(s) in the persistence scope defined by txt_cancel_flag and txt_persistence_flag.

When txt_descr_purpose is equal to 2, the txt_descr_string[i] specifies, when not a null string, AI marking information that pertains to the picture(s) within the persistence scope of this SEI message.

NOTE: When txt_descr_purpose is equal to 2, the string may contain information about the machine-learning-based processing, intended use of the decoded pictures, or other aspects relevant to the associated pictures.

When txt_descr_purpose is equal to 3, the txt_descr_string[i] specifies a general text label description that pertains to the picture(s) in the persistence scope defined by txt_cancel_flag and txt_persistence_flag.

When txt_descr_purpose is equal to 4, the txt_descr_string[i] specifies content advisory rating information conforming to US. And Canadian Rating Region Tables (RRT) that pertains to the picture(s) in the persistence scope defined by txt_cancel_flag and txt_persistence_flag.

When txt_descr_purpose is equal to 5, txt_descr_string[i] contains a tag URI with syntax and semantics as specified in IETF RFC 4151 identifying the CLVS.

The text description information (TDI) SEI message was proposed at the 34th JVET meeting and was adopted into the VSEI v4 draft. The design of the TDI SEI message includes the purpose of the text description (e.g., tdi_desc_purpose), the language type, and a list of text description strings. In this design, it is clear that one TDI SEI message contains only the text description for a single purpose (e.g., copyright information, AI marking, a general text, content advisory rating, etc.). However, there is no constraint on the text language and the list of text description strings.

Since there is no additional explanation/constraint on the signaling of text languages and text description strings, the SEI has an almost free format. Two or more different text description strings using the same language may be present in an SEI message. This is not a good design, as it may place an unnecessary burden on the decoder, because it is difficult to handle such cases without knowing how many descriptions there are. One example of such difficulty is that a decoder interested in a text string of a particular language should check all the text description strings in the TDI SEI message to ensure it does not miss any text description string expressed in the language of interest.

A better design approach is to check whether all text descriptions in the list are the same string expressed in different languages.

Methods and apparatuses according to embodiments provide solutions to the issues described above. Each item may be applicable individually or in combinations.

1. A TDI SEI message may not include more than one text description string in the same language.
2. Alternatively, if there are two or more text description strings in the same language, they shall be present in the TDI SEI message in consecutive order.
3. Alternatively, if there are two or more text description strings in the same language, they shall be present in the TDI SEI message in consecutive order, and shall not have identical text description strings.

The TDI SEI message in FIG. 34 may further include the following syntax elements. txt_num_strings_minus1+1 indicates the number of entries for txt_descr_string_lang[i] and txt_descr_string[i] that follows.

txt_descr_string_lang[i] specifies the language of the txt_descr_string[i]. The language of the txt_descr_string[i] shall be given by a language tag as defined by IETF RFC 5646. The length of txt_descr_string_lang[i] shall be in the range of 0 to 49, inclusive. If m is not equal to n, txt_descr_string_lang[m] is not equal to txt_descr_string_lang[n].

txt_descr_string[i] specifies i-th text description information string whose value is interpreted as specified by the txt_descr_purpose.

When txt_descr_purpose is equal to 0, the interpretation of information carried in the txt_descr_string is defined by the application.

When txt_descr_purpose is equal to 1, txt_descr_string[i] specifies copyright information that pertains to the picture(s) in the persistence scope defined by txt_cancel_flag and txt_persistence_flag.

When txt_descr_purpose is equal to 2, the txt_descr_string[i] specifies, when not a null string, AI marking information that pertains to the picture(s) within the persistence scope of this SEI message.

When txt_descr_purpose is equal to 2, the string may contain information about the machine-learning-based processing, intended use of the decoded pictures, or other aspects relevant to the associated pictures.

When txt_descr_purpose is equal to 3, the txt_descr_string[i] specifies a general text label description that pertains to the picture(s) in the persistence scope defined by txt_cancel_flag and txt_persistence_flag.

When txt_descr_purpose is equal to 4, the txt_descr_string[i] specifies content advisory rating information conforming to US. And Canadian Rating Region Tables (RRT) that pertains to the picture(s) in the persistence scope defined by txt_cancel_flag and txt_persistence_flag.

When txt_descr_purpose is equal to 5, txt_descr_string[i] contains a tag URI with syntax and semantics as specified in IETF RFC 4151 identifying the CLVS.

The TDI SEI message in FIG. 34 may further include the following syntax elements. txt_num_strings_minus1+1 indicates the number of entries for txt_descr_string_lang[i] and txt_descr_string[i] that follows.

txt_descr_string_lang[i] specifies the language of the txt_descr_string[i]. The language of the txt_descr_string[i] shall be given by a language tag as defined by IETF RFC 5646. The length of txt_descr_string_lang[i] shall be in the range of 0 to 49, inclusive. If txt_descr_string_lang[a] is equal to txt_descr_string_lang[c] and a is less than c, there is constraint that any txt_descr_string_lang[b], where a<b<c, that is not equal to txt_descr_string_lang[a] shall not be present.

txt_descr_string[i] specifies i-th text description information string whose value is interpreted as specified by the txt_descr_purpose.

When txt_descr_purpose is equal to 0, the interpretation of information carried in the txt_descr_string is defined by the application.

When txt_descr_purpose is equal to 1, txt_descr_string[i] specifies copyright information that pertains to the picture(s) in the persistence scope defined by txt_cancel_flag and txt_persistence_flag.

When txt_descr_purpose is equal to 2, the txt_descr_string[i] specifies, when not a null string, AI marking information that pertains to the picture(s) within the persistence scope of this SEI message.

When txt_descr_purpose is equal to 2, the string may contain information about the machine-learning-based processing, intended use of the decoded pictures, or other aspects relevant to the associated pictures.

When txt_descr_purpose is equal to 3, the txt_descr_string[i] specifies a general text label description that pertains to the picture(s) in the persistence scope defined by txt_cancel_flag and txt_persistence_flag.

When txt_descr_purpose is equal to 4, txt_descr_string[i] specifies content advisory rating information conforming to US. And Canadian Rating Region Tables (RRT) that pertains to the picture(s) in the persistence scope defined by txt_cancel_flag and txt_persistence_flag.

When txt_descr_purpose is equal to 5, txt_descr_string[i] contains a tag URI with syntax and semantics as specified in IETF RFC 4151 identifying the CLVS.

The TDI SEI message in FIG. 34 may further include the following syntax elements. txt_num_strings_minus1+1 indicates the number of entries for txt_descr_string_lang[i] and txt_descr_string[i] that follows.

txt_descr_string_lang[i] specifies the language of the txt_descr_string[i]. The language of the txt_descr_string[i] shall be given by a language tag as defined by IETF RFC 5646. The length of txt_descr_string_lang[i] shall be in the range of 0 to 49, inclusive. If txt_descr_string_lang[a] is equal to txt_descr_string_lang[c] and a is less than c, there is constraint that any txt_descr_string_lang[b], where a<b<c, that is not equal to txt_descr_string_lang[a] shall not be present.

txt_descr_string[i] specifies i-th text description information string whose value is interpreted as specified by the txt_descr_purpose. If m is not equal to n, txt_descr_string[m] is not equal to txt_descr_string[n].

When txt_descr_purpose is equal to 0, the interpretation of information carried in the txt_descr_string is defined by the application.

When txt_descr_purpose is equal to 1, txt_descr_string[i] specifies copyright information that pertains to the picture(s) in the persistence scope defined by txt_cancel_flag and txt_persistence_flag.

When txt_descr_purpose is equal to 2, the txt_descr_string[i] specifies, when not a null string, AI marking information that pertains to the picture(s) within the persistence scope of this SEI message.

When txt_descr_purpose is equal to 2, the string may contain information about the machine-learning-based processing, intended use of the decoded pictures, or other aspects relevant to the associated pictures.

When txt_descr_purpose is equal to 3, the txt_descr_string[i] specifies a general text label description that pertains to the picture(s) in the persistence scope defined by txt_cancel_flag and txt_persistence_flag.

When txt_descr_purpose is equal to 4, txt_descr_string[i] specifies content advisory rating information conforming to US. And Canadian Rating Region Tables (RRT) that pertains to the picture(s) in the persistence scope defined by txt_cancel_flag and txt_persistence_flag.

When txt_descr_purpose is equal to 5, txt_descr_string[i] contains a tag URI with syntax and semantics as specified in IETF RFC 4151 identifying the CLVS.

The source picture timing information (SPTI) SEI message according to embodiments includes signaling of the number of temporal sublayers for which the timing information is provided as a syntax element spti_max_sublayers_minus_1.

spti_max_sublayers_minus_1+1 specifies the maximum number of temporal sublayers for which a picture interval scale factor (spti_sublayer_interval_scale_factor[i]) and synthesized flag (spti_sublayer_synthesized_picture_flag[i]) information is signaled. When spti_max_sublayers_minus_1 is not present, it is inferred to be equal to TemporalId.

Such design of the signaling has at least the following problem. While the SEI may be present in an access unit in any temporal sublayer within the CLVS, the value of spti_max_sublayer_minus_1, when present, may be less than temporalId of the SEI itself. This is problematic because the SEI would not have information that is useful for the picture associated with the SEI itself.

The value of spti_max_sublayer_minus_1 should be at least equal to TemporalId of the SEI itself. When the value of spti_max_sublayer_minus_1 is greater than TemporalId, it provides timing information for pictures in a higher temporal sublayer, particularly the max temporal sublayer in the CLVS. This enables the possibility that the SEI is signaled at the base temporal sublayer and applied for all pictures associated with the SEI.

Methods and apparatuses according to embodiments provide solutions to the issues described above. Each item may be applicable individually or in combinations.

1. Specify that the value of spti_max_sublayer_minus_1 shall be equal to or greater than TemporalId in the SEI message.
2. Modify the name of spti_max_sublayer_minus_1 to spti_max_sublayer_minus1.

3. It may be further specified that for different codecs, the maximum value of spti_max_sublayer_minus_1 is different.

For use in HEVC and VVC, the spti_max_sublayer_minus_1 shall be less than or equal to 6.

For use in AVC, spti_max_sublayer_minus_1 shall be less than or equal to 7.

4. Alternatively, the value of spti_max_sublayer_minus_1 is constrained to be less than or equal to 7. Decoders shall ignore the timing information for a temporal sublayer that is not present in the CLVS.

Hereinafter, embodiments will be described in detail In relation to the items described above. The embodiments are based on the VSEI and VVC specifications.

The semantics of spti_max_sublayers_minus_1 according to embodiments may be defined as follows. An image encoding and decoding methods/apparatuses according to embodiments may encode and decode images based on spti_max_sublayers_minus_1.

spti_max_sublayers_minus_1 plus 1 specifies the maximum number of temporal sublayers for which picture interval scale factor (spti_sublayer_interval_scale_factor[i]) and synthesized flag (spti_sublayer_synthesized_picture_flag[i]) information is signaled. When spti_max_sublayers_minus_1 is not present, it is inferred to be equal to TemporalId. The value of spti_max_sublayers_minus_1 shall be equal to or greater than TemporalId.

Use of the Source Picture Timing SEI Message in VVC:

For the purpose of interpretation of the source picture timing SEI message, the following variable is specified.

TemporalId is set equal to TemporalId.

The value of spti_max_sublayers_minus_1 shall be less than or equal to 6.

The content on the use of the source picture timing SEI message in VVC may be combined with the content of the standards document Recommendation ITU-T H.265 International Standard ISO/IEC 23008-2.

Use of the Source Picture Timing SEI Message in HEVC

For the purpose of interpretation of the source picture timing SEI message, the following variable is specified:

TemporalId is set equal to TemporalId.

The value of spti_max_sublayers_minus_1 shall be less than or equal to 6.

The content on the use of the source picture timing SEI message in HEVC may be combined with the content of Recommendation ITU-T H.264 | International Standard ISO/IEC 14496-10.

Use of the Source Picture Timing SEI Message in AVC:

For the purpose of interpretation of the source picture timing SEI message, the following variable is specified.

If the bitstream conforms to any of the profiles defined in Annex G, H, I, or J, TemporalId is set equal to temporal_id.

Otherwise (if the bitstream conforms to a profile defined in Annex A), TemporalId is set equal to (nal_ref_idc==0?1:0).

The value of spti_max_sublayers_minus_1 shall be less than or equal to 7.

spti_max_sublayers_minus_1+1 specifies the maximum number of temporal sublayers for which picture interval scale factor (spti_sublayer_interval_scale_factor[i]) and synthesized flag (spti_sublayer_synthesized_picture_flag[i]) information is signaled. When not present, spti_max_sublayers_minus_1 is inferred to be equal to TemporalId. The value of spti_max_sublayers_minus_1 shall be in the range of TemporalId to 7, inclusive.

Note: The value of spti_max_sublayer_minus_1+1 may be greater than the actual number of temporal sublayers that are present in the CLVS. Decoders may ignore timing information for a temporal sublayer that is not present in the CLVS.

spti_max_sublayers_minus_1+1 specifies the maximum number of temporal sublayers for which picture interval scale factor (spti_sublayer_interval_scale_factor[i]) and synthesized flag (spti_sublayer_synthesized_picture_flag[i]) information is signaled. When not present, spti_max_sublayers_minus_1 is inferred to be equal to TemporalId. The value of spti_max_sublayers_minus_1 shall be less than or equal to 7.

Note: The value of spti_max_sublayer_minus_1+1 may be greater than the actual number of temporal sublayers that are present in the CLVS. Decoders may ignore timing information for a temporal sublayer that is not present in the CLVS.

Figure 35:
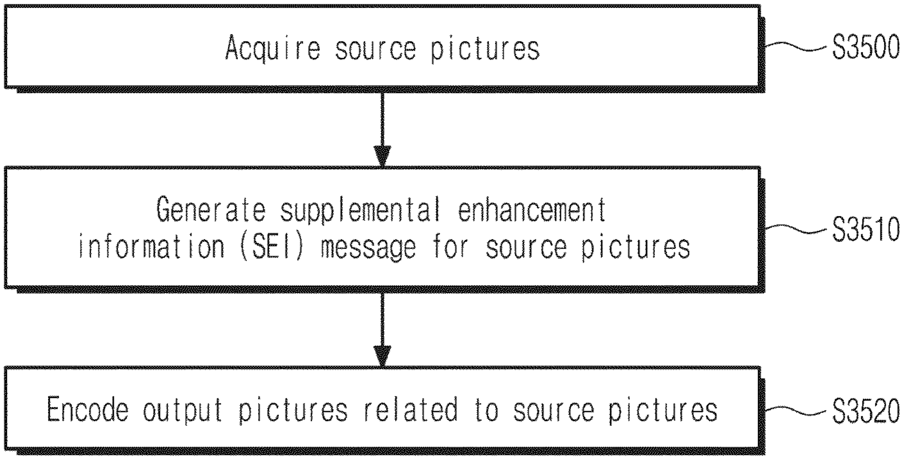
FIG. 35 illustrates an encoding method according to embodiments.

FIG. 35 illustrates an encoding method according to embodiments.

According to embodiments, the method may include acquiring source pictures (S3500), generating an SEI message for the source pictures (S3510), and/or encoding output pictures related to the source pictures (S3520).

For the acquiring the source pictures (S3500), refer to the description of source devices, video sources, and the like in FIG. 1.

For the generating the SEI message (S3510), refer to the description related to the SEI message described in FIGS. 23 to 34.

For the encoding (S3520), refer to the description of the process of encoding data related to image information described in FIGS. 1 to 22.

The SEI message may contain source picture timing information (SPTI).

The SPTI may include information indicating a maximum number of temporal sublayers for the SPTI.

The information indicating the maximum number of temporal sublayers may indicate the maximum number of temporal sublayers for a picture interval scale factor (spti_sublayer_interval_scale_factor) and a synthesized picture flag (spti_sublayer_synthesized_picture_flag).

When the information indicating the maximum number of temporal sublayers is not present, the information indicating the maximum number of temporal sublayers is greater than or equal to a temporal identifier (TemporalId).

The method of FIG. 35 may be performed by an encoder apparatus. The encoder apparatus according to embodiments may include a memory, and at least one processor connected to the memory, wherein the at least one processor may be configured to: acquire source pictures, generate an SEI message for the source pictures, and encode output pictures related to the source pictures.

Embodiments further include a computer-readable storage medium storing a bitstream generated by the method of FIG. 35.

Embodiments further include a method including: acquiring a bitstream for image information, the bitstream being generated based on: acquiring source pictures; generating an SEI message for the source pictures; and encoding output pictures related to the source pictures; and transmitting data including the bitstream.

Figure 36:
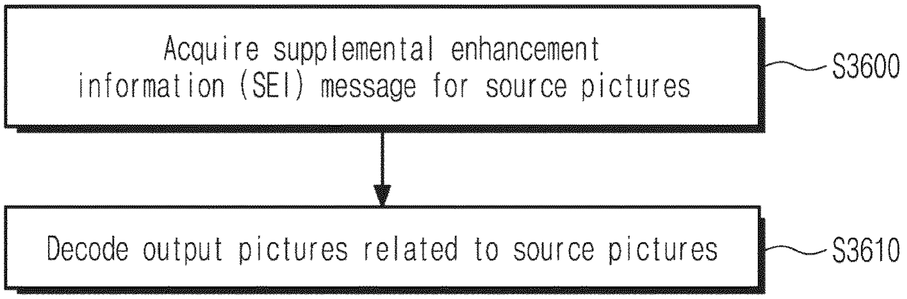
FIG. 36 illustrates a decoding method according to embodiments.

FIG. 36 illustrates a decoding method according to embodiments.

According to embodiments, the method may include acquiring a supplemental enhancement information (SEI)

message for source pictures (S3600); and/or decoding output pictures related to the source pictures (S3610).

The decoding method of FIG. 36 and the encoding method of FIG. 35 are complementary to each other and may be performed as reverse process to each other.

For the acquiring the SEI message (S3600), refer to the description related to the SEI message described in FIGS. 23 to 34.

For the decoding (S3610), refer to the description of the process of decoding data related to the image information described in FIGS. 1 to 22.

According to embodiments, regarding the SPTI, the SEI message may contain source picture timing information (SPTI).

Regarding the syntax element spti_max_sublayers_minus_1, the SPTI may include information indicating a maximum number of temporal sublayers for the SPTI.

According to embodiments, regarding the spti_max_sublayers_minus_1, the information indicating the maximum number of temporal sublayers may indicate the maximum number of temporal sublayers for a picture interval scale factor (spti_sublayer_interval_scale_factor) and a synthesized picture flag (spti_sublayer_synthesized_picture_flag).

In an example where the value of the syntax element spti_max_sublayers_minus_1 is set in relation to the value of TemporalId, when the information indicating the maximum number of temporal sublayers is not present, the information indicating the maximum number of temporal sublayers is greater than or equal to a temporal identifier (TemporalId).

Regarding the syntax element TemporalId, the temporal identifier is equal to the value of a temporal identifier (TemporalId) contained in at least one SEI message related to image information.

The method of FIG. 36 may be performed by a decoder apparatus. The decoder apparatus according to embodiments may include: a memory, and at least one processor connected to the memory, wherein the at least one processor may be configured to: acquire an SEI message for source pictures, and decode output pictures related to the source pictures.

The methods and apparatuses according to the embodiments may provide the following technical effects.

When performing intermediate access unit-based decoding over multiple temporal layers, the SEI message configuration according to the embodiments may enable random access (partial access) to a bitstream related to image information to be efficiently performed without the need to signal or acquire the maximum number for all layers.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as “if” and “when” are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related details have been described in the best mode for carrying out the embodiments.

As described above, the embodiments are fully or partially applicable to an image encoding method, an image encoding apparatus, an image decoding method, an image decoding apparatus, a method of transmitting a bitstream, and a recording medium storing the bitstream.

Those skilled in the art may change or modify the embodiments in various ways within the scope of the embodiments.

Embodiments may include variations/modifications within the scope of the claims and their equivalents.

What is claimed is:

1. A method comprising:

acquiring a source picture timing information (SPTI) supplemental enhancement information (SEI) message for source pictures; and decoding output pictures related to the source pictures, wherein the SPTI SEI message comprises spti_max_sublayers_minus1, wherein spti_max_sublayers_minus1 plus 1 specifies a maximum number of temporal sublayers for which picture interval scale factor (spti_sublayer_interval_scale_factor[i]) and synthesized flag (spti_sublayer_synthesized_picture_flag[i]) information is signalled, wherein, when spti_max_sublayers_minus1 is not present, spti_max_sublayers_minus1 is inferred to be equal to an identifier related to a sublayer, and wherein a value of spti_max_sublayers_minus1 is equal to or greater than the identifier related to the sublayer for the SPTI SEI message.

2. The method of claim 1, wherein the identifier related to the sublayer is equal to a value of a temporal identifier (TemporalId) contained in at least one SEI message related to image information.

3. A method comprising:

acquiring source pictures;

generating a source picture timing information (SPTI) supplemental enhancement information (SEI) message for the source pictures; and encoding output pictures related to the source pictures, wherein the SPTI SEI message comprises spti_max_sublayers_minus1, wherein spti_max_sublayers_minus1 plus 1 specifies a maximum number of temporal sublayers for which picture interval scale factor (spti_sublayer_interval_scale_factor[i]) and synthesized flag (spti_sublayer_synthesized_picture_flag[i]) information is signalled, wherein, when spti_max_sublayers_minus1 is not present, spti_max_sublayers_minus1 is inferred to be equal to an identifier related to a sublayer, and wherein a value of spti_max_sublayers_minus1 is equal to or greater than the identifier related to the sublayer for the SPTI SEI message.

4. A method comprising:

acquiring a bitstream for image information, the bitstream being generated based on:

acquiring source pictures;

generating a source picture timing information (SPTI) supplemental enhancement information (SEI) message for the source pictures; and encoding output pictures related to the source pictures; and transmitting data including the bitstream, wherein the SPTI SEI message comprises spti_max_sublayers_minus1, wherein spti_max_sublayers_minus1 plus 1 specifies a maximum number of temporal sublayers for which picture interval scale factor (spti_sublayer_interval_scale_factor[i]) and synthesized flag (spti_sublayer_synthesized_picture_flag[i]) information is signalled, wherein, when spti_max_sublayers_minus1 is not present, spti_max_sublayers_minus1 is inferred to be equal to an identifier related to a sublayer, and wherein a value of spti_max_sublayers_minus1 is equal to or greater than the identifier related to the sublayer for the SPTI SEI message.

* * * * *